United States Patent
Raab et al.

(10) Patent No.: US 7,051,450 B2
(45) Date of Patent: *May 30, 2006

(54) PORTABLE COORDINATE MEASUREMENT MACHINE

(75) Inventors: Simon Raab, Maitland, FL (US); Seyed Ali Sajedi, Winter Park, FL (US); Kenneth J. Hasloecher, Deltona, FL (US); Marc Barber, Deltona, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/248,407

(22) Filed: Oct. 12, 2005

(65) Prior Publication Data

US 2006/0026851 A1     Feb. 9, 2006

Related U.S. Application Data

(63) Continuation of application No. 10/366,589, filed on Feb. 13, 2003.

(60) Provisional application No. 60/357,599, filed on Feb. 14, 2002, provisional application No. 60/394,908, filed on Jul. 10, 2002.

(51) Int. Cl.
  *G01B 5/04* (2006.01)
(52) U.S. Cl. ....................................... 33/503
(58) Field of Classification Search ................. 33/503, 33/1 PT, 1 N, 534
See application file for complete search history.

(56) References Cited

U.S. PATENT DOCUMENTS

| 3,945,129 | A | * | 3/1976 | Bergkvist ................. 33/399 |
| 4,932,131 | A | * | 6/1990 | McMurtry et al. ........... 33/1 M |
| 5,396,712 | A | * | 3/1995 | Herzog ........................ 33/503 |
| 5,402,582 | A | * | 4/1995 | Raab ........................... 33/503 |
| 5,611,147 | A | * | 3/1997 | Raab ........................... 33/503 |
| 5,768,768 | A | * | 6/1998 | Best ............................. 29/792 |
| 5,956,857 | A | * | 9/1999 | Raab ........................... 33/503 |
| 6,253,458 | B1 | * | 7/2001 | Raab et al. ................... 33/503 |
| 6,435,297 | B1 | * | 8/2002 | Barber et al. ............... 180/291 |
| 6,493,957 | B1 | * | 12/2002 | Takatsuji et al. ............. 33/502 |
| 2002/0087233 | A1 | * | 7/2002 | Raab ........................... 700/262 |
| 2002/0196833 | A1 | * | 12/2002 | Igaki et al. ..................... 374/6 |

FOREIGN PATENT DOCUMENTS

| EP | 640902 A2 | * | 3/1995 |
| JP | 02309223 A | * | 12/1990 |

* cited by examiner

*Primary Examiner*—Diego Gutierrez
*Assistant Examiner*—Travis Reis
(74) *Attorney, Agent, or Firm*—Cantor Colburn LLP

(57) ABSTRACT

A portable coordinate measurement machine comprises an articulated arm having jointed arm segments. The arm includes joint assemblies which include at least two read heads in communication with a periodic pattern of a measurable characteristic, the pattern and read heads being positioned within the joint so as to be rotatable with respect to each other.

44 Claims, 47 Drawing Sheets

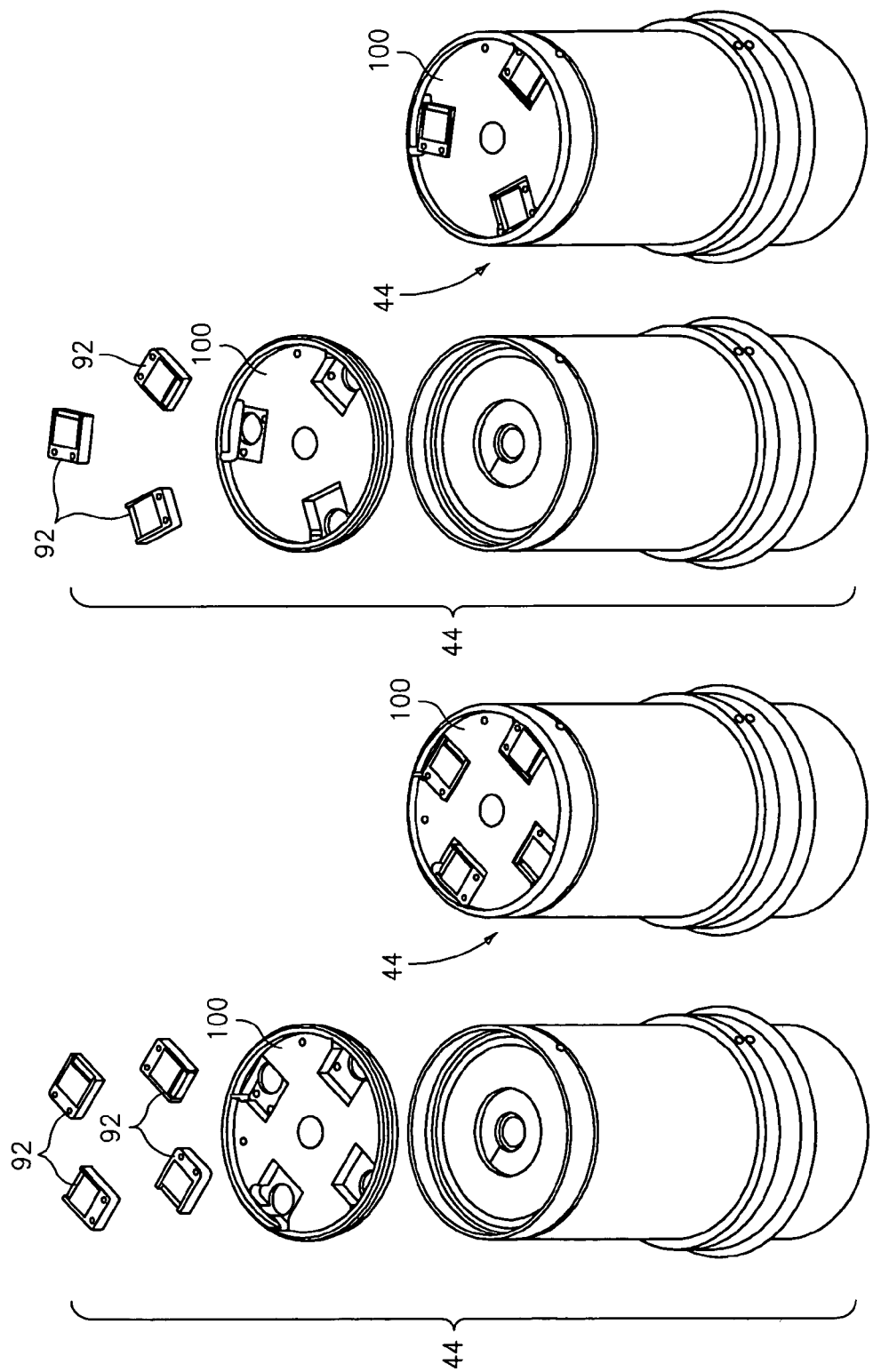

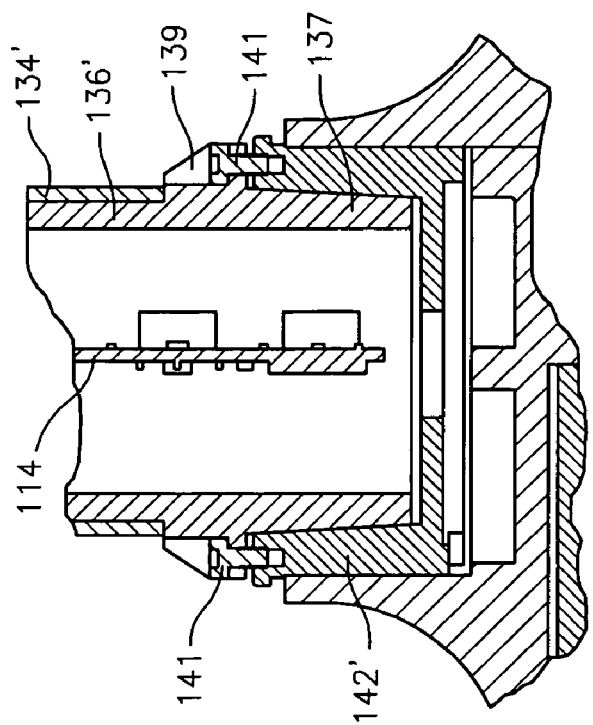
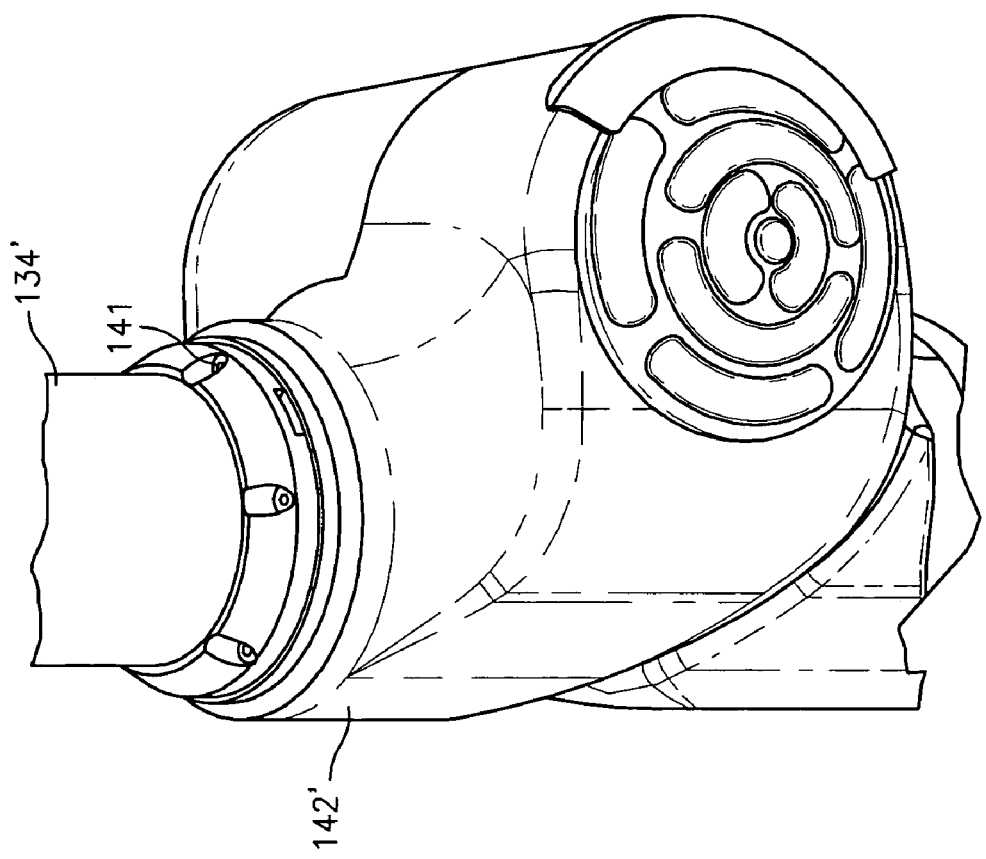
FIG. 25B
FIG. 25A

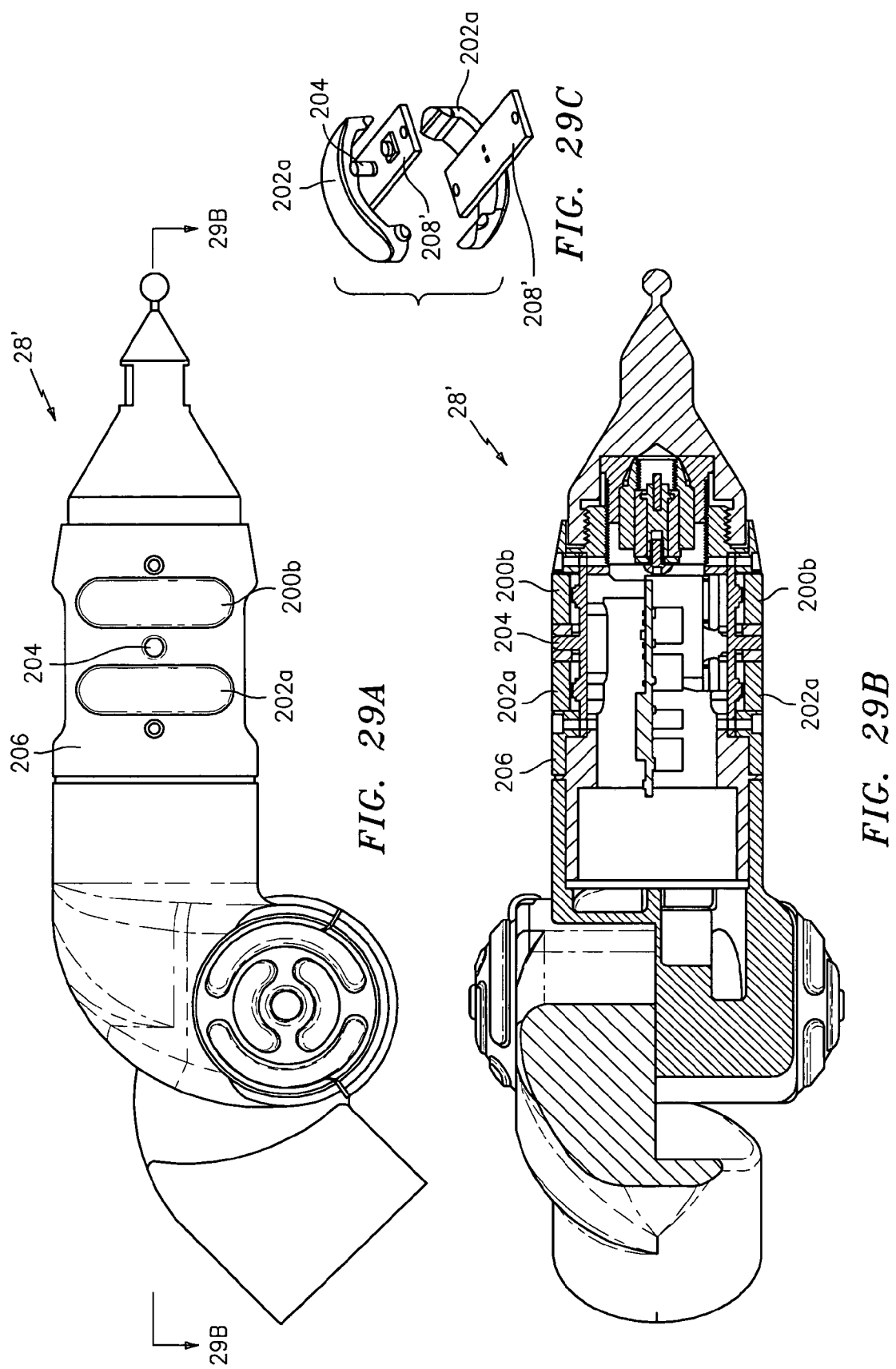

PORTABLE COORDINATE MEASUREMENT MACHINE

CROSS-REFERENCE TO RELATED APPLICATION

This application is a continuation of application Ser. No. 10/366,589 filed Feb. 13, 2003 and claims the benefit of provisional application Nos. 60/357,599 filed Feb. 14, 2002 and 60/394,908 filed Jul. 10, 2002, all of the contents of both provisional applications being incorporated herein by reference.

BACKGROUND OF THE INVENTION

1. Field of the Invention

The invention relates in general to coordinate measurement machines (CMMs) and in particular to portable CMM's having an articulated arm.

2. Prior Art

Currently, portable articulated arms are provided as a measurement system with a host computer and applications software. The articulated arm is commonly used to measure points on an object and these measured points are compared to computer-aided design (CAD) data stored on the host computer to determine if the object is within the CAD specification. In other words, the CAD data is the reference data to which actual measurements made by the articulated arm are compared. The host computer may also contain applications software that guides the operator through the inspection process. For many situations involving complicated applications, this arrangement is appropriate since the user will observe the three-dimensional CAD data on the host computer while responding to complex commands in the applications software.

An example of a prior art portable CMM for use in the above-discussed measurement system is disclosed in U.S. Pat. No. 5,402,582 ('582), which is assigned to the assignee hereof and incorporated herein by reference. The '582 patent discloses a conventional three-dimensional measuring system composed of a manually operated multi-jointed articulated arm having a support base on one end thereof and a measurement probe at the other end. A host computer communicates to the arm via an intermediate controller or serial box. It will be appreciated that in the '582 patent, the arm will electronically communicate with the serial box which, in turn, electronically communicates with the host computer. Commonly assigned U.S. Pat. No. 5,611,147 ('147), which is again incorporated herein by reference, discloses a similar CMM having an articulated arm. In this patent, the articulated arm includes a number of important features including an additional rotational axis at the probe end thus providing for an arm with either a two-one-three or a two-two-three joint configuration (the latter case being a 7 axis arm) as well as improved pre-loaded bearing constructions for the bearings in the arm.

Still other relevant prior art CMMs include commonly assigned U.S. Pat. No. 5,926,782 ('782), which provides an articulated arm having lockable transfer housings for eliminating one or more degrees of freedom and U.S. Pat. No. 5,956,857 ('857) which provides an articulated arm having a quick disconnect mounting system.

More current portable CMMs of the type described herein do not necessitate the use of an intermediate controller or serial box since the functionality thereof is now incorporated in the software provided by the host computer. For example, commonly assigned U.S. Pat. No. 5,978,748 ('748), which is incorporated herein by reference, discloses an articulated arm having an on-board controller which stores one or more executable programs and which provides the user with instructions (e.g., inspection procedures) and stores the CAD data that serves as the reference data. In the '748 patent, a controller is mounted to the arm and runs the executable program which directs the user through a process such as an inspection procedure. In such a system, a host computer may be used to generate the executable program. The controller mounted to the arm is used to run the executable program but cannot be used to create executable programs or modify executable programs. By way of analogy to video gaming systems, the host computer serves as the platform for writing or modifying a video game and the arm mounted controller serves as the platform for playing a video game. The controller (e.g., player) cannot modify the executable program. As described in the '748 patent, this results in a lower cost three dimensional coordinate measurement system by eliminating the need for a host computer for each articulated arm. U.S. application Ser. No. 09/775,236 ('236), assigned to the assignee hereof and incorporated herein by reference, discloses a method and system for delivering executable programs to users of coordinate measurement systems of the type disclosed in the '748 patent. The method includes receiving a request to create an executable program from a customer and obtaining information related to the executable program. The executable program is then developed which guides an operator through a number of measurement steps to be performed with the three dimensional coordinate measuring system. The executable program is delivered to the customer, preferably over an on-line network such as the Internet.

Commonly assigned U.S. Pat. No. 6,131,299 ('299), (all the contents of which is incorporated herein by reference), discloses an articulated arm having a display device positioned thereon to allow an operator to have convenient display of positional data and system menu prompts. The display device includes for example, LEDs which indicate system power, transducer position status and error status. U.S. Pat. No. 6,219,928 ('928), which is assigned to the assignee and incorporated herein by reference, discloses a serial network for the articulated arm. The serial network communicates data from transducers located in the arm to a controller. Each transducer includes a transducer interface having a memory which stores transducer data. The controller serially addresses each memory and the data is transferred from the transducer interface memory to the controller. Commonly assigned U.S. Pat. Nos. 6,253,458 ('458) and 6,298,569 ('569) both disclose adjustable counter balance mechanisms for articulated arm portable CMMs of the type described herein.

While well suited for their intended purposes, there is a continued and perceived need in the industry for improved portable CMMs that are easier to use, more efficient to manufacture, provide improved features and can be sold at a lower cost.

SUMMARY OF THE INVENTION

In accordance with the present invention, a portable CMM comprises an articulated arm having jointed arm segments. In one embodiment, the arm segments include bearing/encoder cartridges which are attached to each other at predetermined angles using a dual socket joint. Each cartridge contains at least one, and preferably two, preloaded bearing assemblies and an encoder, preferably an optical encoder, all assembled in a cylindrical housing. Preferably, two or more encoder read heads are used in each joint so as to cause cancellation effects that can be averaged. The arm segments may be threadably interconnected with the arm tapering from a wider diameter at its base to a narrower diameter at the probe end.

In accordance with another embodiment of the present invention, one or more of the jointed arm segments of the articulated arm includes replaceable protective coverings and/or bumpers to limit high impact shock and abrasion as well as to provide an ergonomically and aesthetically pleasing gripping location.

In still another embodiment of this invention, the articulated arm includes an integrated, internal counter balance in one of the hinge joints. This counter balance utilizes a coil spring having relatively wide end rings and narrower internal rings machined from a metal cylinder. The spring further includes at least two (and preferably three) posts for locking into the hinge structure of the arm as well as a spring adjustment mechanism.

In still another embodiment of this invention, the articulated arm includes a measurement probe at one end thereof. This measurement probe has an integrally mounted touch trigger probe which is easily convertible to a conventional hard probe. The measurement probe also includes improved switches and a measurement indicator light. In one embodiment, the switches have an arcuate, oblong shape and are easily arctuatable by the operator. The improved switches include differing color, surface texture and/or height which allow the operator to easily distinguish between them while the indicator light preferably is color-coded for ease of operation.

Another embodiment of the present invention includes an articulated arm having an integral, on-board power supply recharger unit. This power supply/recharger unit allows for a fully portable CMM and makes it far easier to use the CMM at a remote location and/or without the need for a directly cabled articulated arm.

Still another embodiment of the present invention includes an articulated arm having a measurement probe at one end. The measurement probe includes a rotatable handle cover and switch assembly which surrounds the measurement probe. The rotatable handle cover and switch assembly allows the measurement probe to be more easily held and activated regardless of hand position. The use of the rotatable handle cover further precludes the necessity for having a third axis of rotation at the probe end thus allowing for a lower cost and more easily constructed portable CMM (relative to 7 axis CMMs or CMMs having a third angle of rotation at the measurement probe).

In another embodiment of this invention, a portable CMM includes an articulated arm having jointed arm segments with a measurement probe at one end thereof and a base at the other end thereof. In accordance with a novel feature of this embodiment, the base has an integrated magnetic mount therein for attaching the arm to a magnetic surface. This integrated magnetic mount is preferably threadably connected to the articulated arm and has an on/off lever for ease of use (which lever preferably automatically engages when the mount is positioned onto a magnetic surface).

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are number alike in the several FIGURES:

FIG. 9B is an exploded, perspective view, similar to FIG. 9, but showing four read heads;

FIG. 9C is a perspective view of FIG. 9B after assembly;

FIG. 9D is an exploded, perspective view, similar to FIG. 9, but showing three read heads;

FIG. 9E is a perspective view of FIG. 9D after assembly;

FIG. 25A is a perspective view of the interconnection between a long and short joint in accordance with an alternative embodiment of the present invention;

FIG. 25B is a cross-sectional elevation view longitudinally through a portion of FIG. 25A;

FIG. 29A is a side elevation view of another embodiment of a measurement probe in accordance with the present invention;

FIG. 29B is a cross-sectional elevation view along the line 29B—29B of FIG. 29A;

FIG. 29C is a perspective view of a pair of "take" or "confirm" switches used in FIGS. 29A–B;

DESCRIPTION OF THE PREFERRED EMBODIMENT

Figure 1:
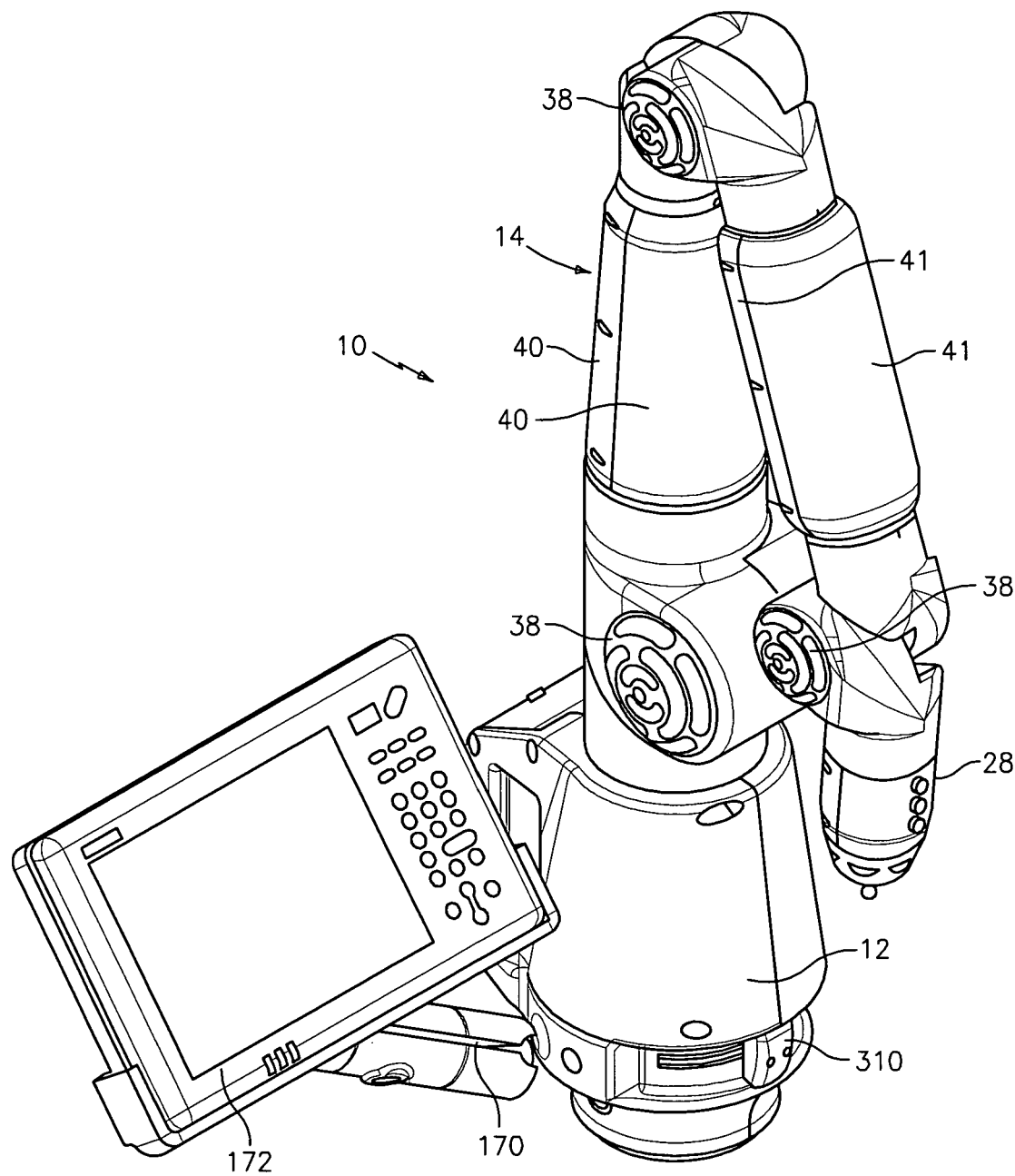
FIG. 1 is a front perspective view of the portable CMM of the present invention including an articulated arm and attached host computer.
Figure 2:
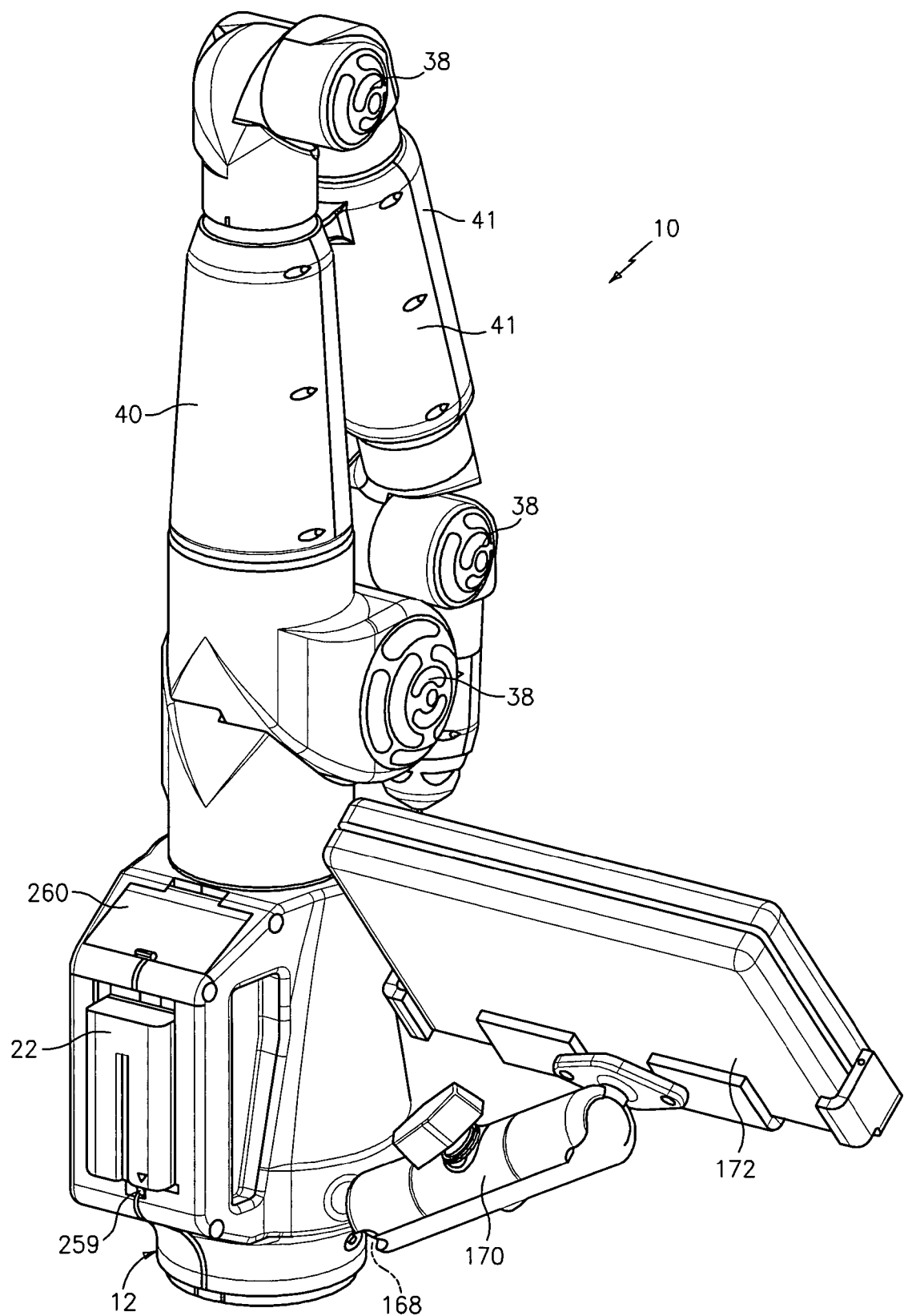
FIG. 2 is a rear perspective view of the CMM of FIG. 1.
Figure 3:
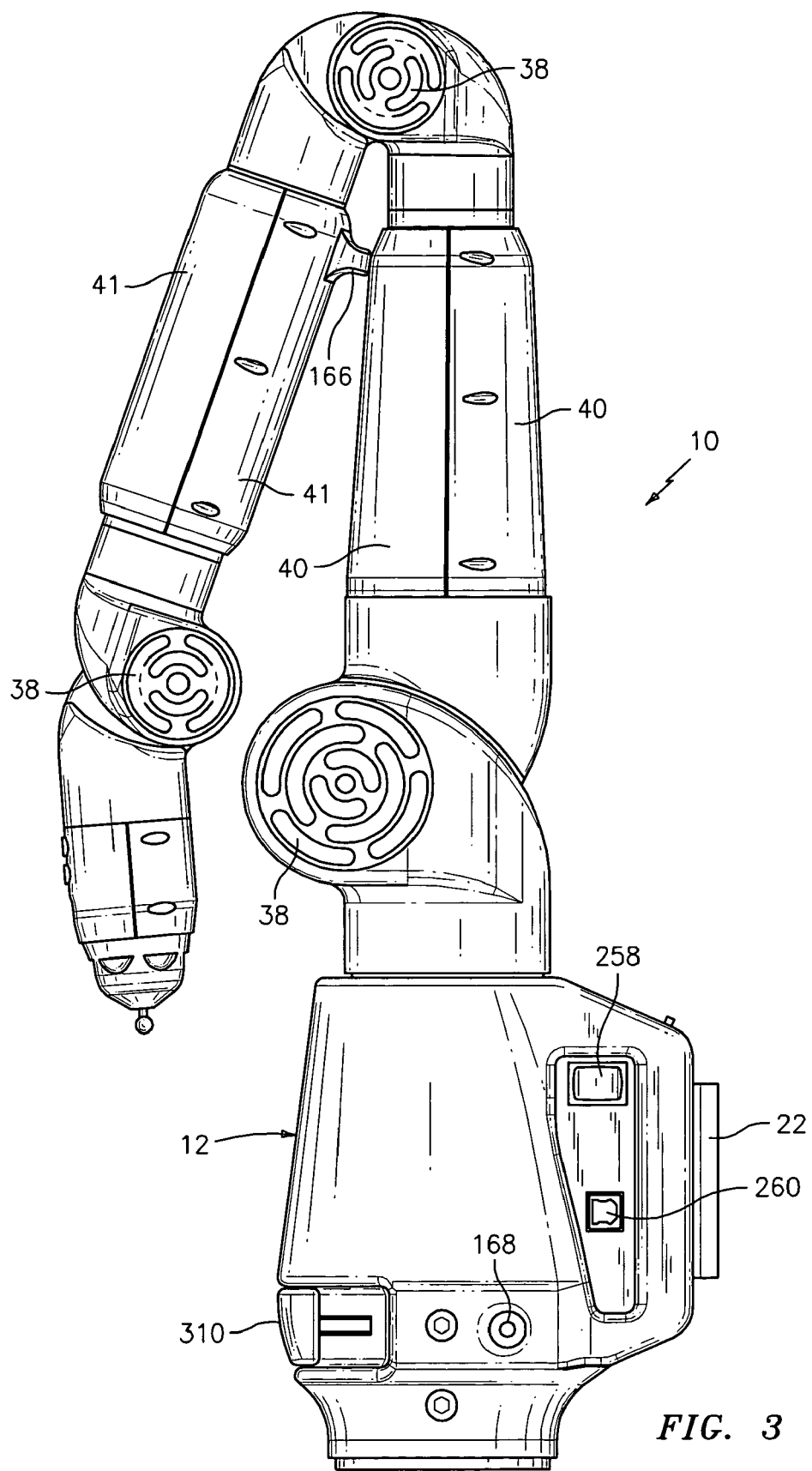
FIG. 3 is a right side view of the CMM of FIG. 1 (with the host computer removed)

Referring first to FIGS. 1–3, the CMM of the present invention is shown generally at 10. CMM 10 comprises a multijointed, manually operated, articulated arm 14 attached at one end to a base section 12 and attached at the other end to a measurement probe 28. Arm 14 is constructed of basically two types of joints, namely a long joint (for swivel motion) and a short joint (for hinge motion). The long joints are positioned substantially axially or longitudinally along the arm while the short joints are preferably positioned at 90° to the longitudinal axis of the arm. The long and short joints are paired up in what is commonly known as a 2-2-2 configuration (although other joint configurations such as 2-1-2, 2-1-3, 2-2-3, etc. may be employed) Each of these joint pairs are shown in FIGS. 4–6.

Figure 4:
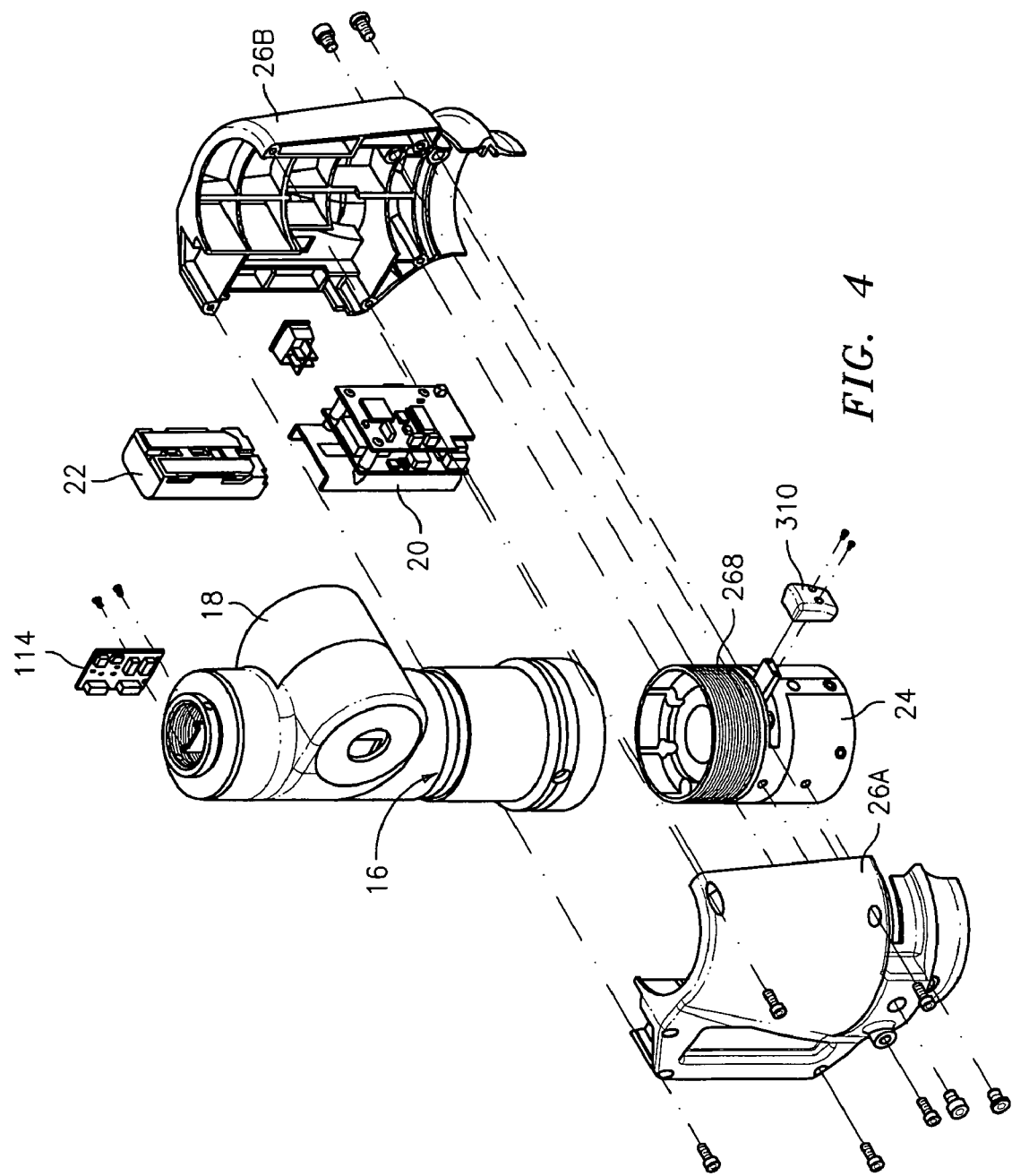
FIG. 4 is a partially exploded, perspective view of the CMM of the present invention depicting the base and the first articulated arm section.

FIG. 4 depicts an exploded view of the first joint pair, namely long joint 16 and short joint 18. FIG. 4 also depicts an exploded view of the base 12 including a portable power supply electronics 20, a portable battery pack 22, a magnetic mount 24 and a two-piece base housing 26A and 26B. All of these components will be discussed in more detail hereinafter.

Significantly, it will be appreciated that the diameters of the various primary components of articulated arm 14 will taper from the base 12 to the probe 28. Such taper may be continuous or, as in the embodiment shown in the FIGURES, the taper may be discontinuous or step-wise. In addition, each of the primary components of articulated arm 14 may be threadably attached thereby eliminating a large number of fasteners associated with prior art CMMs. For example, and as will be discussed hereafter, magnetic mount 24 is threadably attached to first long joint 16. Preferably, such threading is tapered threading which is self-locking and provides for increased axial/bending stiffness. Alternatively, as shown in FIGS. 25A and 25B, and as discussed hereafter, the primary components of the articulated arm may have complimentary tapered male and female ends with associated flanges, such flanges being bolted together.

Figure 5:
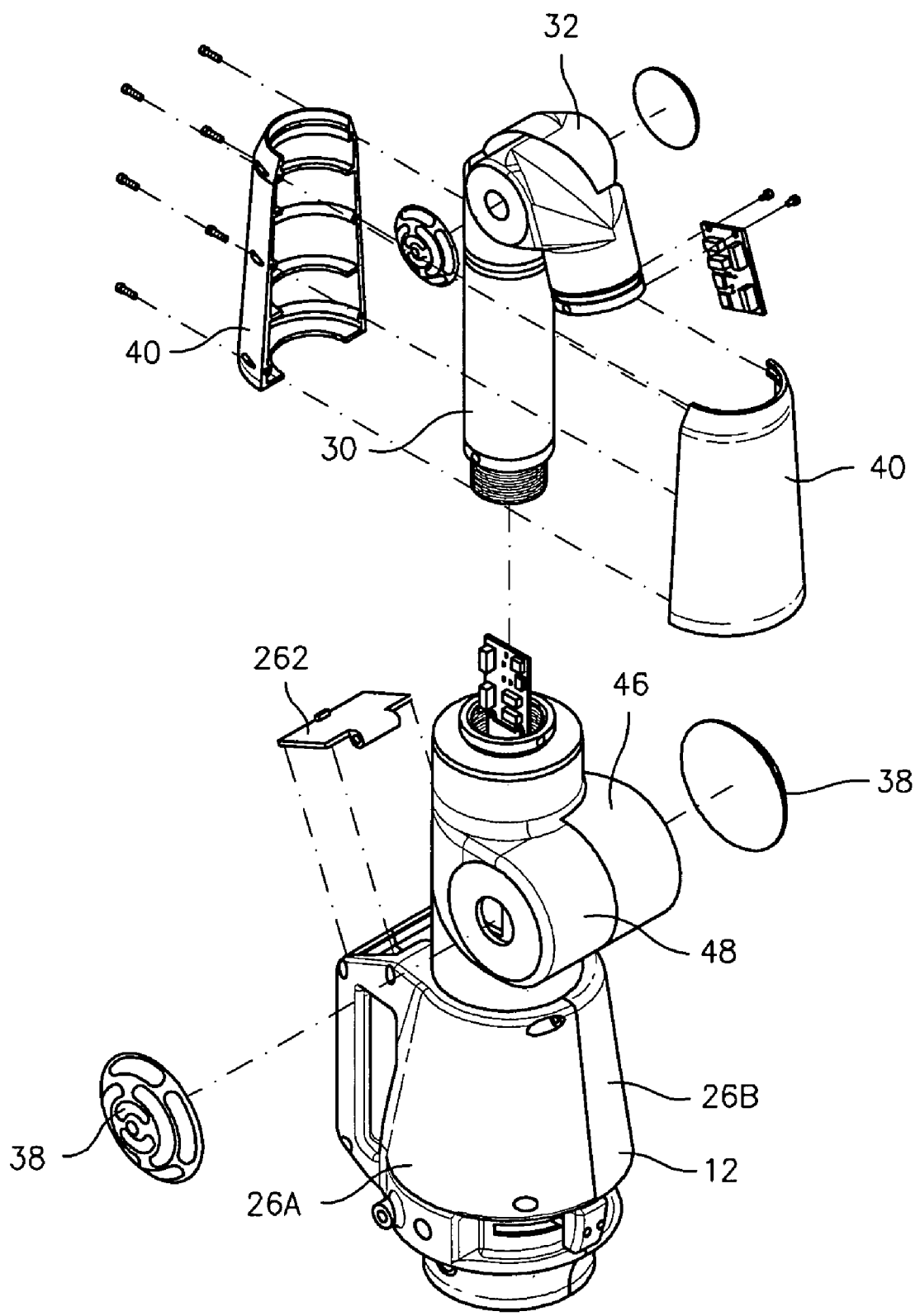
FIG. 5 is a partially exploded, perspective view of the CMM of the present invention depicting the base, first arm section and partially exploded second arm section.
Figure 6:
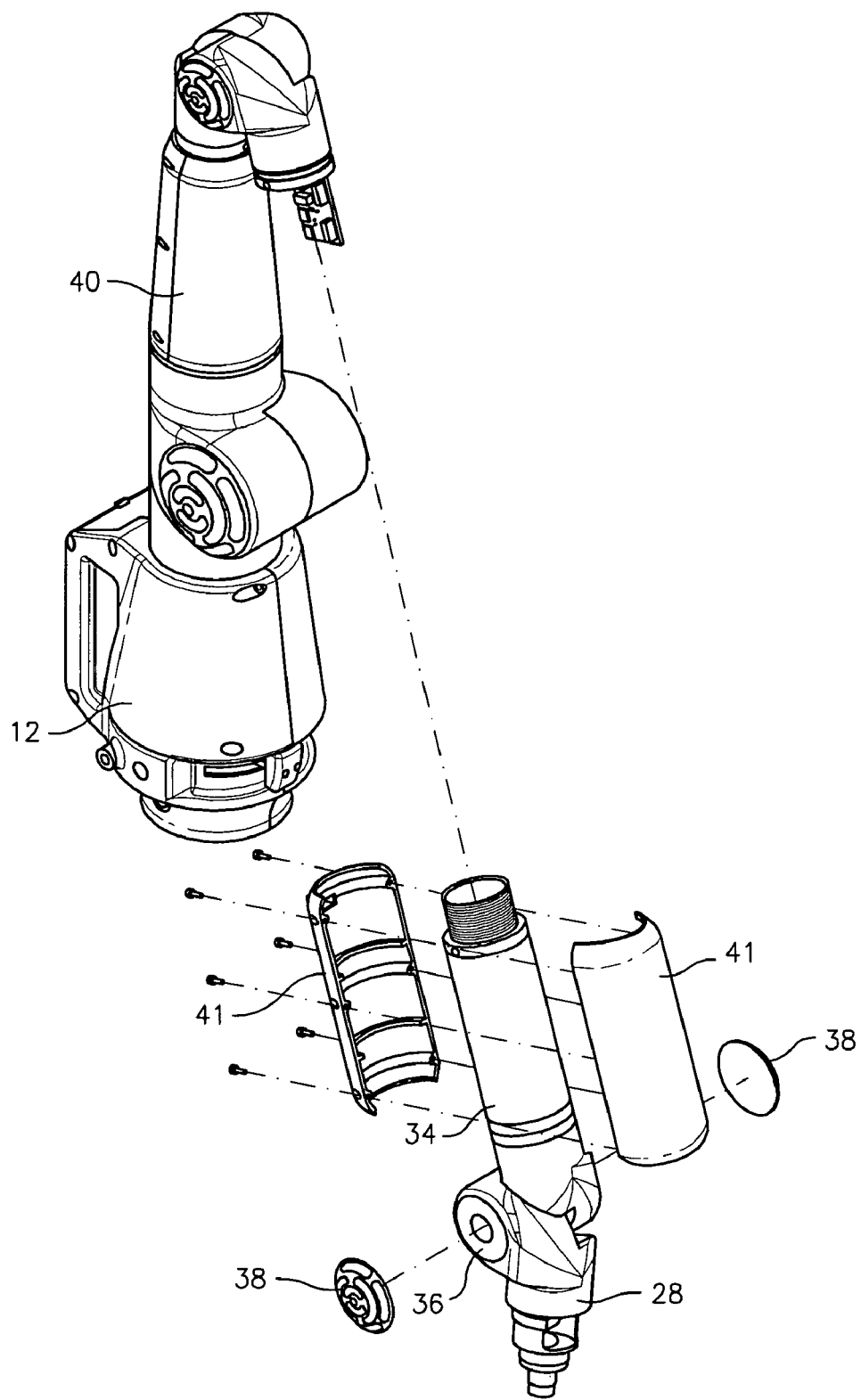
FIG. 6 is a partially exploded, perspective view of the CMM of the present invention depicting the base, first arm section, second arm section and partially exploded third arm section.

Referring to FIG. 5, the second set of a long and short joint is shown being attached to the first set. The second joint set includes long joint 30 and short joint 32. As is consistent with the attachment of magnetic mount 24 to long joint 16, long joint 30 is threadably attached to threading on the interior surface of long joint 16. Similarly, and with reference to FIG. 6, the third joint set includes a third long joint 34 and a third short joint 36. Third long joint 34 threadably attaches to threading on the interior surface of second short joint 32. As will be discussed in more detail hereinafter, probe 28 threadably attaches to short joint 36.

Preferably, each short joint 18, 32 and 36 is constructed of cast and/or machined aluminum components or alternatively, lightweight stiff alloy or composite. Each long joint 16, 30 and 34 is preferably constructed of cast and/or machined aluminum, lightweight stiff alloy and/or fiber reinforced polymer. The mechanical axes of the three aforementioned joint pairs (i.e., pair 1 comprises joint pairs 16, 18, pair 2 comprises joint pairs 30, 32 and pair 3 comprises joint pairs 34, 36) are aligned with respect to the base for smooth, uniform mechanical behavior. The aforementioned tapered construction from base 12 to probe 28 is preferred to promote increased stiffness at the base where loads are greater and smaller profile at the probe or handle where unobstructed use is important. As will be discussed in more detail hereinafter, each short joint is associated with a protective bumper 38 on either end thereof and each long probe is covered with a protective sleeve 40 or 41. It will be appreciated that the first long joint 16 is protected by the base housing 26A, B which provides the same type of protection as sleeves 40, 41 provide for the second and third long joints 30, 34.

Figure 7:
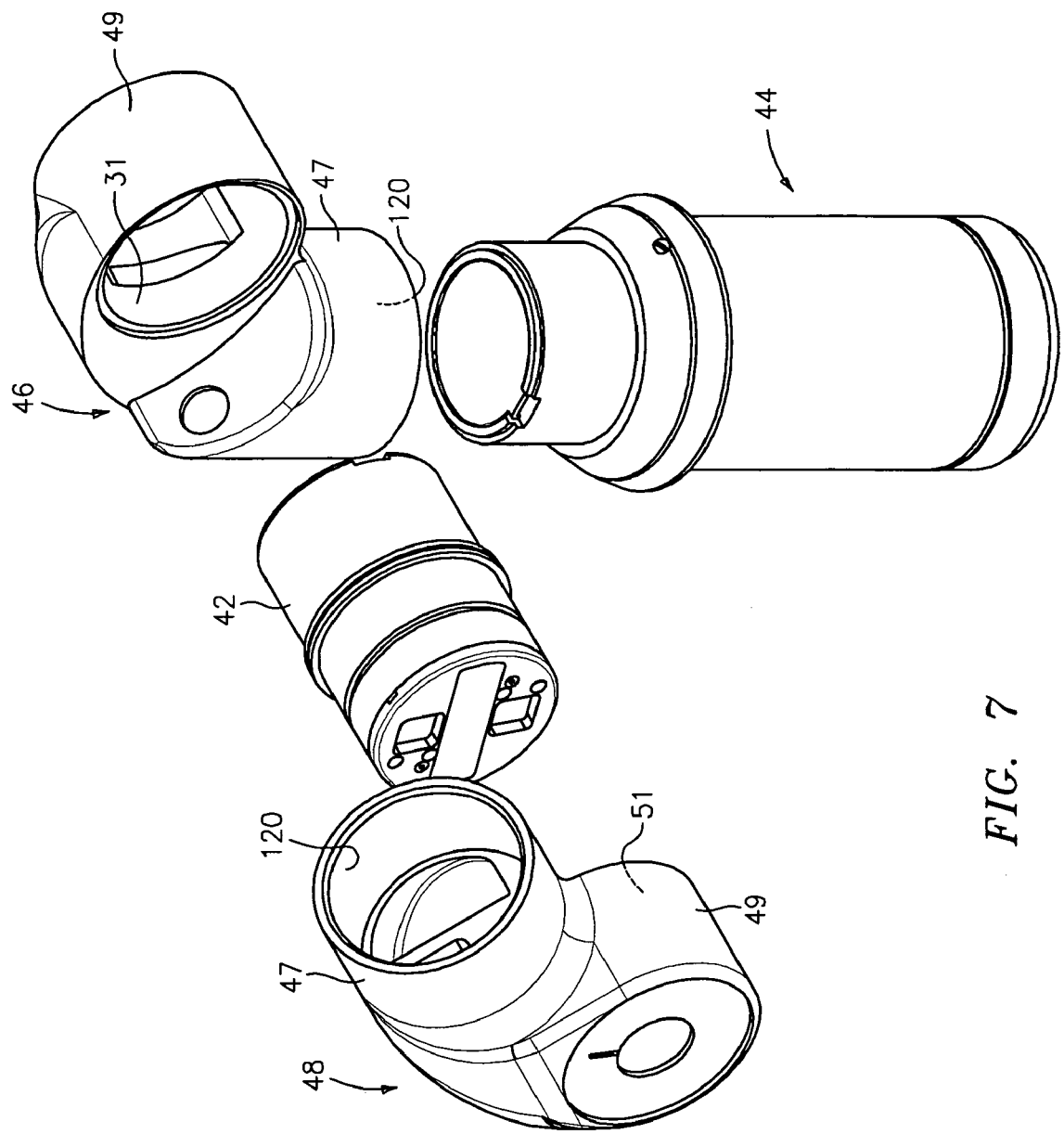
FIG. 7 is an exploded, perspective view depicting a pair of encoder/bearing cartridges being assembled between two dual socket joints in accordance with the present invention.
Figure 8:
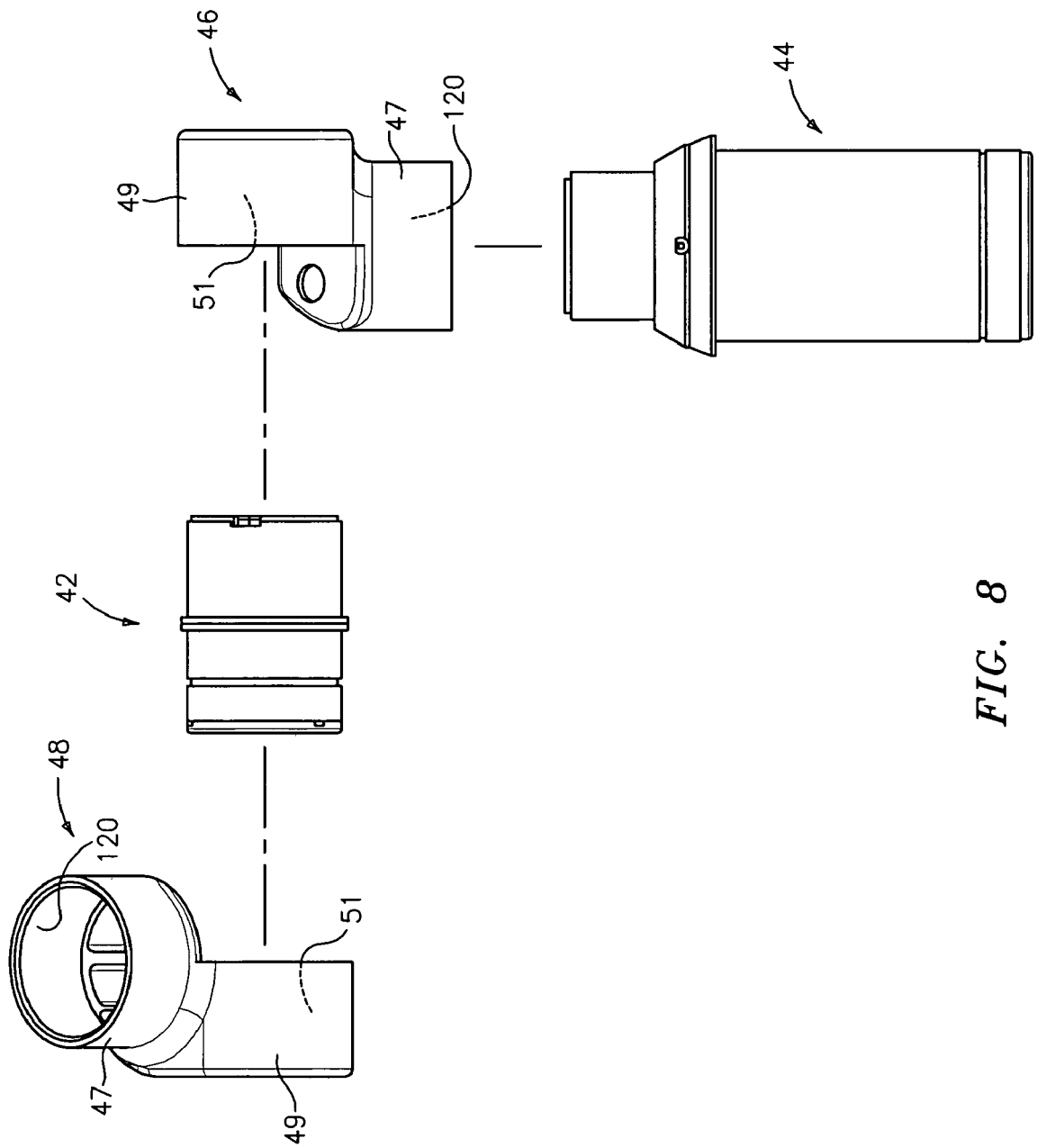
FIG. 8 is a front elevation view of the bearing/encoder cartridges and dual socket joints of FIG. 7.

In accordance with an important feature of the present invention, each of the joints of the articulated arm utilizes a modular bearing/encoder cartridge such as the short cartridge 42 and the long cartridge 44 shown in FIGS. 7 and 8. These cartridges 42, 44 are mounted in the openings of dual socket joints 46, 48. Each socket joint 46, 48 includes a first cylindrical extension 47 having a first recess or socket 120 and a second cylindrical extension 49 having a second recess or socket 51. Generally, sockets 120 and 51 are positioned 90 degrees to one another although other relative, angular configurations may be employed. Short cartridge 42 is positioned in each socket 51 of dual socket joints 46 and 48 to define a hinge joint, while long cartridge 44 is positioned in socket 120 of joint 46 (see FIG. 25) and long cartridge 44' (see FIG. 26) is positioned in socket 120 of joint 48 to each define a longitudinal swivel joint. Modular bearing/encoder cartridges 42, 44 permit the separate manufacture of a pre-stressed or preloaded dual bearing cartridge on which is mounted the modular encoder components. This bearing encoder cartridge can then be fixedly attached to the external skeletal components (i.e., the dual socket joints 46, 48) of the articulated arm 14. The use of such cartridges is a significant advance in the field as it permits high quality, high speed production of these sophisticated subcomponents of articulated arm 14.

Figure 9:
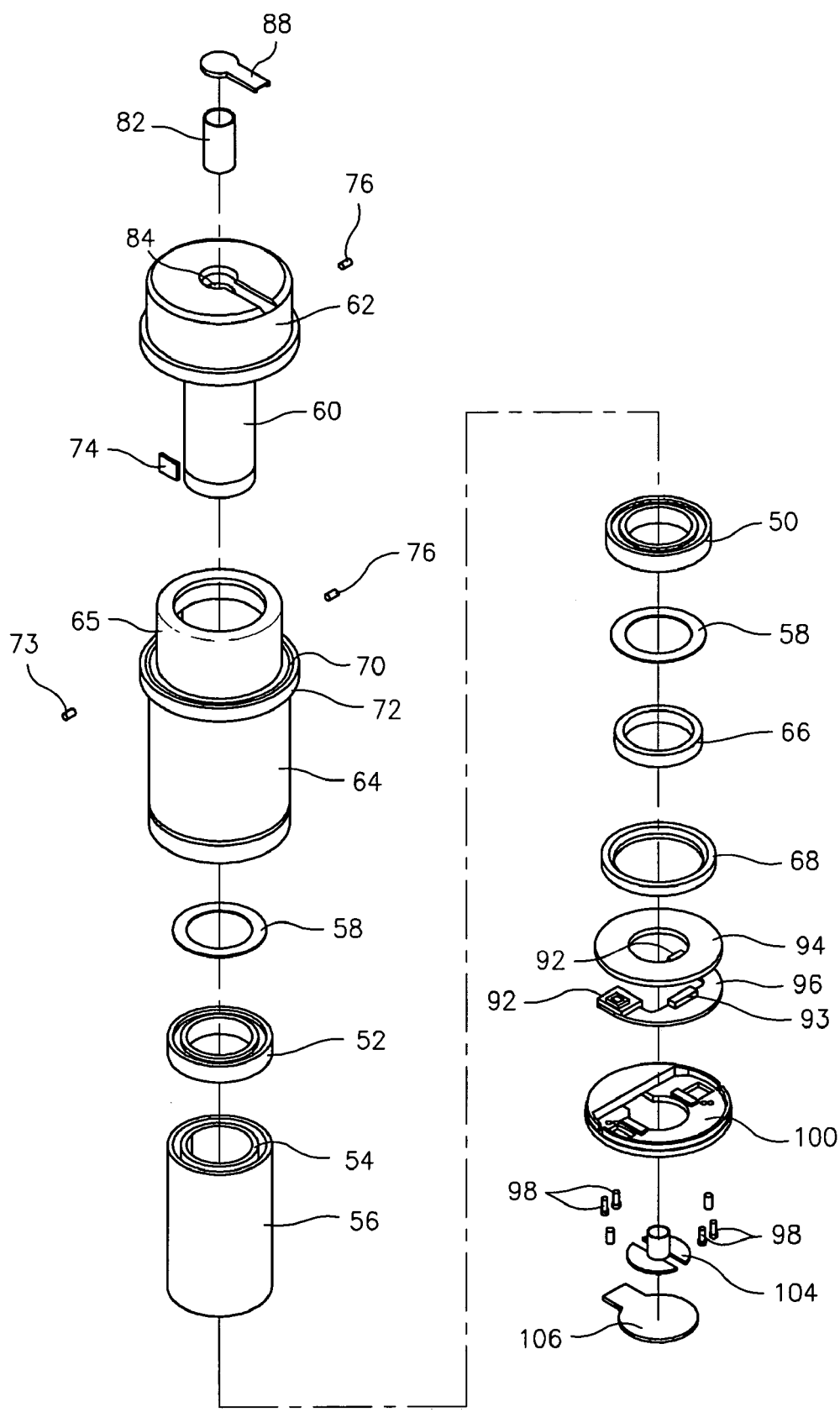
FIG. 9 is an exploded, perspective view of a short bearing/encoder cartridge in accordance with the present invention.
Figure 10:
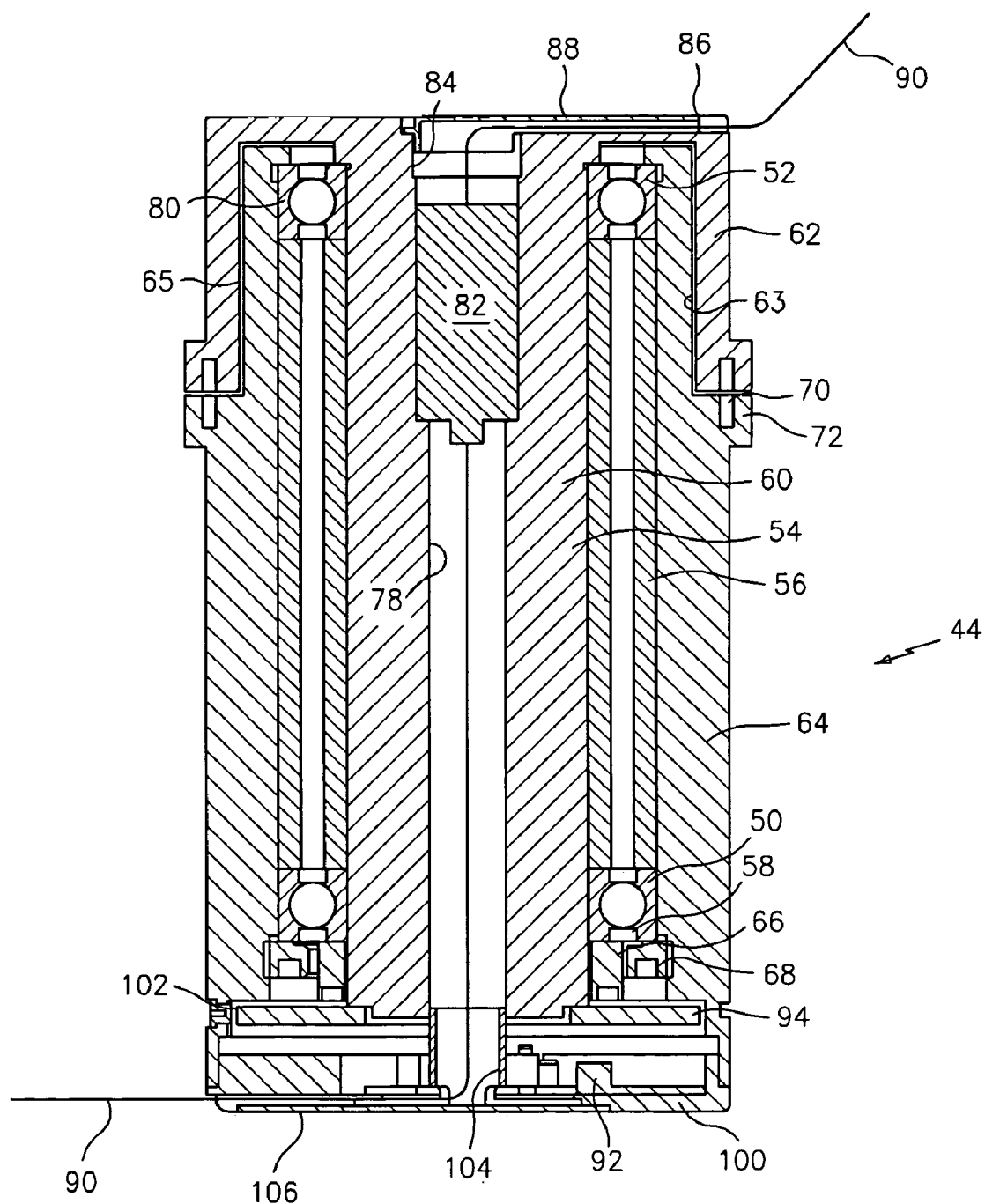
FIG. 10 is a cross-sectional elevation view of the cartridge of FIG. 9.

In the embodiment described herein, there are four different cartridge types, two long axial cartridges for joints 30 and 34, one base axial cartridge for joint 16, one base cartridge (which includes a counter balance) for short joint 18 and two hinge cartridges for joints 32 and 36. In addition, as is consistent with the taper of articulated arm 14, the cartridges nearest the base (e.g., located in long joint 16 and short joint 18) have a larger diameter relative to the smaller diameters of joints 30, 32, 34 and 36. Each cartridge includes a pre-loaded bearing arrangement and a transducer which in this embodiment, comprises a digital encoder. Turning to FIGS. 9 and 10, the cartridge 44 positioned in axial long joint 16 will now be described.

Cartridge 44 includes a pair of bearings 50, 52 separated by an inner sleeve 54 and outer sleeve 56. It is important that bearings 50, 52 are pre-loaded. In this embodiment, such preload is provided by sleeves 54, 56 being of differing lengths (inner sleeve 54 is shorter than outer sleeve 56 by approximately 0.0005 inch) so that upon tightening, a preslected preload is generated on bearings 50, 52. Bearings 50, 52 are sealed using seals 58 with this assembly being rotatably mounted on shaft 60. At its upper surface, shaft 60 terminates at a shaft upper housing 62. An annulus 63 is defined between shaft 60 and shaft upper housing 62. This entire assembly is positioned within outer cartridge housing 64 with the shaft and its bearing assembly being securely attached to housing 64 using a combination of an inner nut 66 and an outer nut 68. Note that upon assembly, the upper portion 65 of outer housing 64 will be received within annulus 63. It will be appreciated that the aforementioned preload is provided to bearings 50, 52 upon the tightening of the inner and outer nuts 66, 68 which provide compression forces to the bearings and, because of the difference in length between the inner and outer spacers 54, 56, the desired preload will be applied.

Preferably, bearings 50, 52 are duplex ball bearings. In order to obtain the adequate pre-loading, it is important that the bearing faces be as parallel as possible. The parallelism affects the evenness of the pre-loading about the circumference of the bearing. Uneven loading will give the bearing a rough uneven running torque feel and will result in unpredictable radial run out and reduced encoder performance. Radial run out of the modularly mounted encoder disk (to be discussed below) will result in an undesirable fringe pattern shift beneath the reader head. This results in significant encoder angular measurement errors. Furthermore, the stiffness of the preferably duplex bearing structure is directly related to the separation of the bearings. The farther apart the bearings, the stiffer will be the assembly. The spacers 54, 56 are used to enhance the separation of the bearings. Since the cartridge housing 64 is preferably aluminum, then the spacers 54, 56 will also preferably be made from aluminum and precision machined in length and parallelism. As a result, changes in temperature will not result in differential expansion which would compromise the preload. As mentioned, the preload is established by designing in a known difference in the length of spacers 54, 56. Once the nuts 66, 68 are fully tightened, this differential in length will result in a bearing preload. The use of seals 58 provide sealed bearings since any contamination thereof would effect all rotational movement and encoder accuracy, as well as joint feel.

While cartridge 44 preferably includes a pair of spaced bearings, cartridge 44 could alternatively include a single bearing or three or more bearings. Thus, each cartridge needs at least one bearing as a minimum.

The joint cartridges of the present invention may either have unlimited rotation or as an alternative, may have a limited rotation. For a limited rotation, a groove 70 on a flange 72 on the outer surface of housing 64 provides a cylindrical track which receives a shuttle 74. Shuttle 74 will ride within track 70 until it abuts a removable shuttle stop such as the rotation stop set screws 76 whereupon rotation will be precluded. The amount of rotation can vary depending on what is desired. In a preferred embodiment, shuttle rotation would be limited to less than 720°. Rotational shuttle stops of the type herein are described in more detail in commonly owned U.S. Pat. No. 5,611,147, all of the contents of which have been incorporated herein by reference.

As mentioned, in an alternative embodiment, the joint used in the present invention may have unlimited rotation. In this latter case, a known slip ring assembly is used. Preferably, shaft 60 has a hollow or axial opening 78 therethrough which has a larger diameter section 80 at one end thereof. Abutting the shoulder defined at the intersection between axial openings 78 and 80 is a cylindrical slip ring assembly 82. Slip ring assembly 82 is non-structural (that is, provides no mechanical function but only provides an electrical and/or signal transfer function) with respect to the preloaded bearing assembly set forth in the modular joint cartridge.

While slip ring assembly 82 may consist of any commercially available slip ring, in a preferred embodiment, slip ring assembly 82 comprises a H series slip ring available from IDM Electronics Ltd. of Reading, Berkshire, United Kingdom. Such slip rings are compact in size and with their cylindrical design, are ideally suited for use in the opening 80 within shaft 60. Axial opening 80 through shaft 60 terminates at an aperture 84 which communicates with a channel 86 sized and configured to receive wiring from the slip ring assembly 82. Such wiring is secured in place and protected by a wire cover 88 which snaps onto and is received into channel 86 and aperture 84. Such wiring is shown diagrammatically at 90 in FIG. 10.

Figure 9A:
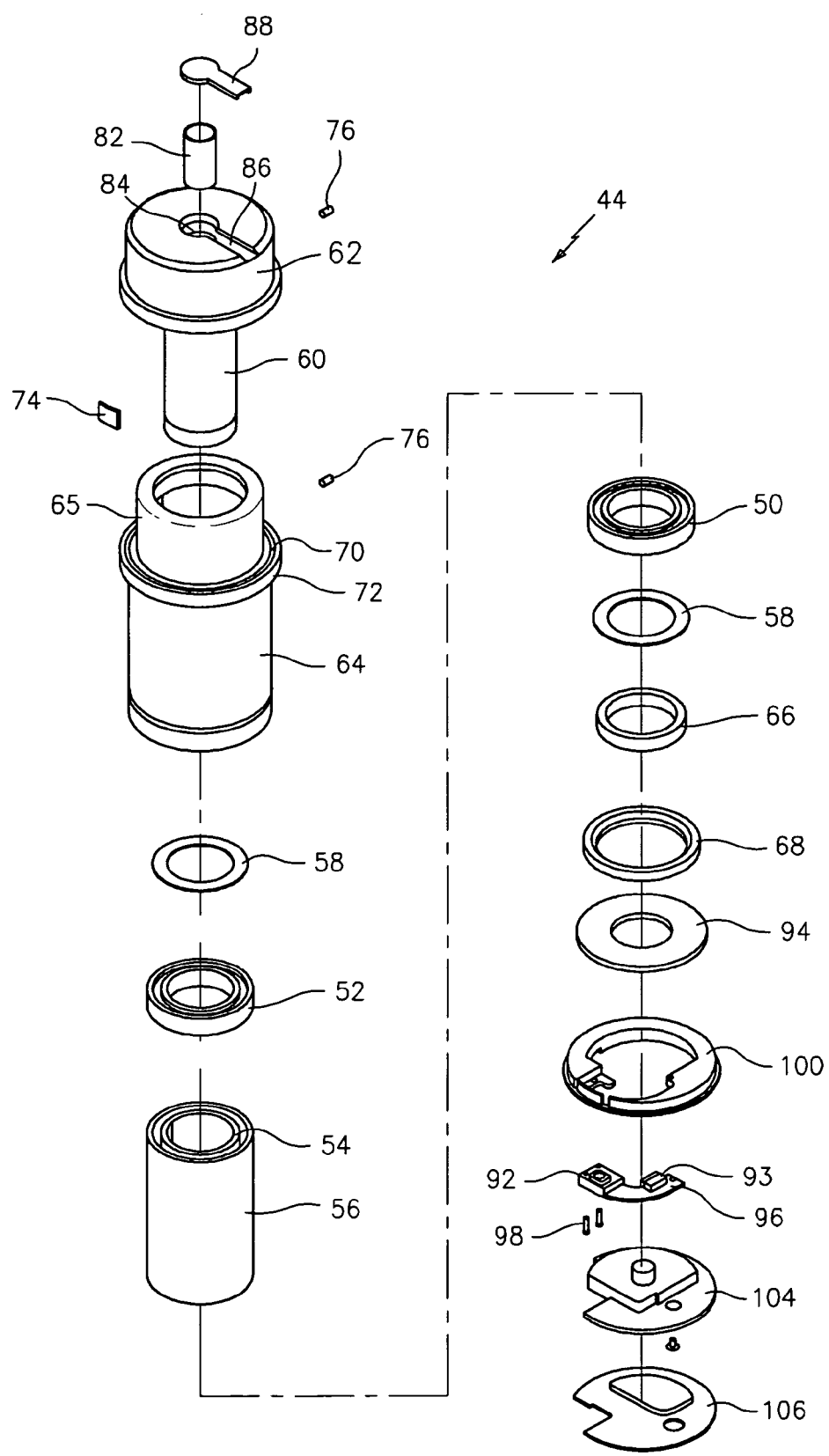
FIG. 9A is an exploded, perspective view similar to FIG. 9, but showing a single read head.

As mentioned, modular cartridge 44 include both a preloaded bearing structure which has been described above as well as a modular encoder structure which will now be described. Still referring to FIGS. 9 and 10, the preferred transducer used in the present invention comprises a modular optical encoder having two primary components, a read head 92 and a grating disk 94. In this embodiment, a pair of read heads 92 are positioned on a read head connector board 96. Connector board 96 is attached (via fasteners 98) to a mounting plate 100. Disk 94 is preferably attached to the lower bearing surface 102 of shaft 60 (preferably using a suitable adhesive) and will be spaced from and in alignment with read heads 92 (which is supported and held by plate 100). A wire funnel 104 and sealing cap 106 provide the final outer covering to the lower end of housing 64. Wire funnel 104 will capture and retain wiring 90 as best shown in FIG. 10. It will be appreciated that the encoder disk 94 will be retained by and rotate with shaft 60 due to the application of adhesive at 102. FIGS. 9 and 10 depict a double read head 92; however, it will be appreciated that more than two read heads may be used or, in the alternative, a single read head as shown in FIG. 9A may be used. FIGS. 9B–E depict examples of modular cartridges 44 with more than two read heads. FIGS. 9B–C show four read heads 92 received in a plate 100 and spaced at 90 degree intervals (although different relative spacings may be appropriate). FIGS. 9D–E show three read heads 92 received in a plate 100 and spaced at 120 degree intervals (although different relative spacing may be appropriate).

In order to properly align disk 94, a hole (not shown) is provided through housing 64 at a location adjacent disk 94. A tool (not shown) is then used to push disk 94 into proper alignment whereupon adhesive between disk 94 and shaft 66 is cured to lock disk 94 in place. A hole plug 73 is then provided through the hole in housing 64.

Figure 12:
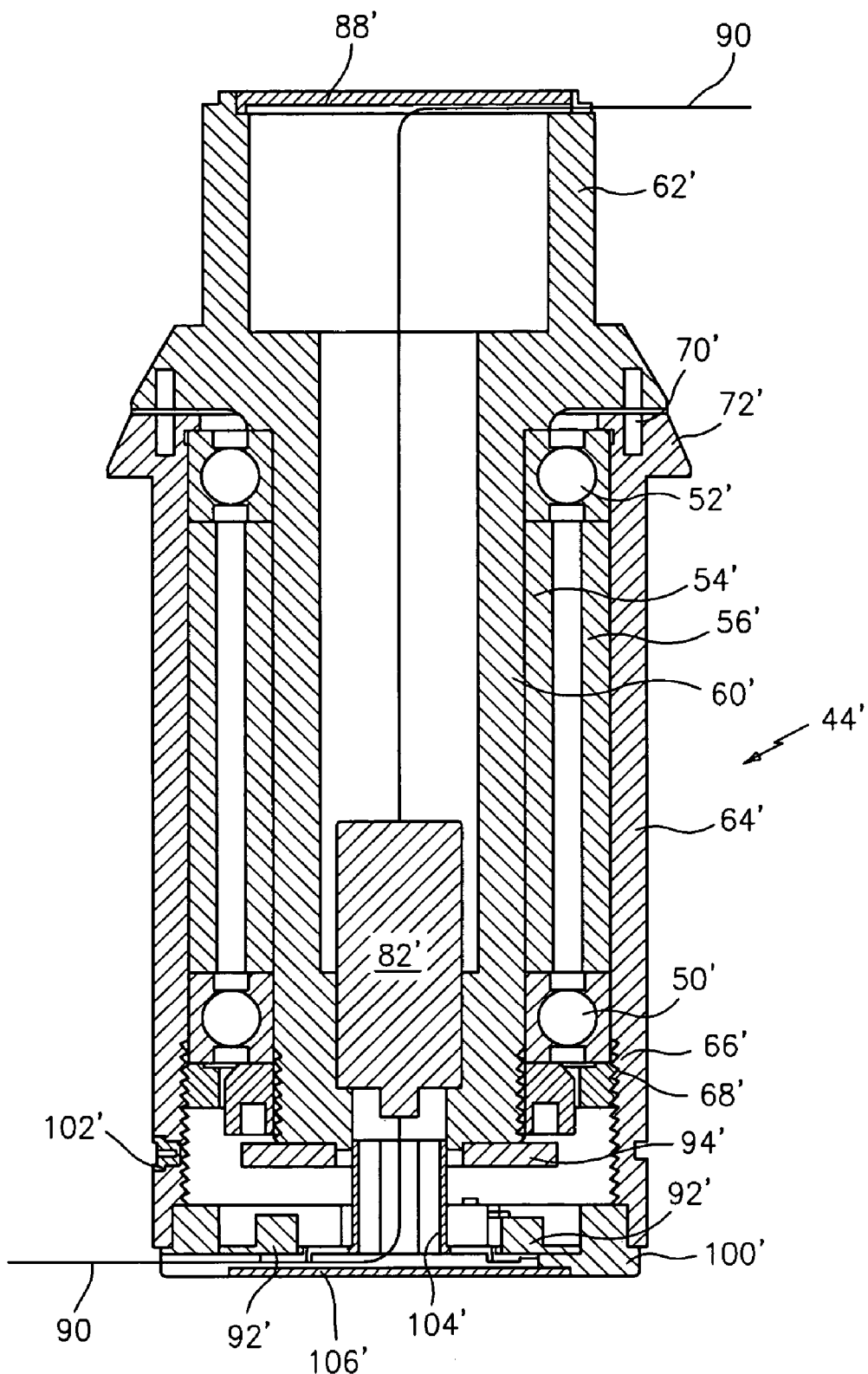
FIG. 12 is a cross-sectional elevation view of the cartridge of FIG. 11.
Figure 12A:
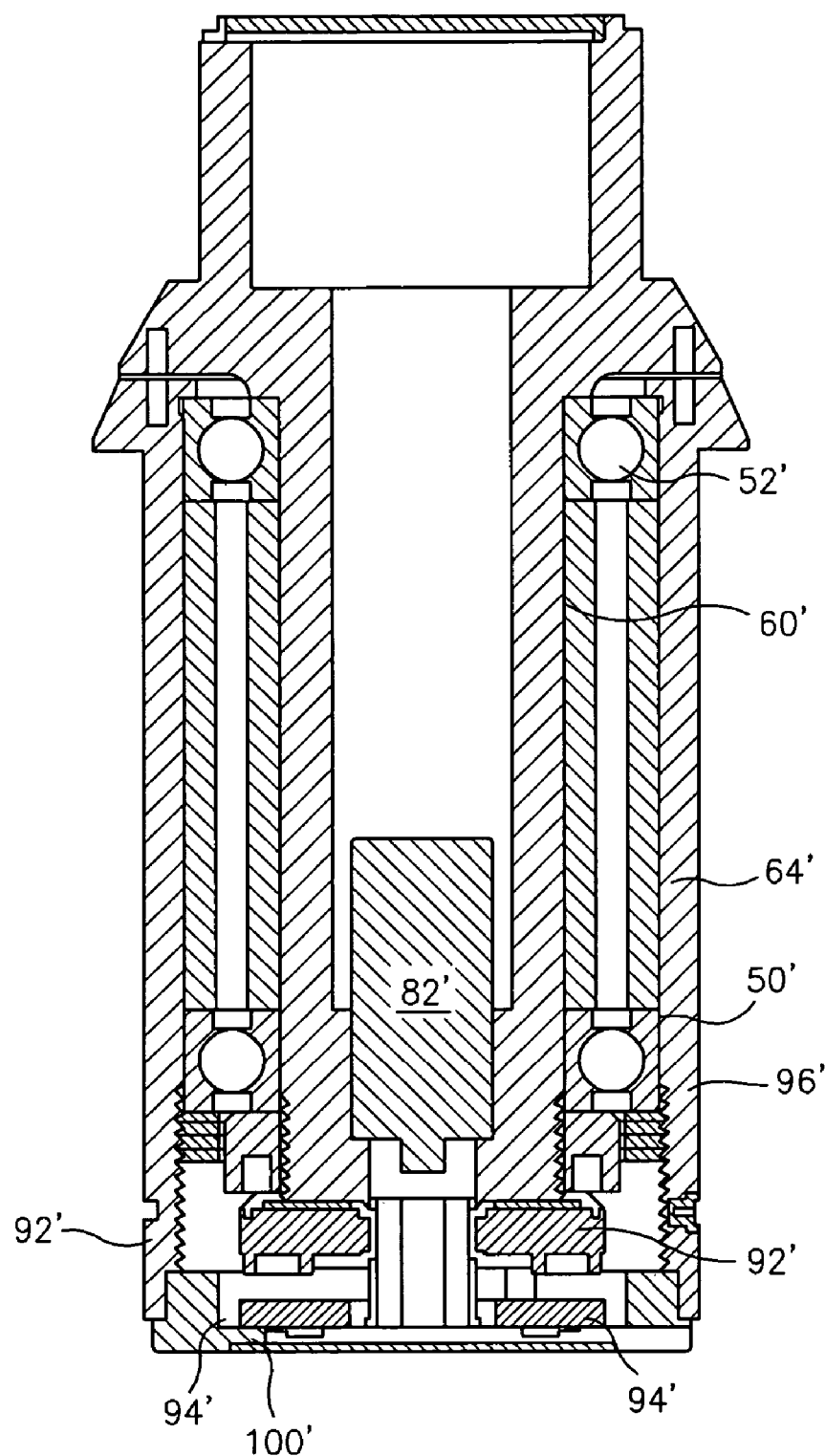
FIG. 12A is a cross-sectional elevation view of the cartridge of FIG. 12 depicting the dual read heads being rotatable with the shaft.

It is important to note that the locations of disk 94 and read head 92 may be reversed whereby disk 94 is attached to housing 56 and read head 92 rotates with shaft 60. Such an embodiment is shown in FIG. 12A where board 96' is attached (via adhesive) to shaft 60' for rotation therewith. A pair of read heads 92' are attached to board 96' and thus will rotate with shaft 60'. The disk 94' is positioned on a support 100' which is attached to housing 64'. In any event, it will be appreciated that either the disk 94 or read head 92 may be mounted for rotation with the shaft. All that is important is that disk 94 and read head 92 be positioned in a cartridge (or joint) so as to be rotatable with respect to each other while maintaining optical communication.

Preferably, the rotational encoder employed in the present invention is similar to that disclosed in U.S. Pat. Nos. 5,486,923 and 5,559,600, all of the contents of which are incorporated herein by reference. Such modular encoders are commercially available from MicroE Systems under the trade name Pure Precision Optics. These encoders are based on physical optics that detect the interference between diffraction orders to produce nearly perfect sinusoidal signals from a photo detector array (e.g., read head(s)) inserted in the fringe pattern. The sinusoidal signals are electronically interpolated to allow detection of displacement that is only a fraction of the optical fringe.

Using a laser light source, the laser beam is first collimated by a lens and then sized by an aperture. The collimated size beam passes through a grating that diffracts the light into discrete orders with the $0^{th}$ and all even orders suppressed by the grating construction. With the 0 order suppressed, a region exists beyond the diverging $3^{rd}$ order where only the $\pm 1^{st}$ orders overlap to create a nearly pure sinusoidal interference. One or more photodetector arrays (read heads) are placed within this region, and produces four channels of nearly pure sinusoidal output when there is relative motion between the grating and the detector. Electronics amplify, normalize and interpolate the output to the desired level of resolution.

The simplicity of this encoder design yields several advantages over prior art optical encoders. Measurements may be made with only a laser source and its collimating optics, a diffractive grating, and a detector array. This results in an extremely compact encoder system relative to the bulkier prior art, conventional encoders. In addition, a direct relationship between the grating and the fringe movement desensitizes the encoder from environmentally induced errors to which prior art devices are susceptible. Furthermore, because the region of interference is large, and because nearly sinusoidal interference is obtained everywhere within this region, alignment tolerances are far more relaxed than is associated with prior art encoders.

A significant advantage of the aforementioned optical encoder is that the precision of the standoff orientation and distance or the distance and orientation of the read head with respect to the encoder disk is far less stringent. This permits a high accuracy rotational measurement and an easy-to-assemble package. The result of using this "geometry tolerant" encoder technology results in a CMM 10 having significant cost reductions and ease of manufacturing.

It will be appreciated that while the preferred embodiment described above includes an optical disk 94, the preferred embodiment of the present invention also encompasses any optical fringe pattern which allow the read head to measure relative motion. As used herein, such fringe pattern means any periodic array of optical elements which provide for the measurement of motion. Such optical elements or fringe pattern could be mounted on a rotating or stationary disk as described above, or alternatively, could be deposited, secured or otherwise positioned or reside upon any of the relatively moving components (such as the shaft, bearings or housing) of the cartridge.

Indeed, the read head and associated periodic array or pattern does not necessarily need to be based on optics (as described above) at all. Rather, in a broader sense, the read head could read (or sense) some other periodic pattern of some other measurable quantity or characteristic which can be used to measure motion, generally rotary motion. Such other measurable characteristics may include, for example, reflectivity, opacity, magnetic field, capacitance, inductance or surface roughness. (Note that a surface roughness pattern could be read using a read head or sensor in the form of a camera such as a CCD camera). In such cases, the read head would measure, for example, periodic changes in magnetic field, reflectivity, capacitance, inductance, surface roughness or the like. As used herein therefore, the term "read head" means any sensor or transducer and associated electronics for analysis of these measurable quantities or characteristics with an optical read head being just one preferred example. Of course, the periodic pattern being read by the read head can reside on any surface so long as there is relative (generally rotary) motion between the read head and periodic pattern. Examples of the periodic pattern include a magnetic, inductive or capacitive media deposited on a rotary or stationary component in a pattern. Moreover, if surface roughness is the periodic pattern to be read, there is no need to deposit or otherwise provide a separate periodic media since the surface roughness of any component in communication with the associated read head (probably a camera such as a CCD camera) may be used.

Figure 11:
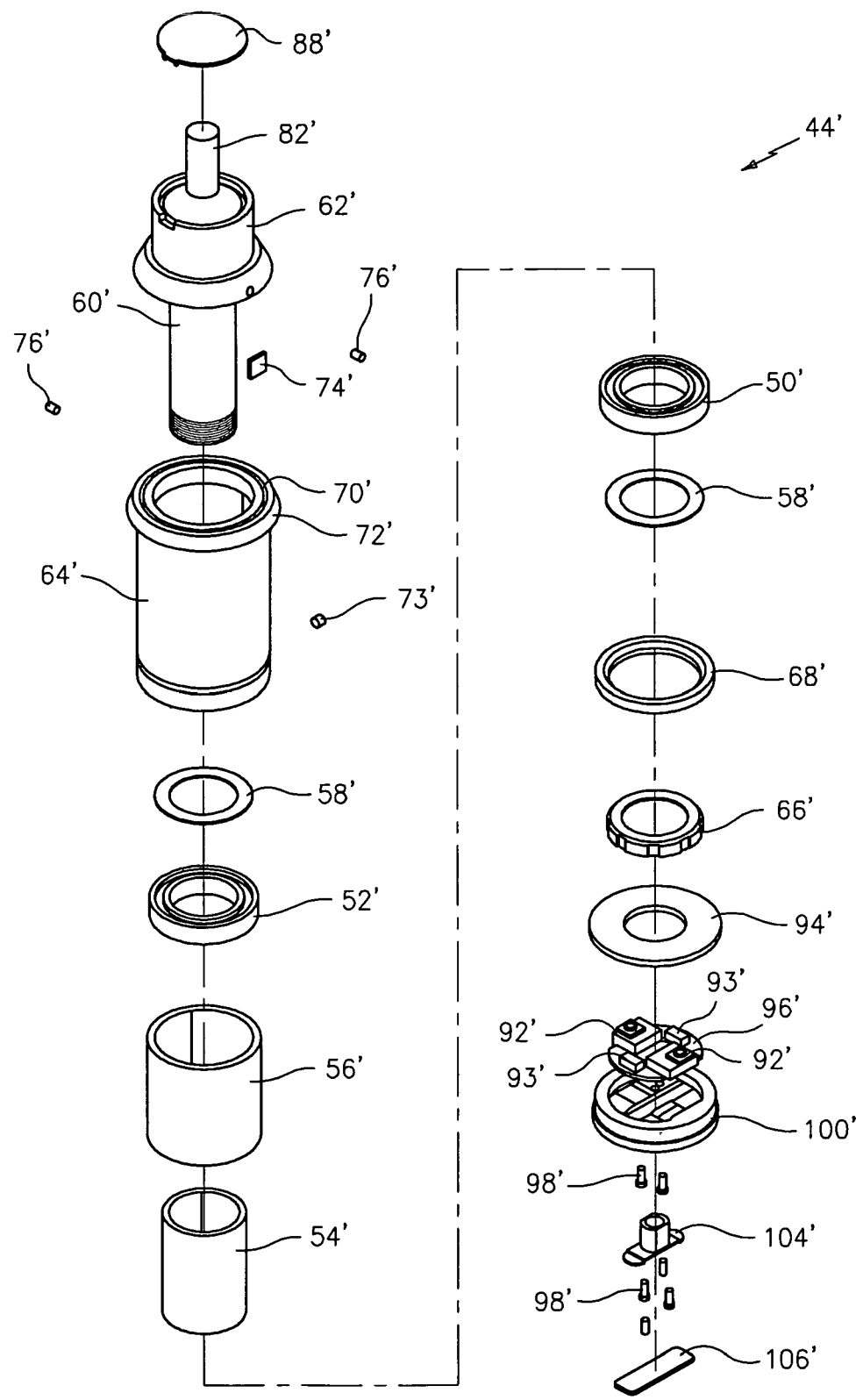
FIG. 11 is an exploded, perspective view of a long bearing/encoder cartridge in accordance with the present invention.
Figure 11A:
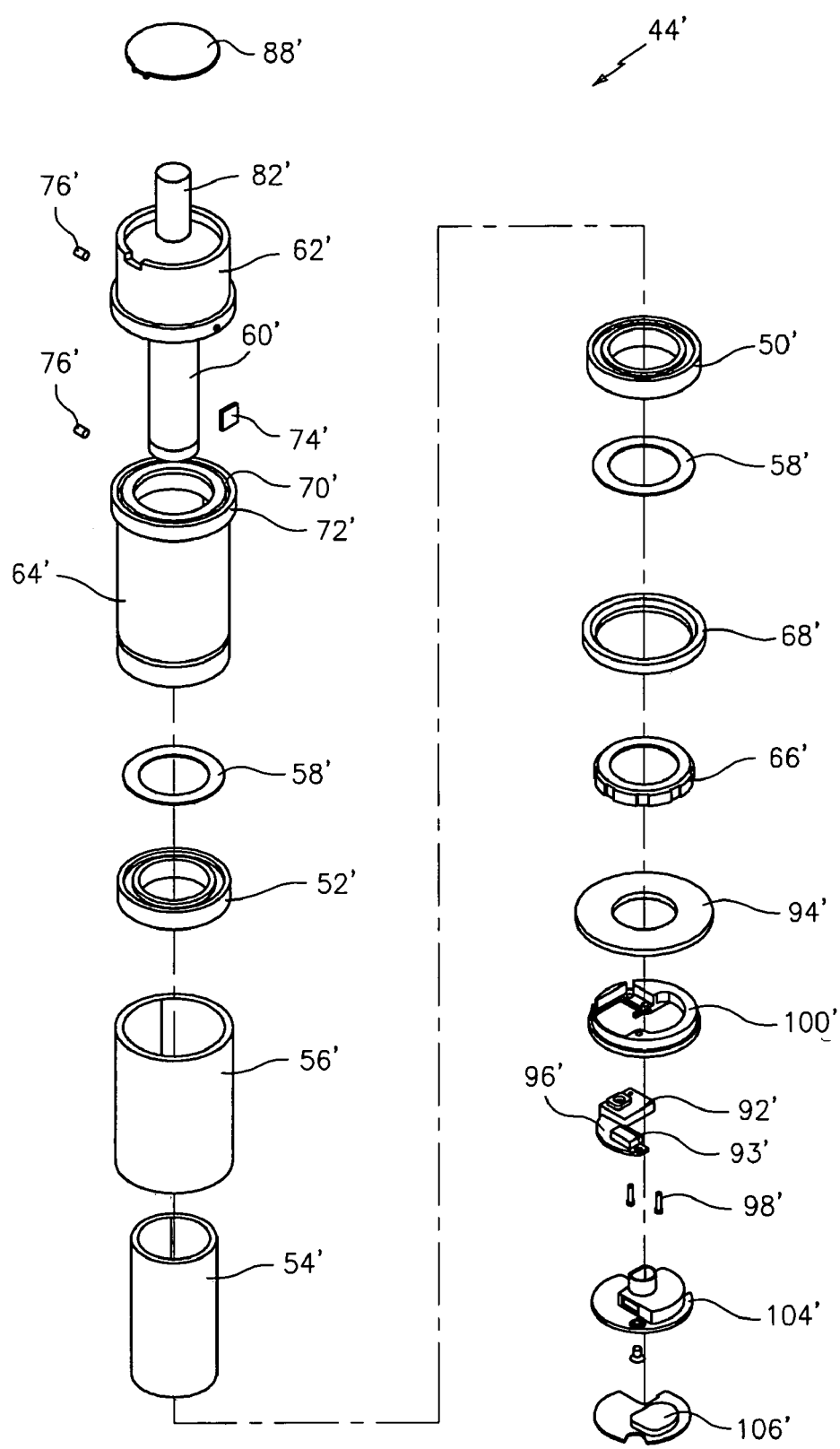
FIG. 11A is an exploded, perspective view similar to FIG. 11, but showing a single read head.

As mentioned, FIGS. 9 and 10 depict the elements of the modular bearing and encoder cartridge for axially long joint 16. FIGS. 11 and 12 depict the bearing and encoder cartridge for axial long joints 30 and 34. These cartridge assemblies are substantially similar to that shown FIGS. 9 and 10 and so are designated by 44'. Minor differences are evident from the FIGURES relative to cartridge 44 with respect to, for example, a differently configured wire cap/cover 88', slightly differing wire funnels/covers 104', 106' and the positioning of flange 72' at the upper end of housing 64'. Also, the flanges between housing 64' and shaft upper housing 62 are flared outwardly. Of course, the relative lengths of the various components shown in FIGS. 11 and 12 may differ slightly from that shown in FIGS. 9 and 10. Since all of these components are substantially similar, the components have been given the same identification numeral with the addition of a prime. FIG. 11A is similar to FIG. 11, but depicts a single read head embodiment.

Figure 13:
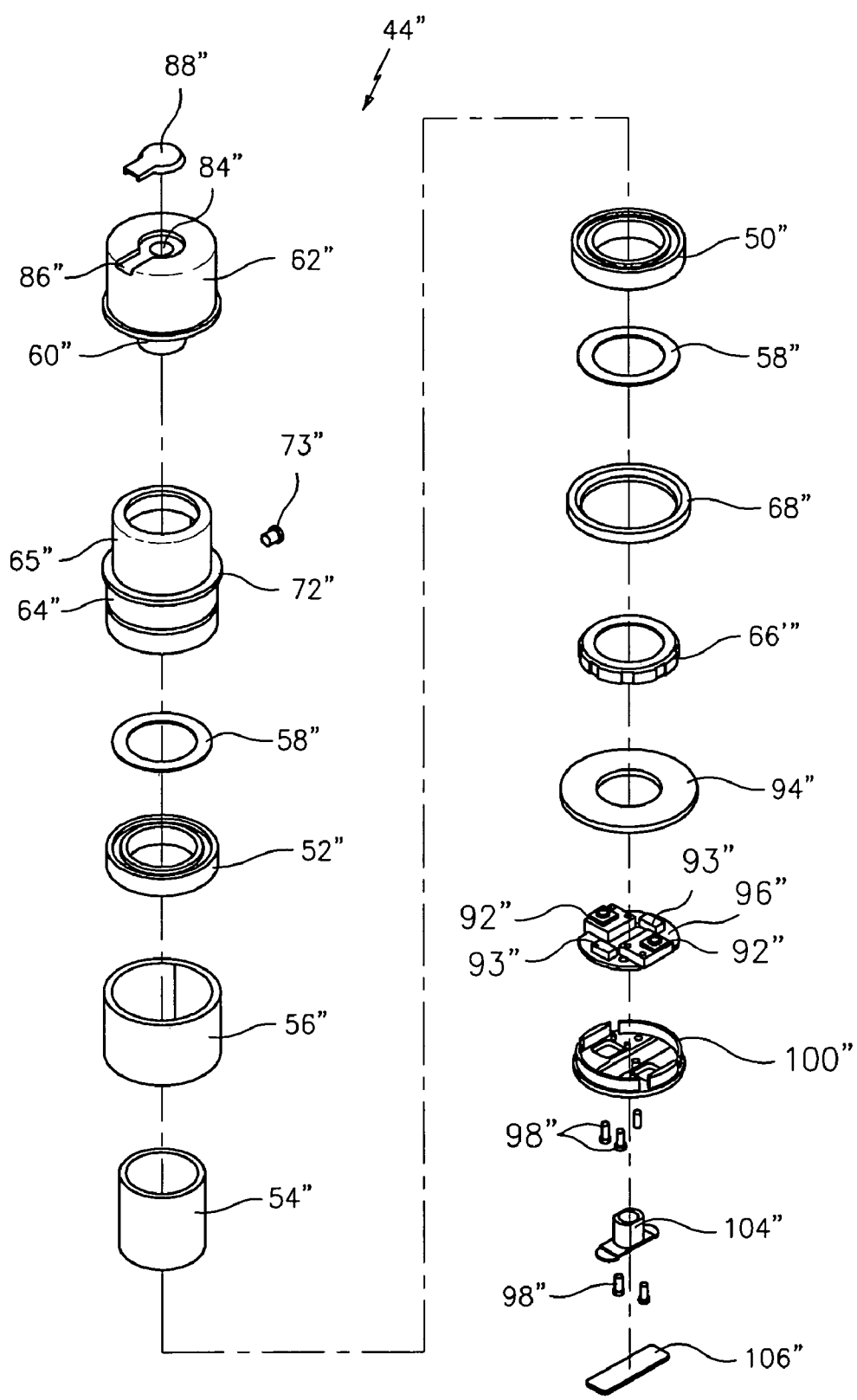
FIG. 13 is an exploded, perspective view of still another bearing/encoder cartridge in accordance with the present invention.
Figure 13A:
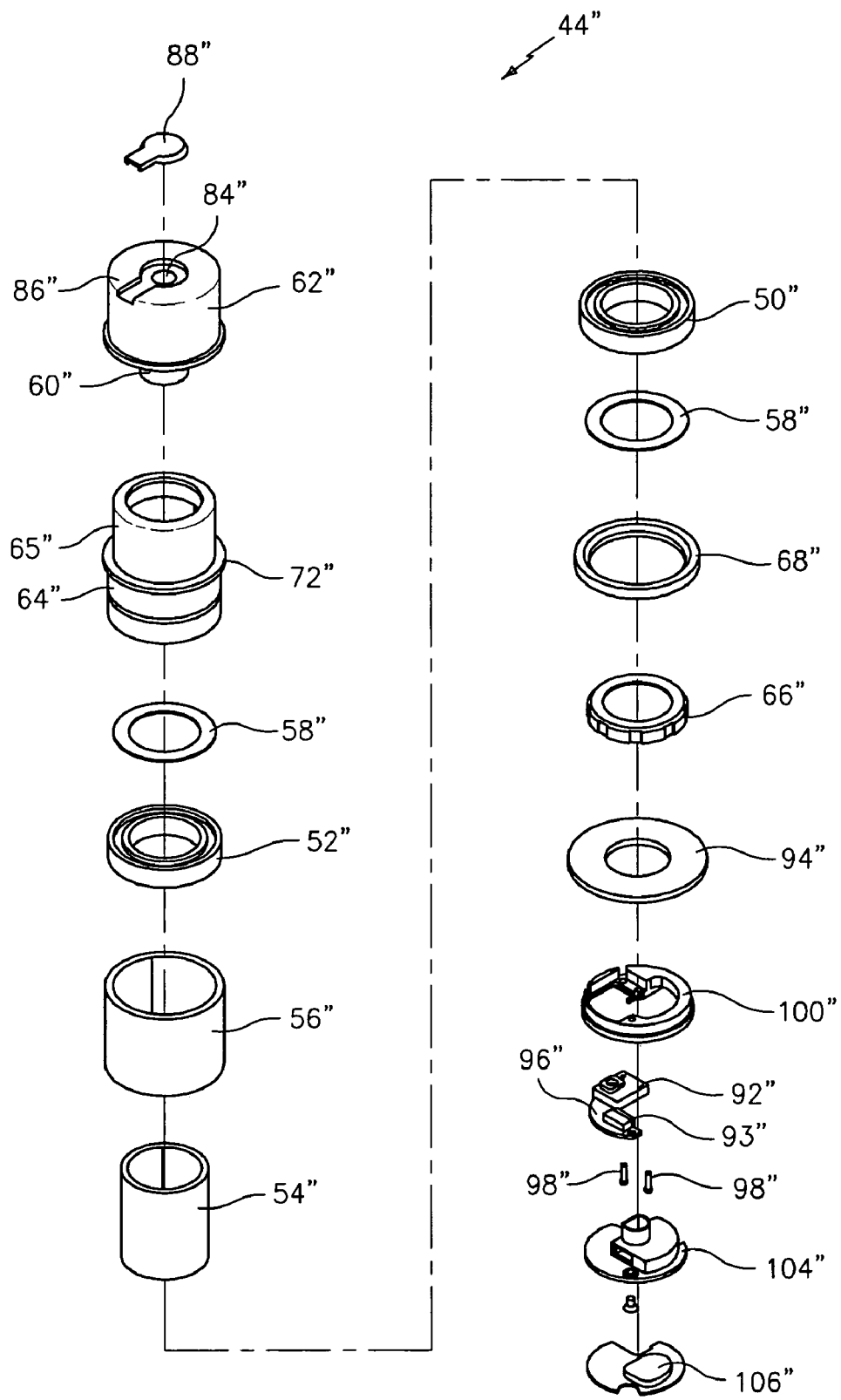
FIG. 13A is an exploded, perspective view similar to FIG. 13, but showing a single read head.
Figure 14:
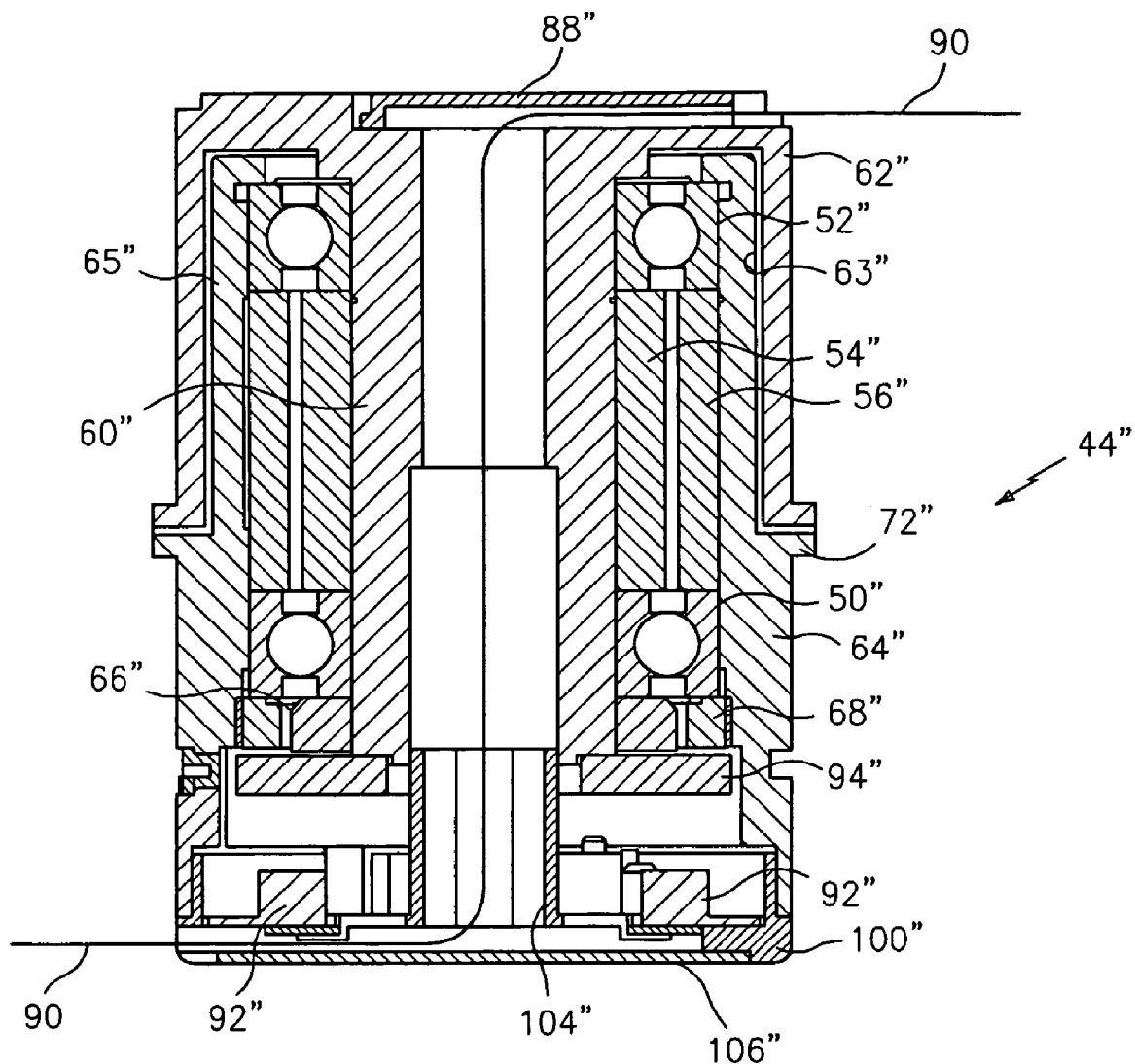
FIG. 14 is a cross-sectional elevation view of the cartridge of FIG. 13.

Turning to FIGS. 13 and 14, similar exploded and cross-sectional views are shown for the bearing and encoder cartridges in short hinge joints 32 and 36. As in the long axial joints 44' of FIGS. 11 and 12, the cartridges for the short hinge joints 32 and 36 are substantially similar to the cartridge 44 discussed in detail above and therefore the components of these cartridges are identified at 44" with similar components being identified using a double prime. It will be appreciated that because cartridges 44" are intended for use in short joints 32, 36, no slip ring assembly is required as the wiring will simply pass through the axial openings 78", 80" due to the hinged motion of these joints. FIG. 13A is similar to FIG. 13, but depicts a single read head embodiment.

Figure 15:
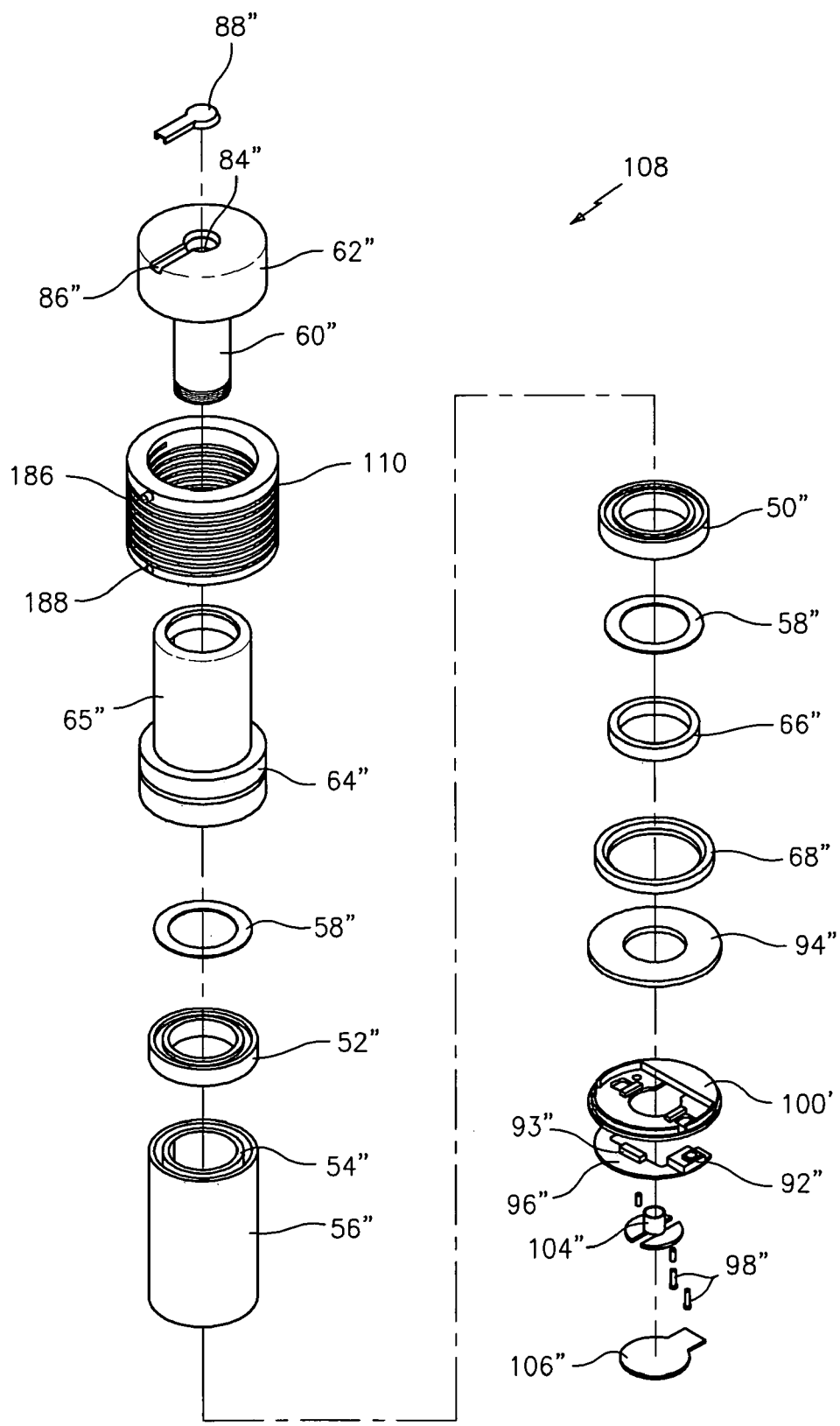
FIG. 15 is an exploded, perspective view of a bearing/encoder cartridge and counter balance spring in accordance with the present invention.
Figure 15A:
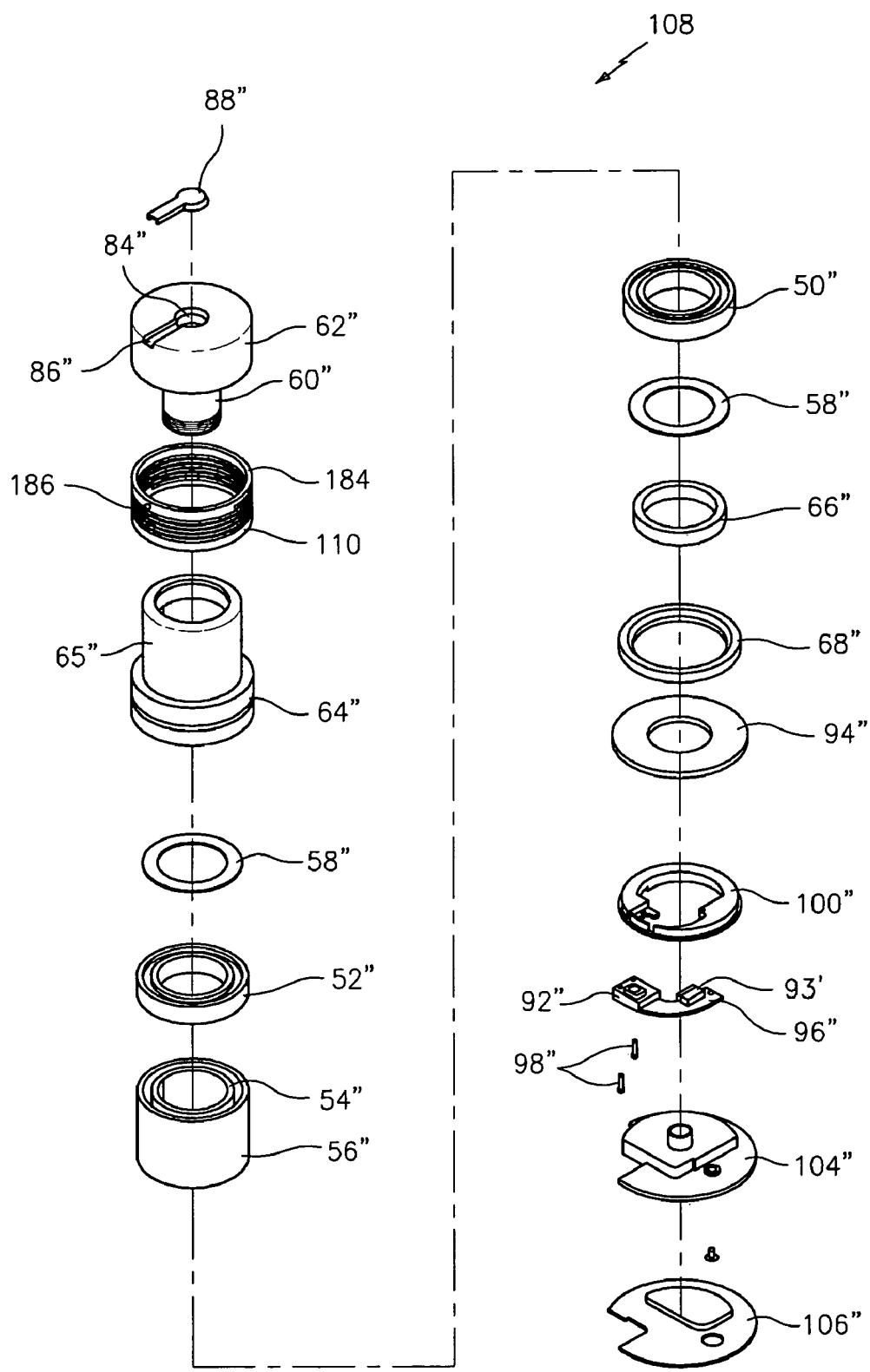
FIG. 15A is an exploded, perspective view similar to FIG. 15, but showing a single read head.
Figure 16:
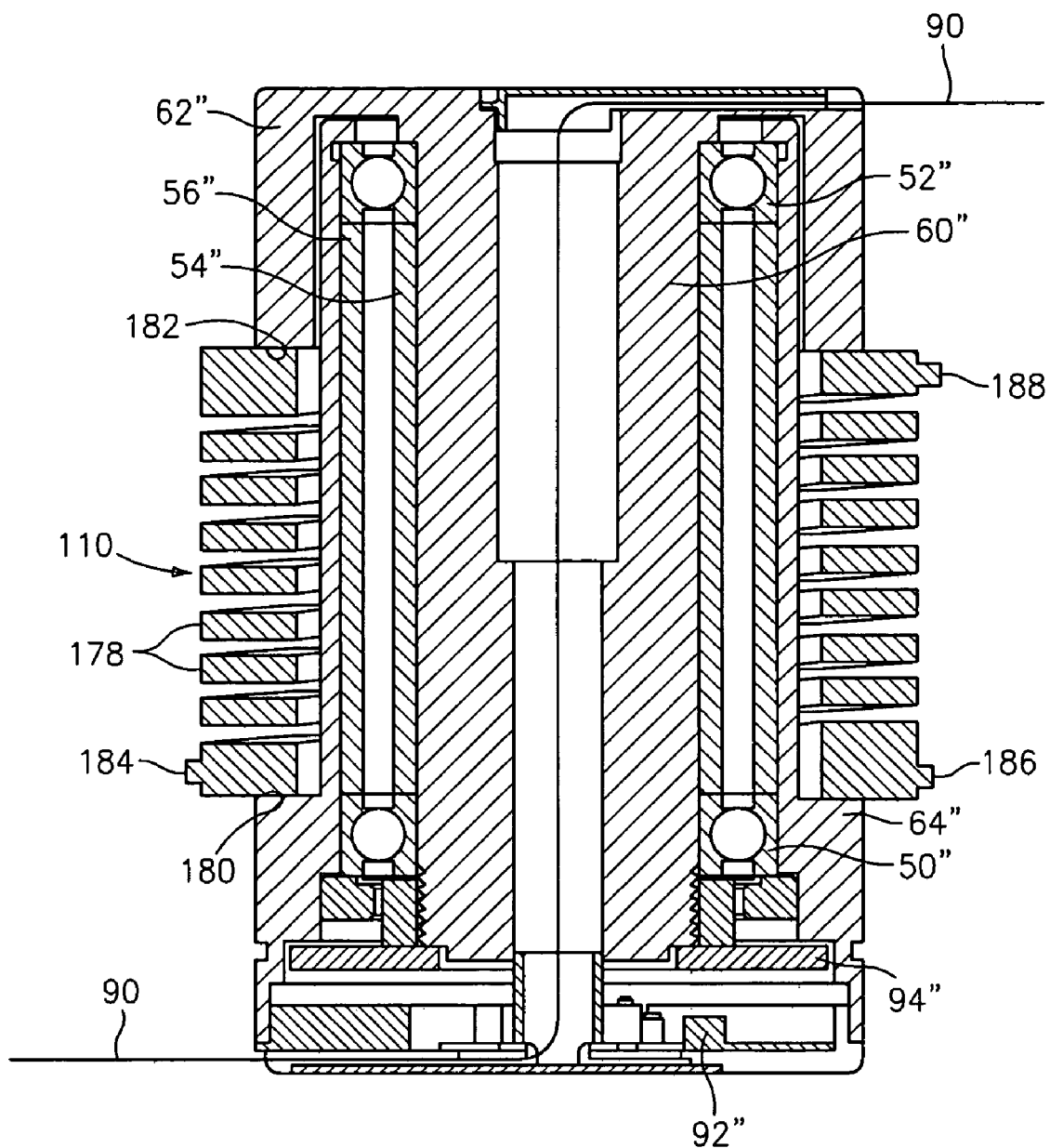
FIG. 16 is a cross-sectional elevation view of the cartridge and counter balance of FIG. 15.

Finally, with reference to FIGS. 15 and 16, the modular bearing/encoder cartridge for short hinge joint 18 is shown at 108. It will be appreciated that substantially all of the components of cartridge 108 are similar or the same as the components in cartridges 44, 44' and 44" with the important exception being the inclusion of a counter balance assembly. This counter balance assembly includes a counter balance spring 110 which is received over housing 64" and provides an important counter balance function to CMM 10 in a manner which will be described hereinafter with reference to FIGS. 26 to 28. FIG. 15A is similar to FIG. 15, but depicts a single read head embodiment.

As mentioned, in a preferred embodiment, more than one read head may be used in the encoder. It will be appreciated that angle measurement of an encoder is effected by disk run out or radial motion due to applied loads. It has been determined that two read heads positioned at 180° from each other will result in run out causing cancellation effects in each read head. These cancellation effects are averaged for a final "immune" angle measurement. Thus, the use of two read heads and the resultant error cancellation will result in a less error prone and more accurate encoder measurement.

Figure 17:
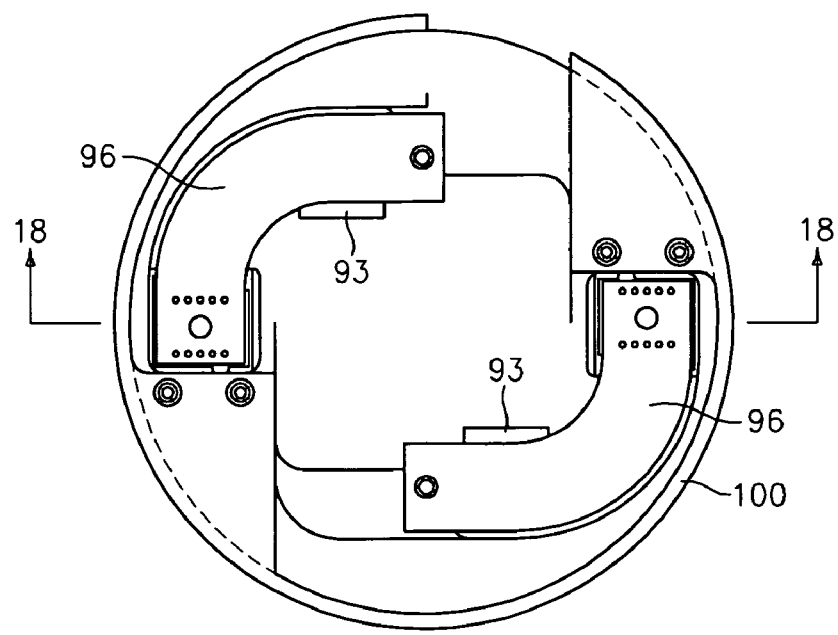
FIG. 17 is a top plan view of a dual read head assembly for a larger diameter bearing/encoder cartridge used in accordance with the present invention.
Figure 18:
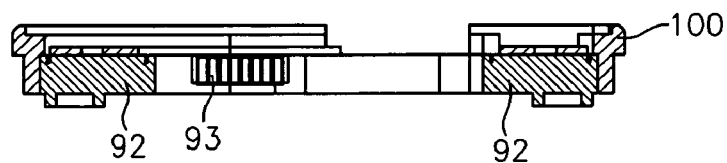
FIG. 18 is a cross-sectional elevation view along the line 18—18 of FIG. 17.
Figure 19:
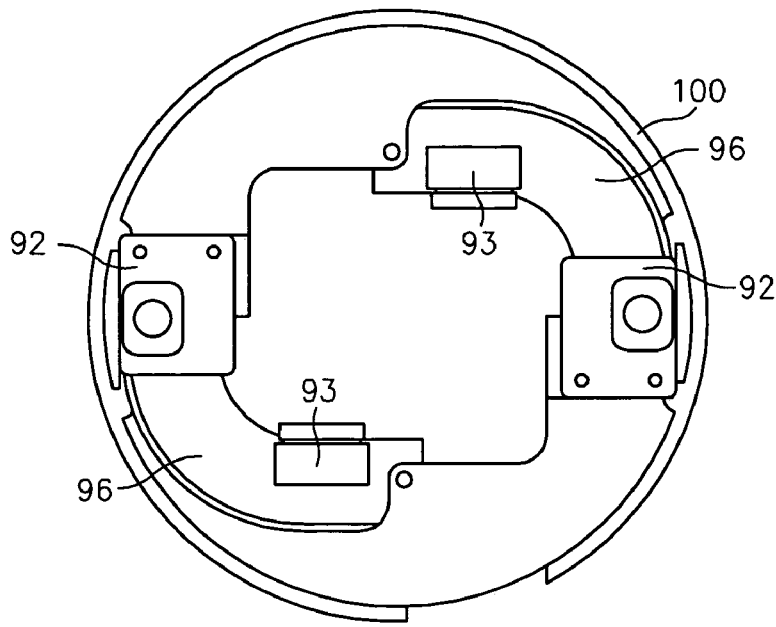
FIG. 19 is a bottom plan view of the dual read head assembly of FIG. 17.
Figure 20:
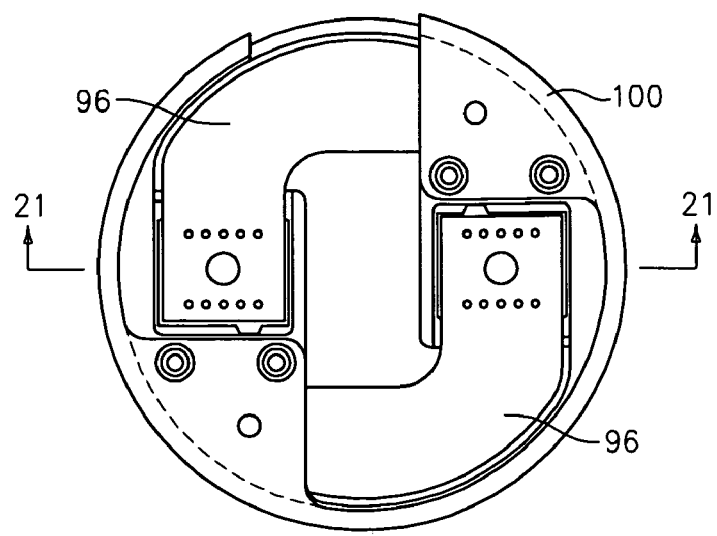
FIG. 20 is a top plan view of a dual read head assembly for a smaller diameter bearing/encoder cartridge in accordance with the present invention.
Figure 21:
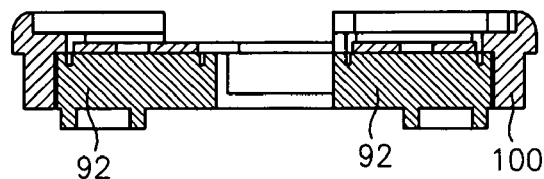
FIG. 21 is a cross-sectional elevation view along the line 21—21 of FIG. 20.
Figure 22:
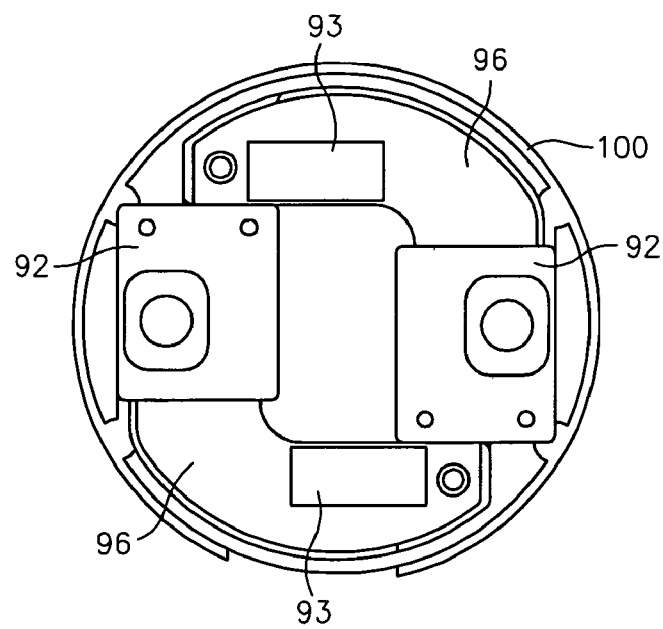
FIG. 22 is a bottom plan view of the dual read head assembly of FIG. 20.

FIGS. 17–19 depict the bottom, cross-sectional and top views respectively for a dual read head embodiment useful in, for example, a larger diameter cartridge such as found in joints 16 and 18 (that is, those joints nearest the base). Thus, a cartridge end cap 100 has mounted thereto a pair of circuit boards 96 with each circuit board 96 having a read head 92 mechanically attached thereto. The read heads 92 are preferably positioned 180° apart from each other to provide for the error cancellation resulting from the run out or radial motion of the disk. Each board 96 additionally includes a connector 93 for attachment of the circuit board 96 to the internal bus and/or other wiring as will be discussed hereinafter. FIGS. 20–22 depict substantially the same components as in FIGS. 17–19 with the primary difference being a smaller diameter cartridge end cap 100. This smaller diameter dual read head embodiment would be associated with the smaller diameter cartridges of, for example, joints 30, 32, 34 and 36.

The use of at least two read heads (or more such as the three reads heads shown in FIGS. 9D–E and the four read heads shown in FIGS. 9B–C) is also advantageously employed in more conventional coordinate measurement machines to significantly reduce the cost and complexity of manufacture thereof. For example, a coordinate measurement machine described in U.S. Pat. No. 5,794,356 (hereinafter "Raab '356"), incorporated herein by reference, includes a relatively simple construction for each joint including a first housing that remains stationary with one joint half, and a second housing that remains stationary with the second joint half, the first and second housings having pre-loaded bearings that allow them to rotate with each other. The first housing retains a packaged encoder and the second housing includes an axially-disposed internal shaft that extends into the first housing and mates with the encoder shaft protruding from the packaged encoder. The prior art packaged encoder required that there be no loads applied thereto and that the motion of the second housing be accurately transmitted to the encoder despite small misalignments of the axis of the internal shaft and the axis of the packaged encoder to maintain the highly accurate rotational measurements. To accommodate manufacturing tolerances in axial misalignment, a special coupling device is connected between the encoder shaft and the internal shaft. Such a structure can be seen in FIG. 7 of Raab '356.

Figure 35:
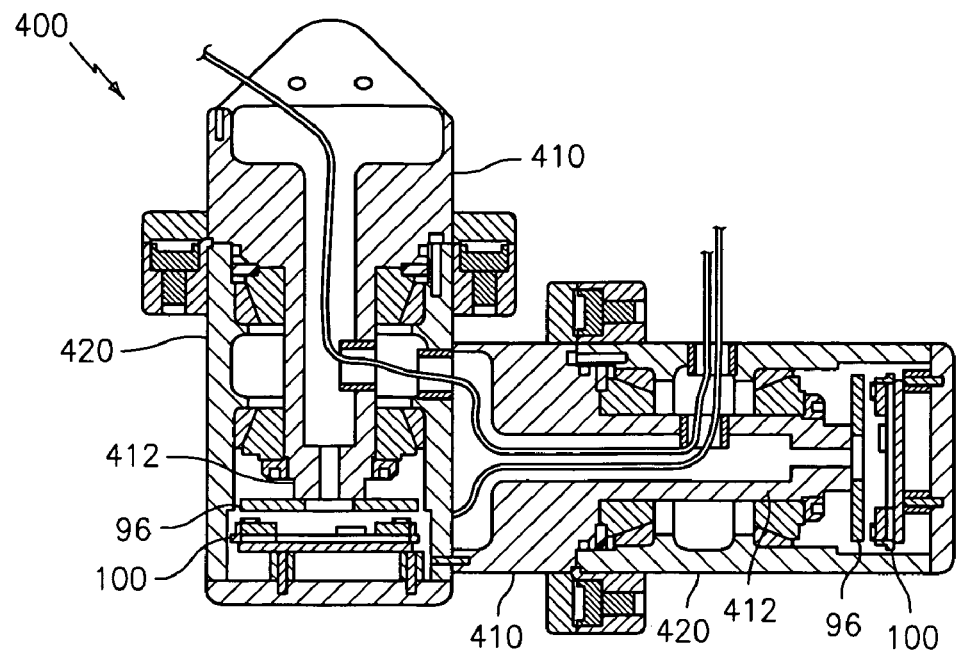
FIG. 35 is a cross-sectional elevation view of a CMM joint from Raab '356 with dual read heads.

In contrast, FIG. 35 shows a modified structure 400 in which the coupling device and packaged encoder from the Raab '356 CMM are removed and replaced with encoder disk 96 and end cap 100. Here, two joints are positioned at 90° to each other, each joint having a first housing 420 and a second housing 410. Internal shaft 412 extends from second housing 420 into first housing 410. As shown, encoder disk 96 is attached, e.g., using adhesive, to the end of internal shaft 412 while end cap 100 is fixed within first housing 420. However, it will be understood that encoder disk 96 may be fixed within first housing 420 and end cap 100 be fixed to internal shaft 412 without affecting the operation of the joint.

As previously described, the use of two (or more) read heads and the resultant error cancellation will result in a less error prone and more accurate encoder measurement despite small axial misalignments. In addition, a direct relationship between the grating and the fringe movement desensitizes the encoder from environmentally induced errors to which prior art devices are susceptible. Furthermore, because the region of interference is large, and because nearly sinusoidal interference is obtained everywhere within this region, alignment tolerances are far more relaxed than is associated with prior art encoders as previously described.

In another example, U.S. Pat. No. 5,829,148 to Eaton (hereinafter "Eaton '148"), incorporated herein by reference, describes a prior art CMM in which a packaged encoder forms an integral part of each joint by providing primary rotational bearings, therefore avoiding any need to compensate for axial misalignments as required in Raab '356 discussed above. However, because the encoder provides primary rotational bearings, it is important that the encoder be structurally rugged and able to be subjected to various loadings without affecting its performance. This adds to the cost and bulkiness of the encoder. Such a structure can be seen in FIG. 4 of Eaton '148.

Figure 36:
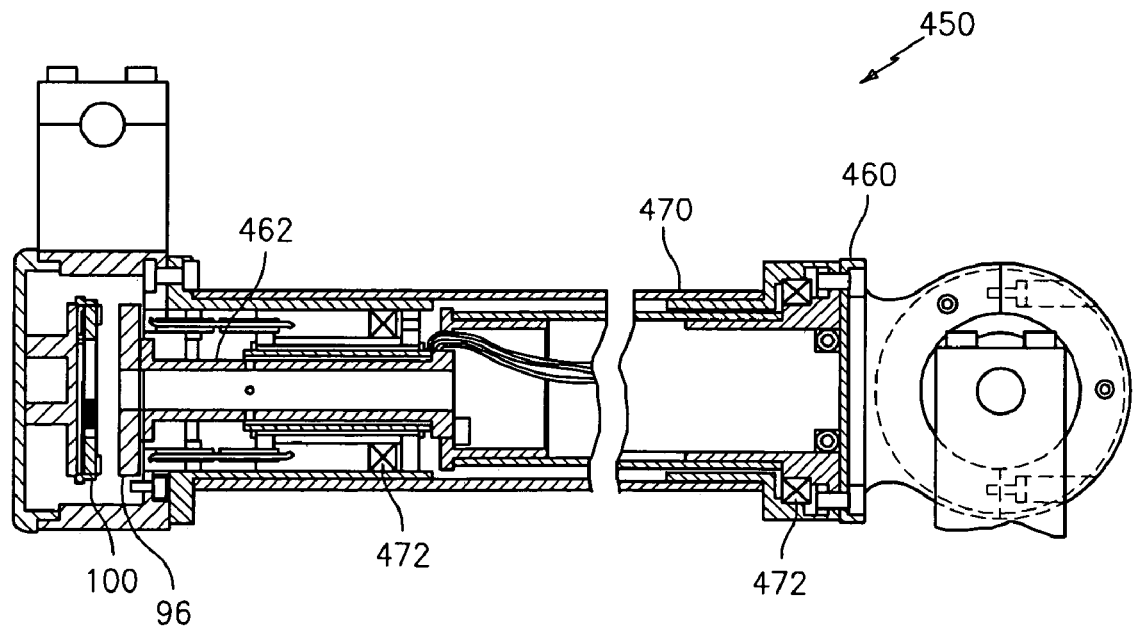
FIG. 36 is a cross-sectional elevation view of a CMM joint from Eaton '148 with dual read heads.
Figure 37:
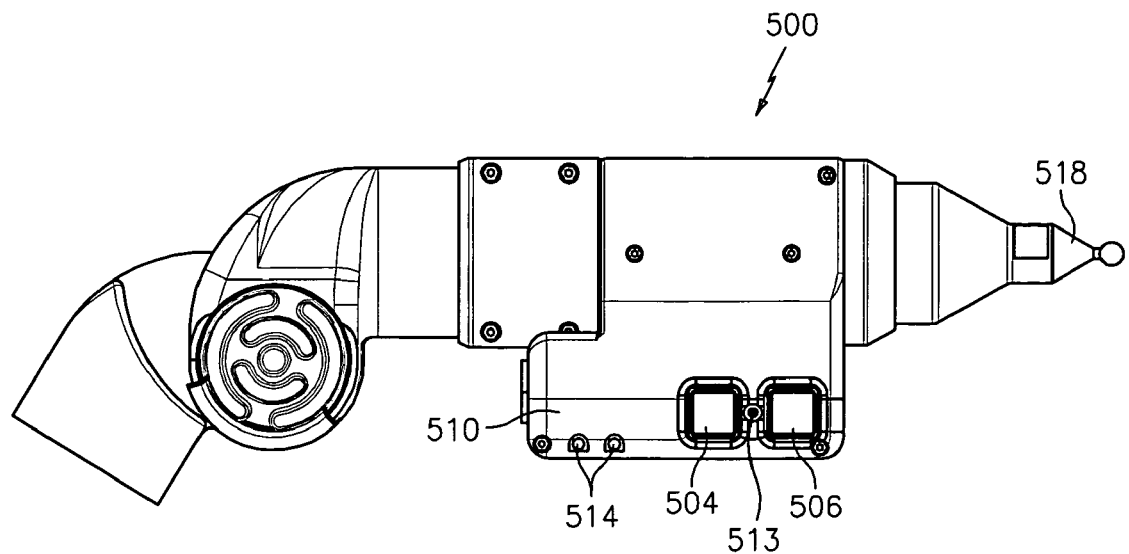
FIG. 37 is a side elevation view of a measurement probe with a seventh axis transducer.
Figure 38:
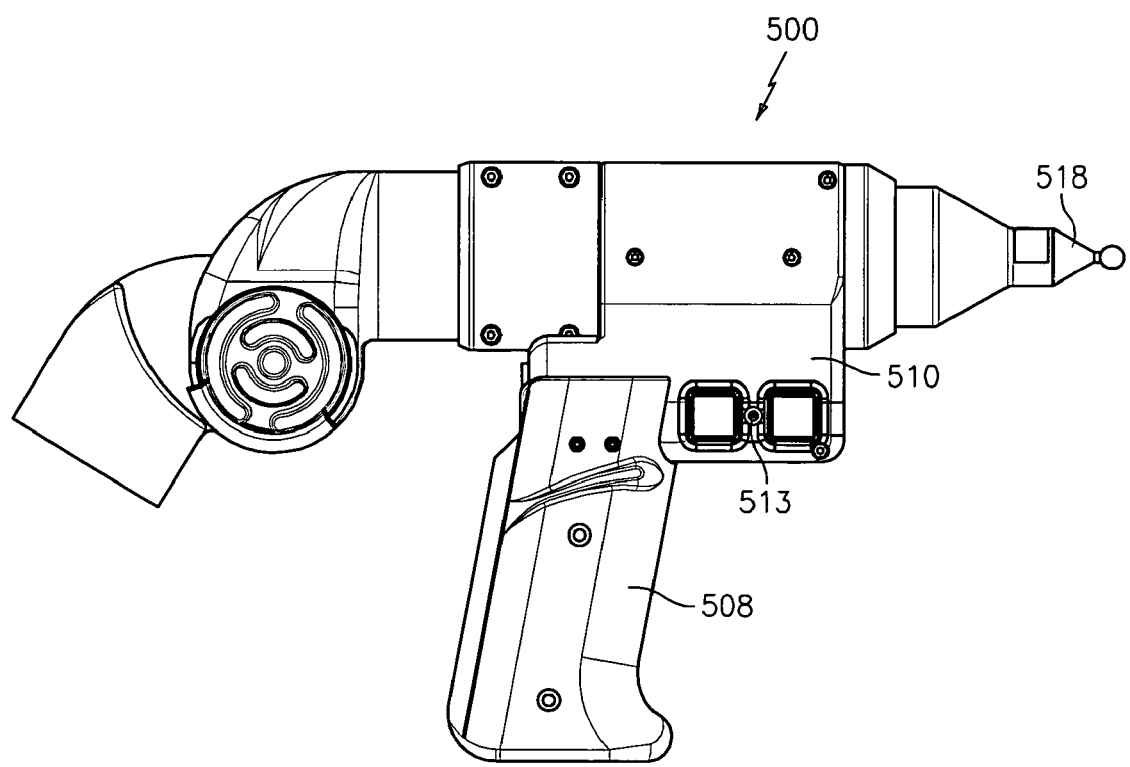
FIG. 38 is a side elevation view, similar to FIG. 37, but including a removable handle.
Figure 40:
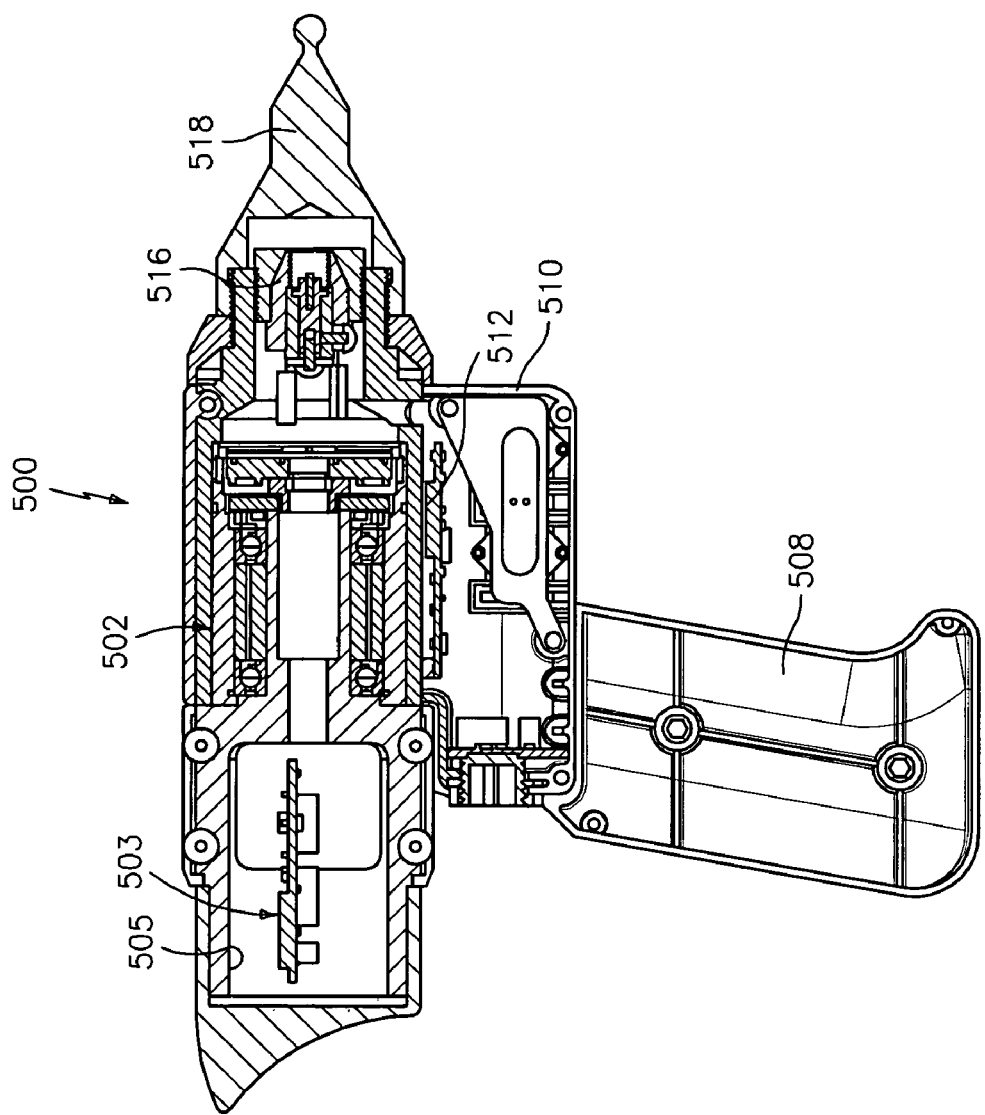
FIG. 40 is a cross-sectional elevation view of the measurement probe of FIG. 38.
Figure 39:
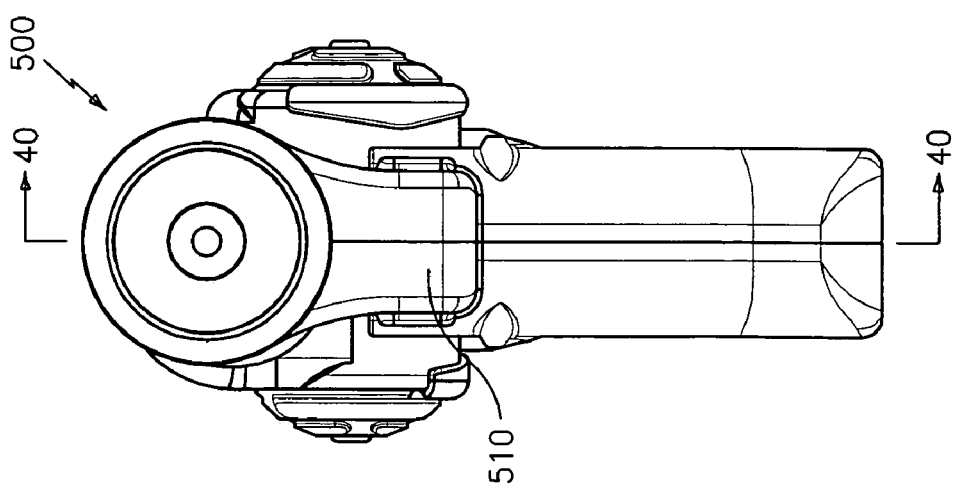
FIG. 39 is an end view of the measurement probe of FIG. 38.

In contrast, FIG. 36 shows a modified structure 450 in which the packaged encoder and connecting shaft of one joint from the Eaton '148 CMM is removed and replaced by end cap 100 and encoder disk 96. Here a first housing 470 retains end cap 100 and retains internal shaft 462 of second housing 460 by bearings 472. Internal shaft 462 is extended to terminate proximate end cap 100 and encoder disk 96 is attached, e.g., using adhesive, at the end of internal shaft 462. As in the embodiment shown in FIG. 35, the use of two (or more) read heads significantly reduces the cost and complexity of the joint without sacrificing accuracy.

Figure 23A:
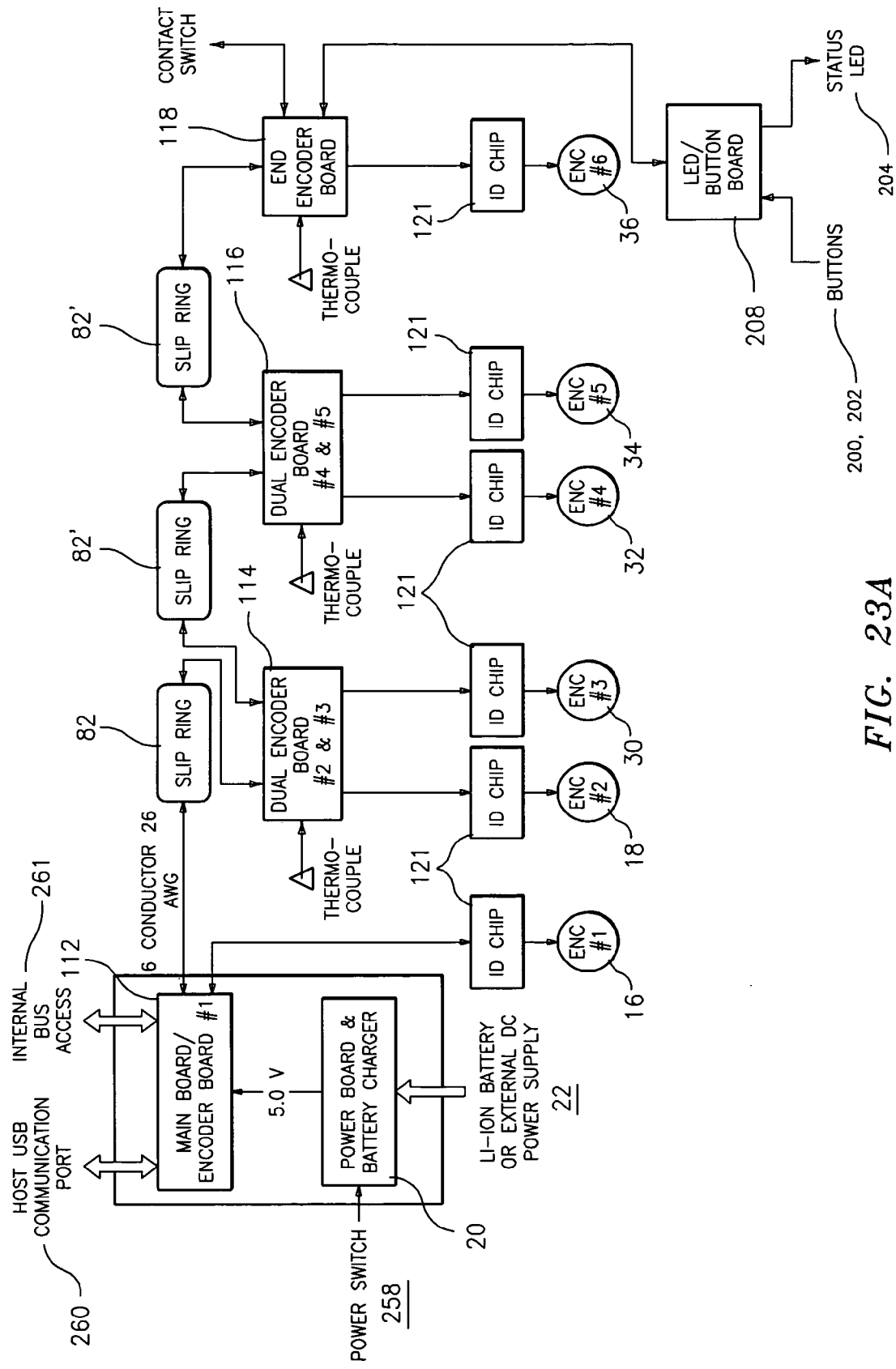
FIG. 23A is a block diagram depicting the electronics configuration for the CMM of the present invention using a single read head and FIG. 23B is a block diagram depicting the electronics configuration for the CMM of the present invention using a dual read head.

Turning now to FIG. 23A, a block diagram of the electronics is shown for the single read head embodiment of FIGS. 9A, 11A, 13A and 15A. It will be appreciated that CMM 10 preferably includes an external bus (preferably a USB bus) 260 and an internal bus (preferably RS-485) 261 which is designed to be expandable for more encoders as well as either an externally mounted rail or additional rotational axes such as a seventh axis. The internal bus is preferably consistent with RS485 and this bus is preferably configured to be used as a serial network in a manner consistent with the serial network for communicating data from transducers in a portable CMM arm as disclosed in commonly assigned U.S. Pat. No. 6,219,928, all of the contents of which have been incorporated herein by reference.

Figure 24:
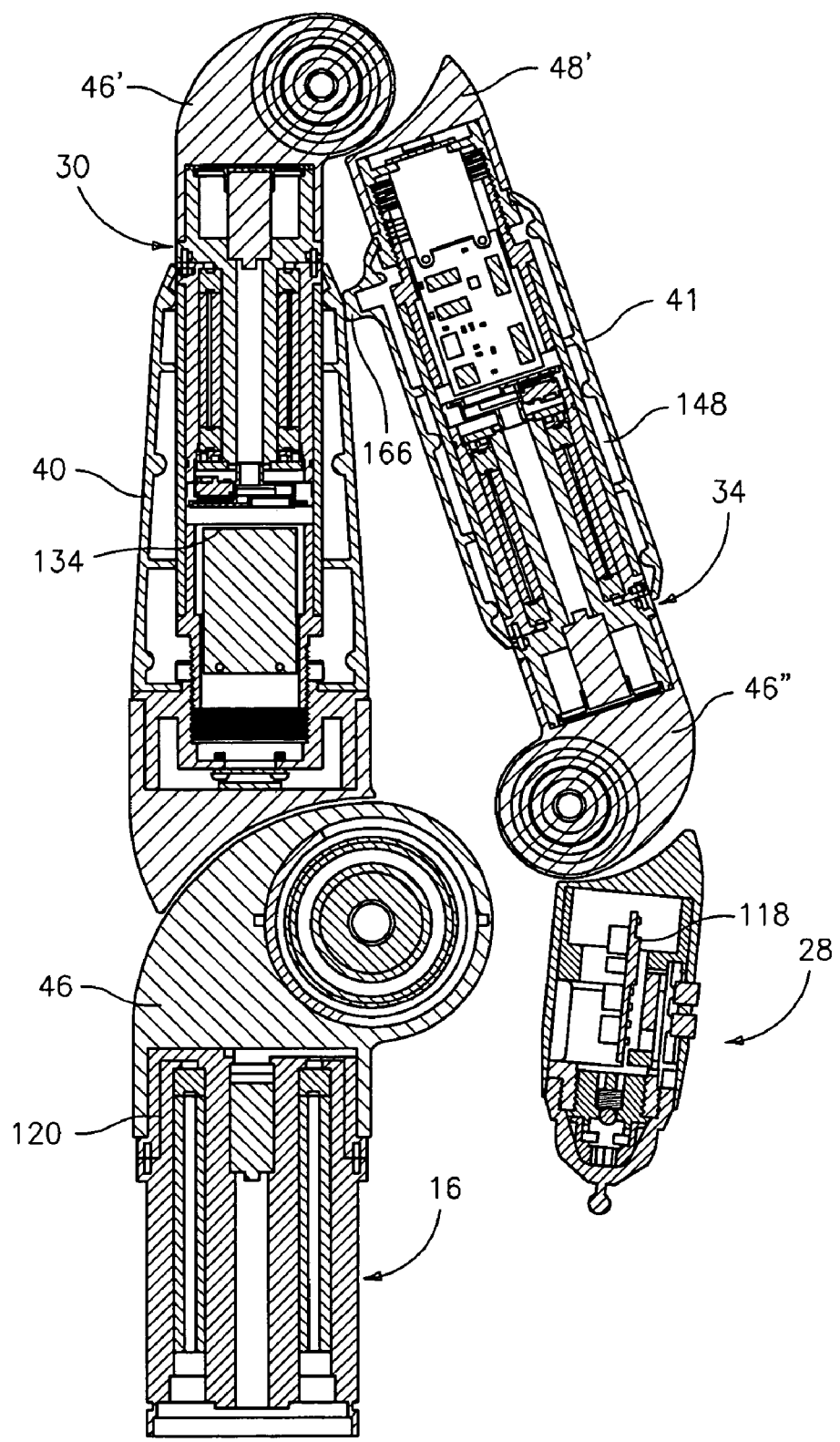
FIG. 24 is a cross-sectional elevation view longitudinally through the CMM of the present invention (with the base removed)

With reference to FIG. 23A, it will be appreciated that each encoder in each cartridge is associated with an encoder board. The encoder board for the cartridge in joint 16 is positioned within base 12 and is identified at 112 in FIG. 25. The encoders for joints 18 and 30 are processed on a dual encoder board which is located in the second long joint 30 and is identified at 114 in FIG. 26. FIG. 26 also depicts a similar dual encoder board 116 for the encoders used in joints 32 and 34, board 116 being positioned in third long joint 34 as shown in FIG. 26. Finally, the end encoder board 118 is positioned within measurement probe handle 28 as shown in FIG. 24 and is used to process the encoders in short joint 36. Each of the boards 114, 116 and 118 are associated with a thermocouple to provide for thermal compensation due to temperature transients. Each board 112, 114, 116 and 118 incorporates embedded analog-to-digital conversion, encoder counting and serial port communications. Each board also has read programmable flash memory to allow local storage of operating data. The main processor board 112 is also field programmable through the external USB bus 260. As mentioned, the internal bus (RS-485) 261 is designed to be expandable for more encoders which also includes either an externally mounted rail and/or seventh rotation axis. An axis port has been provided to provide internal bus diagnosis. Multiple CMMs of the type depicted at 10 in these FIGURES may be attached to a single application due to the capabilities of the external USB communications protocol. Moreover, multiple applications may be attached to a single CMM 10 for the very same reasons.

Preferably, each board 112, 114, 116 and 118 includes a 16-bit digital signal processor such as the processor available from Motorola under the designation DSP56F807. This single processing component combines many processing features including serial communication, quadrature decoding, A/D converters and on-board memory thus allowing a reduction of the total number of chips needed for each board.

In accordance with another important feature of the present invention, each of the encoders is associated with an individualized identification chip 121. This chip will identify each individual encoder and therefore will identify each individual bearing/encoder modular cartridge so as to ease and expedite quality control, testing, and repair.

Figure 23B:
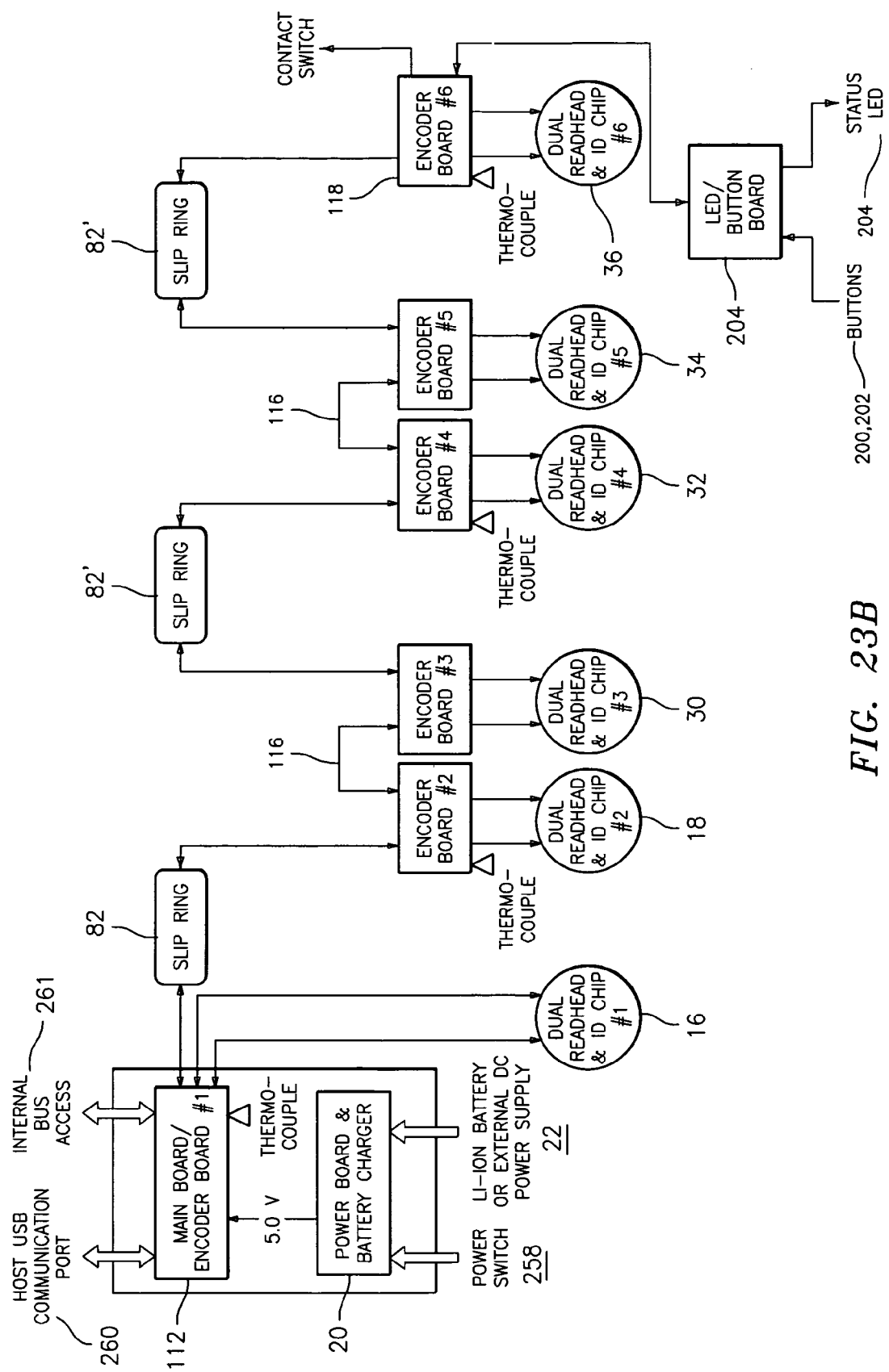

FIG. 23B is an electronics block diagram which is similar to FIG. 23A, but depicts the dual read head embodiment of FIGS. 10, 12, 14 and 16–22.

Figure 25:
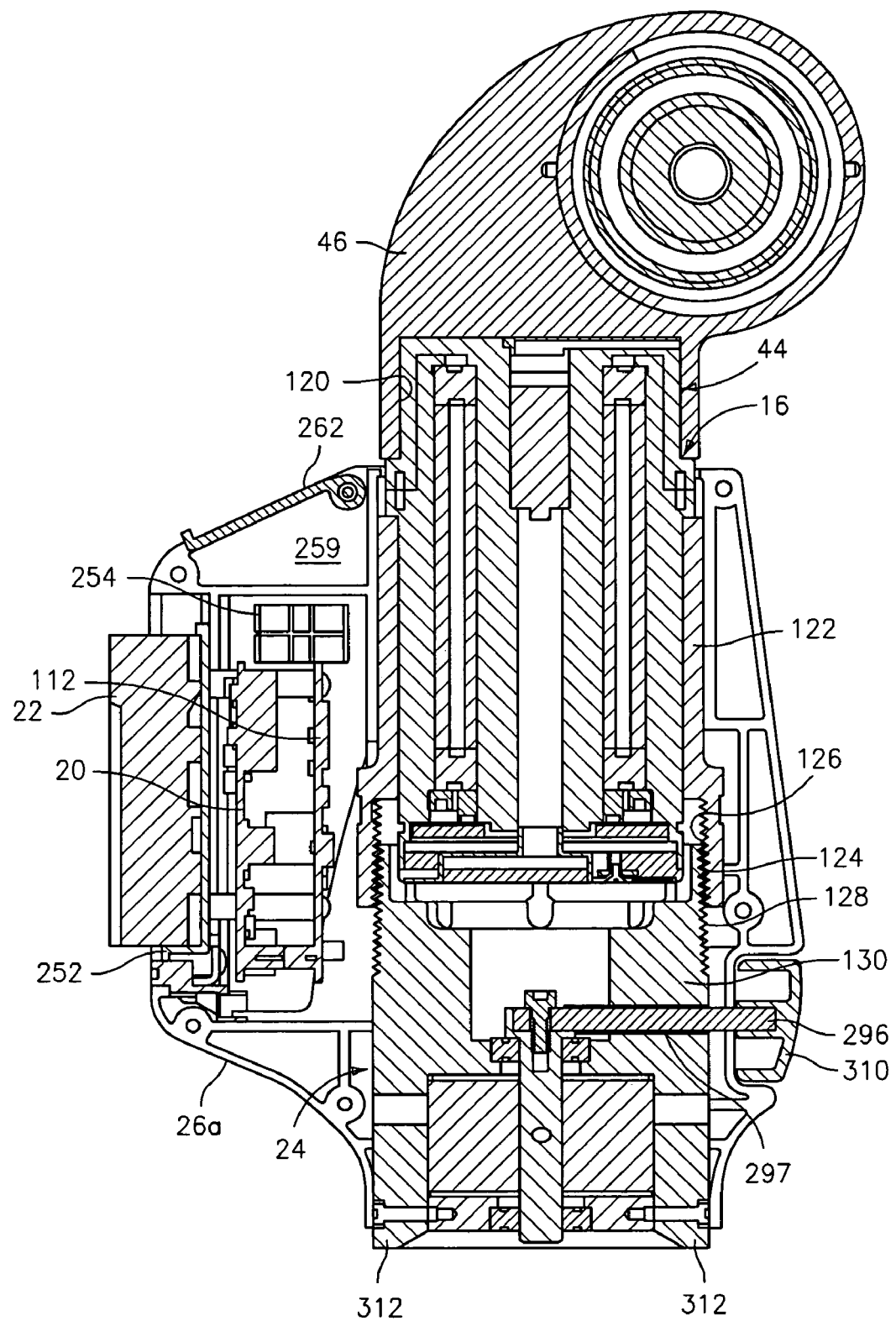
FIG. 25 is an enlarged cross-sectional view of a portion of FIG. 24 depicting the base and first long joint segment of the CMM of FIG. 24.
Figure 26:
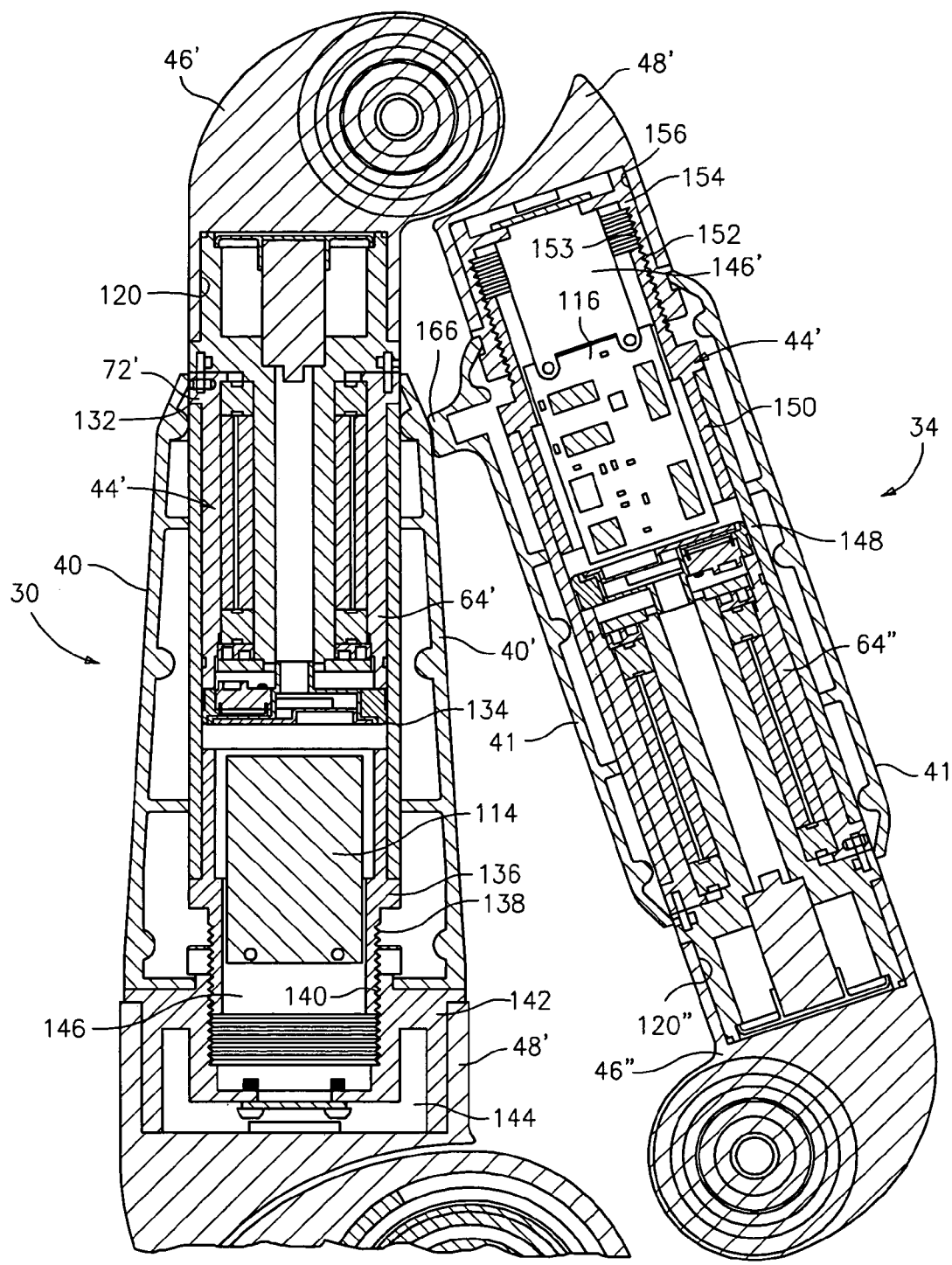
FIG. 26 is an enlarged cross-sectional view of a portion of FIG. 24 depicting the second and third long joint segments.

With reference to FIGS. 24–26, the assembly of each cartridge in the articulated arm 14 will now be described (note that FIG. 24 depicts arm 10 without base 12. Note also that FIGS. 24–26 employ the single read head embodiments of FIGS. 9A, 11A, 13A and 15A). As shown in FIG. 25, the first long joint 16 includes a relatively long cartridge 44, the upper end of which has been inserted into a cylindrical socket 120 of dual socket joint 46. Cartridge 44 is securely retained within socket 120 using a suitable adhesive. The opposite, lower end of cartridge 44 is inserted into an extension tube, which in this embodiment may be an aluminum sleeve 122 (but sleeve 122 may also be comprised of a stiff alloy or composite material). Cartridge 44 is secured in sleeve 122 again using a suitable adhesive. The lower end of sleeve 122 includes a larger outer diameter section 124 having internal threading 126 thereon. Such threading is outwardly tapered and is configured to threadably mate with inwardly tapered threading 128 on magnetic mount housing 130 as is clearly shown in FIG. 4. As has been discussed, all of the several joints of CMM 10 are interconnected using such tapered threading. Preferably, the tapered thread is of the NPT type which is self-tightening and therefore no lock nuts or other fastening devices are needed. This threading also allows for and should include a thread locking agent.

Turning to FIG. 26, as in first long joint 16, long cartridge 44' is adhesively secured in the cylindrical opening 120' of dual socket joint 46'. The outer housing 64' of cartridge 44' includes a shoulder 132 defined by the lower surface of flange 72'. This shoulder 132 supports cylindrical extension tube 134 which is provided over and surrounds the outer surface of housing 64'. Extension tubes are used in the joints to create a variable length tube for attachment to a threaded component. Extension tube 134 thus extends outwardly from the bottom of cartridge 64' and has inserted therein a threaded sleeve 136. Appropriate adhesive is used to bond housing 44' to extension tube 134 as well as to bond sleeve 136 and tube 134 together. Sleeve 136 terminates at a tapered section having outer threading 138 thereon. Outer threading threadably mates with internal threading 140 on connecting piece 142 which has been adhesively secured in opening 144 of dual socket joint 48. Preferably, extension tube 134 is composed of a composite material such as an appropriate carbon fiber composite while threadable sleeve 136 is composed of aluminum so as to match the thermal properties of the dual socket joint 48. It will be appreciated that PC board 114 is fastened to a support 146 which in turn is secured to dual socket joint support 142.

In addition to the aforementioned threaded connections, one, some or all of the joints may be interconnected using threaded fasteners as shown in FIGS. 25A–B. Rather than the threaded sleeve 136 of FIG. 26, sleeve 136' of FIG. 25B has a smooth tapered end 137 which is received in a complimentary tapered socket support 142'. A flange 139 extends circumferentially outwardly from sleeve 136' with an array of bolt holes (in this case 6) therethrough for receiving threaded bolts 141. Bolts 141 are threadably received in corresponding holes along the upper surface of socket support 142'. An extension tube 134' is received over sleeve 136' as in the FIG. 26 embodiment. The complimentary tapered male and female interconnections for the joints provide improved connection interfaces relative to the prior art.

Still referring to FIG. 26, long cartridge 44" of third long joint 34 is secured to arm 14 in a manner similar to cartridge 44' of long joint 30. That is, the upper portion of cartridge 44" is adhesively secured into an opening 120" of dual socket joint 46". An extension tube 148 (preferably composed of a composite material as described with respect to tube 134) is positioned over outer housing 64" and extends outwardly thereof so as to receive a mating sleeve 150 which is adhesively secured to the interior diameter of extension tube 148. Mating sleeve 150 terminates at a tapered section having outer threading 152 and mates with complimentary interior threading 153 on dual socket joint support 154 which has been adhesively attached to a cylindrical socket 156 within dual socket joint 148'. Printed circuit board 116 is similarly connected to the dual socket joint using the PCB support 146' which is secured to dual socket joint support 154.

As discussed with respect to FIGS. 7 and 8, the short cartridges 44' in FIGS. 13 and 14 and 108 of FIG. 15 are simply positioned between two dual socket joints 46, 48 and are secured within the dual socket joints using an appropriate adhesive. As a result, the long and short cartridges are easily attached to each other at right angles (or, if desired, at angles other than right angles).

The modular bearing/transducer cartridges as described above constitute an important technological advance in portable CMM's such as shown, for example, in the aforementioned Raab '356 and Eaton '148 patents. This is because the cartridge (or housing of the cartridge) actually defines a structural element of each joint which makes up the articulated arm. As used herein, "structural element" means that the surface of the cartridge (e.g., the cartridge housing) is rigidly attached to the other structural components of the articulated arm in order to transfer rotation without deformation of the arm (or at most, with only de minimis deformation). This is in contrast to conventional portable CMM's (such as disclosed in the Raab '356 and Eaton '148 patents) wherein separate and distinct joint elements and transfer elements are required with the rotary encoders being part of the joint elements (but not the transfer elements). In essence, the present invention has eliminated the need for separate transfer elements (e.g., transfer members) by combining the functionality of the joint and transfer elements into a singular modular component (i.e., cartridge). Hence, rather than an articulated arm comprised of separate and distinct joints and transfer members, the present invention utilizes an articulated arm made up of a combination of longer and shorter joint elements (i.e., cartridges), all of which are structural elements of the arm. This leads to better efficiencies relative to the prior art. For example, the number of bearings used in a joint/transfer member combination in the '148 and '582 patent was four (two bearings in the joint and two bearings in the transfer member) whereas the modular bearing/transducer cartridge of the present invention may utilize a minimum of one bearing (although two bearings are preferred) and still accomplish the same functionality (although in a different and improved way).

Figure 3A:
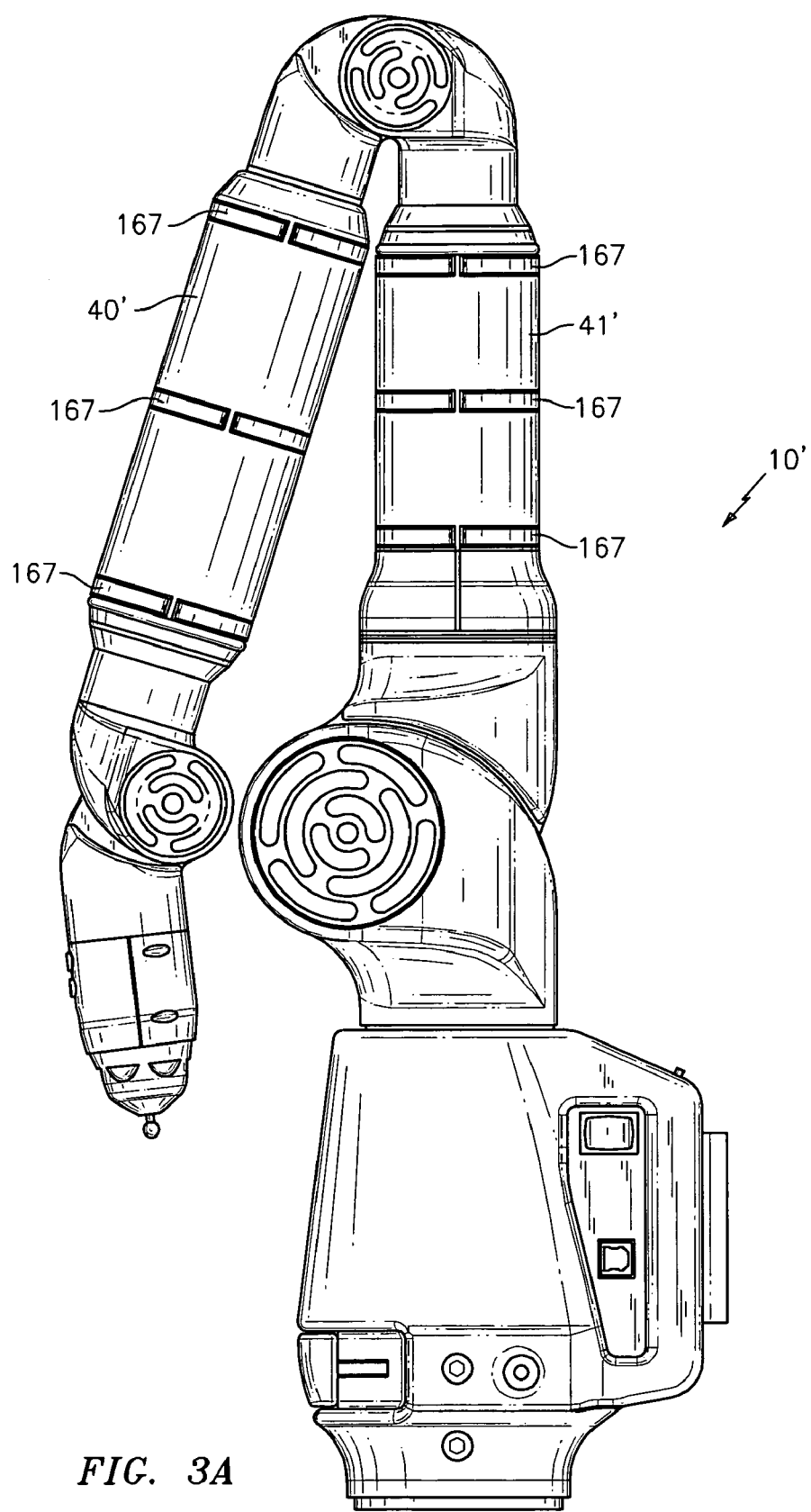
FIG. 3A is a right side view of the CMM of FIG. 1 with slightly modified protective sleeves covering two of the long joints.
Figure 24A:
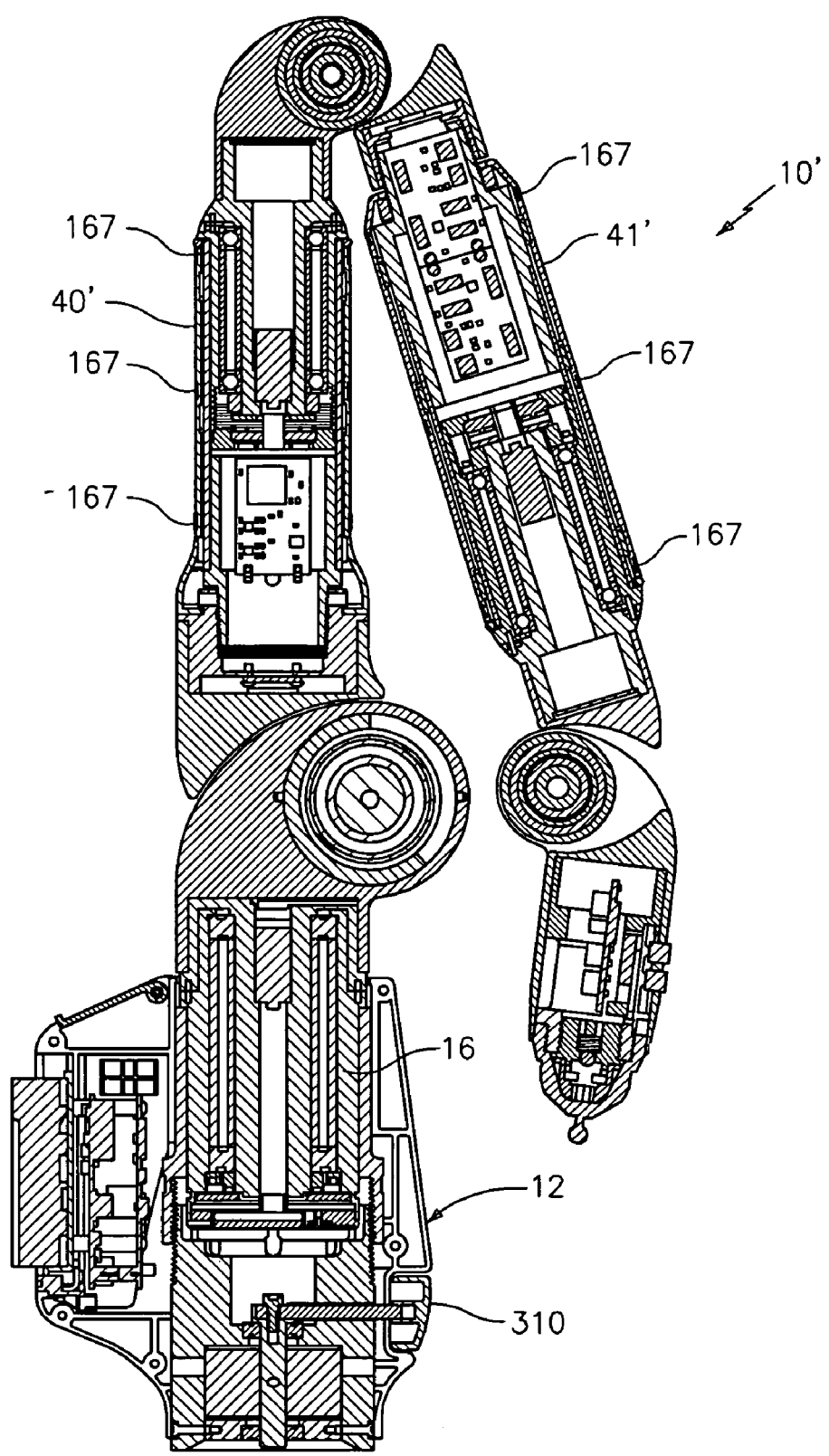
FIG. 24A is a cross-sectional elevation view of the CMM of FIG. 3A.
Figure 26A:
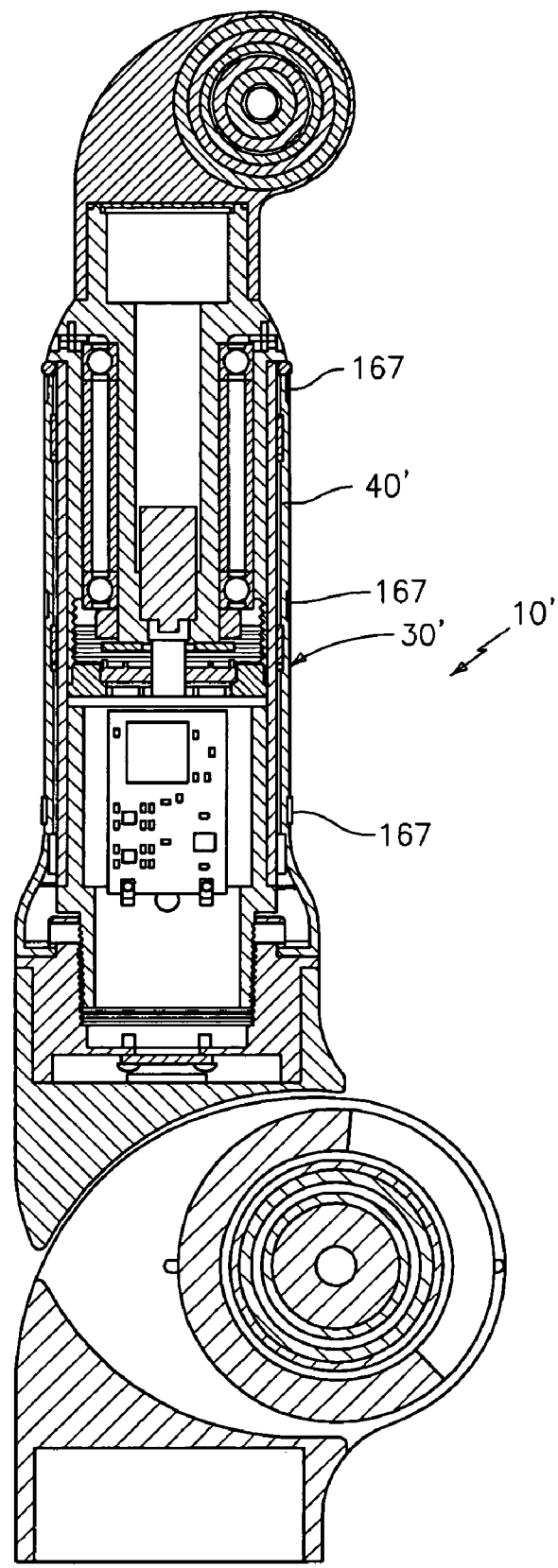
FIGS. 26A and B are enlarged cross-sectional views of portions of FIG. 24A depicting the second and third long joints as well as the probe.
Figure 26B:
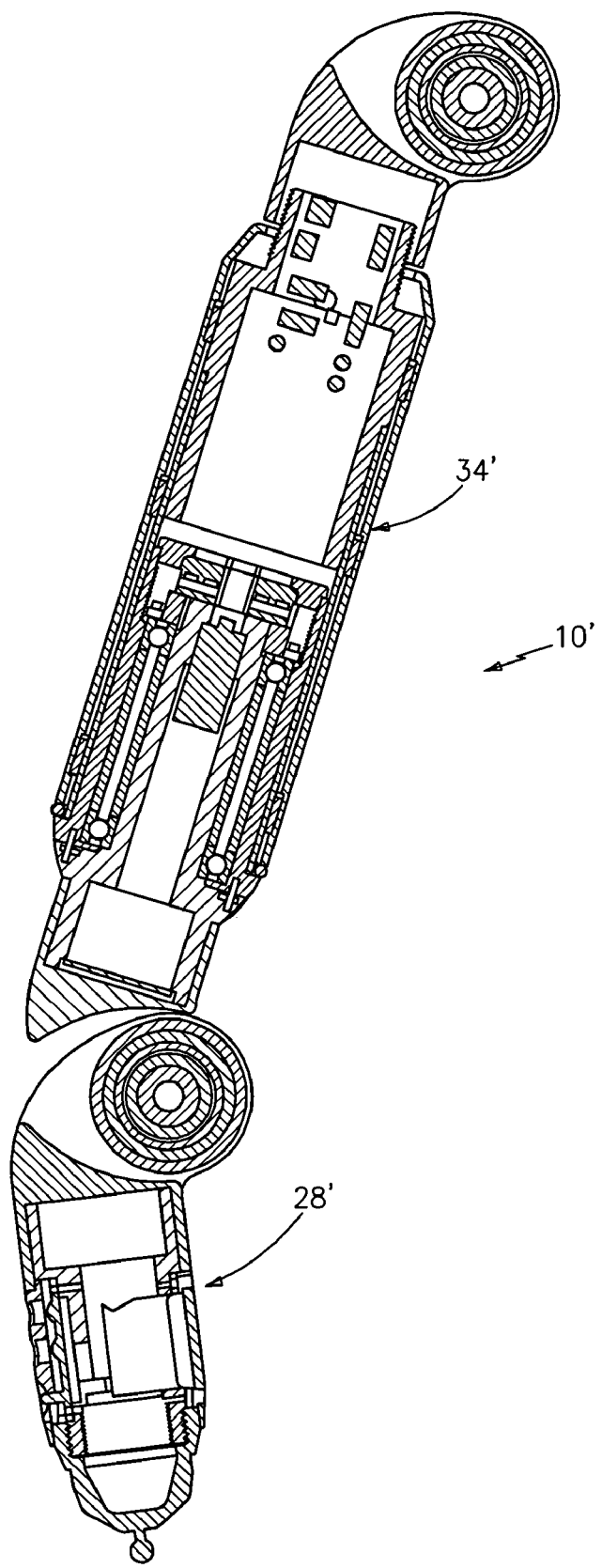

FIGS. 24A and 26A–B are cross-sectional views, similar to FIGS. 24–26, but showing the dual read head embodiments of FIGS. 10, 12, 14 and 16–22 and are further cross-sections of the CMM 10' shown in FIG. 3A.

The overall length of articulated arm 14 and/or the various arm segments may vary depending on its intended application. In one embodiment, the articulated arm may have an overall length of about 24 inches and provide measurements on the order of about 0.0002 inch to 0.0005 inch. This arm dimension and measurement accuracy provides a portable CMM which is well suited for measurements now accomplished using typical hand tools such as micrometers, height gages, calipers and the like. Of course, articulated arm 14 could have smaller or larger dimensions and accuracy levels. For example, larger arms may have an overall length of 8 or 12 feet and associated measurement accuracies of 0.001 inch thus allowing for use in most real time inspection applications or for use in reverse engineering.

CMM 10 may also be used with a controller mounted thereto and used to run a relatively simplified executable program as disclosed in aforementioned U.S. Pat. No. 5,978,748 and application Ser. No. 09/775,226; or may be used with more complex programs on host computer 172.

With reference to FIGS. 1–6 and 24–26, in a preferred embodiment, each of the long and short joints are protected by an elastomeric bumper or cover which acts to limit high impact shock and provide ergonomically pleasant gripping locations (as well as an aesthetically pleasing appearance). The long joints 16, 30 and 34 are all protected by a rigid plastic (e.g., ABS) replaceable cover which serves as an impact and abrasion protector. For the first long joint 16, this rigid plastic replaceable cover comes in the form of the two-piece base housing 26A and 26B as is also shown in FIG. 4. Long joints 30 and 34 are each protected by a pair of cover pieces 40 and 41 which, as shown in FIGS. 5 and 6 may be fastened together in a clam shell fashion using appropriate screws so as to form a protective sleeve. It will be appreciated that in a preferred embodiment, this rigid plastic replaceable cover for each long joint 30 and 34 will surround the preferably composite (carbon fiber) extension tube 134 and 148, respectively.

Preferably, one of the covers, in this case cover section 41, includes a slanted support post 166 integrally molded therein which limits the rotation at the elbow of the arm so as to restrict probe 28 from colliding with base 12 in the rest position. This is best shown in FIGS. 3, 24 and 26. It will be appreciated that post 166 will thus limit unnecessary impact and abrasion.

As will be discussed with respect to FIGS. 29 and 31, probe 28 may also include a replaceable plastic protective cover made from a rigid plastic material.

FIGS. 3A, 24A and 26A–B depict alternative protective sleeves 40', 41' which also have a clam shell construction, but are held in place using straps or spring clips 167 rather than threaded fasteners.

Each of the short joints 18, 32 and 36 include a pair of elastomeric (e.g., thermoplastic rubber such as Santoprene®) bumpers 38 as previously mentioned and as shown clearly in FIGS. 1–3 and 5–6. Bumpers 38 may either be attached using a threaded fastener, a suitable adhesive or in any other suitable manner. Elastomeric or rubber bumper 38 will limit the high impact shock as well as provide an aesthetically pleasing and ergonomically pleasant gripping location.

The foregoing covers 40, 41, 40', 41' and bumpers 38 are all easily replaceable (as is the base housing 26A, 26B) and allow arm 14 to quickly and inexpensively be refurbished without influencing the mechanical performance of CMM 10.

Still referring to FIGS. 1–3, base-housing 26A, B includes at least two cylindrical bosses for the mounting of a sphere as shown at 168 in FIG. 3. The sphere may be used for the mounting of a clamp type computer holder 170 which in turn supports a portable or other computer device 172 (e.g., the "host computer"). Preferably, a cylindrical boss is provided on either side of base housing 26A, B so that the ball and clamp computer mount may be mounted on either side of CMM 10.

Figure 27A:
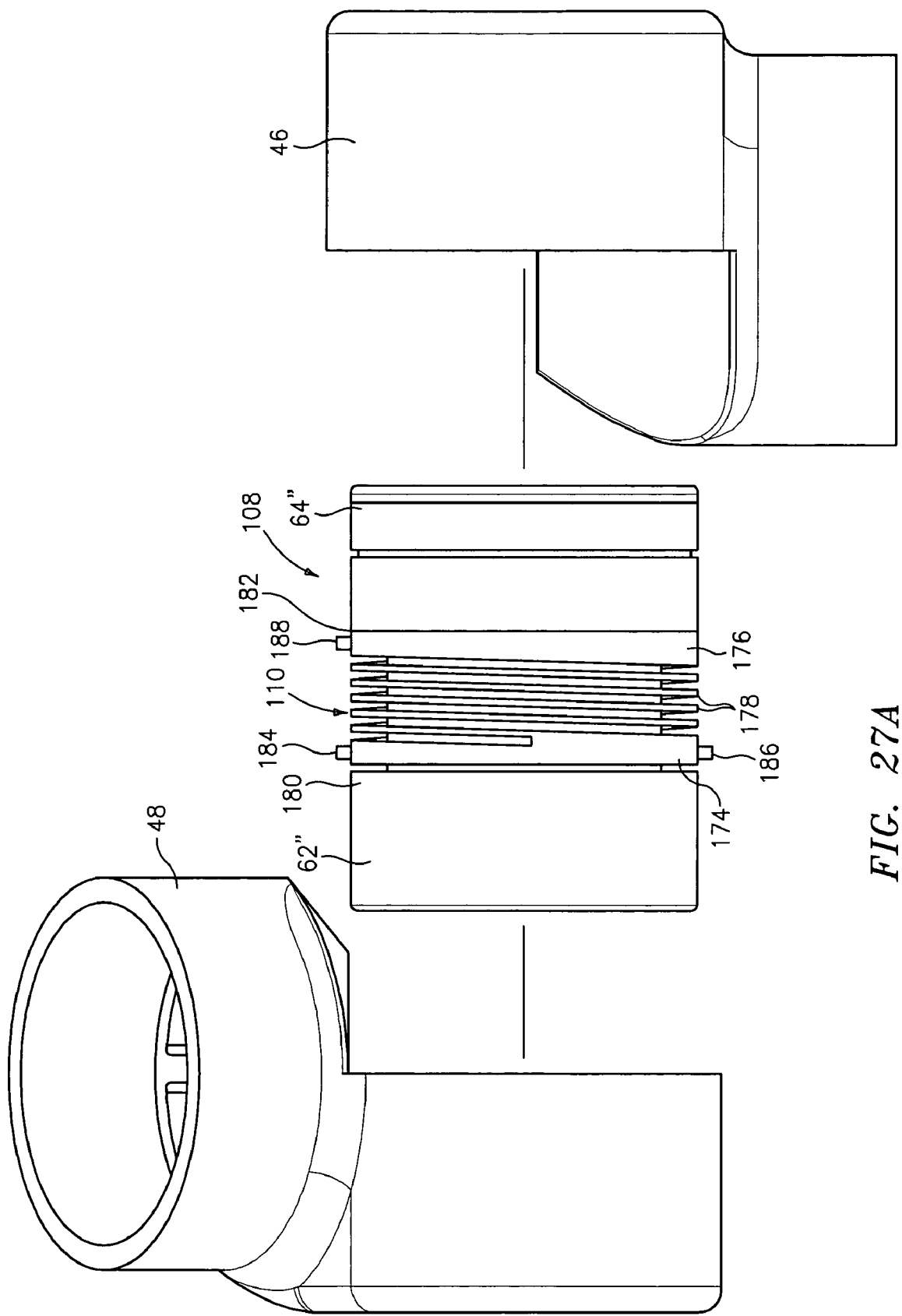
FIG. 27A is an exploded side elevation view depicting the first short joint/counter balance assembly in accordance with the present invention.
Figure 27B:
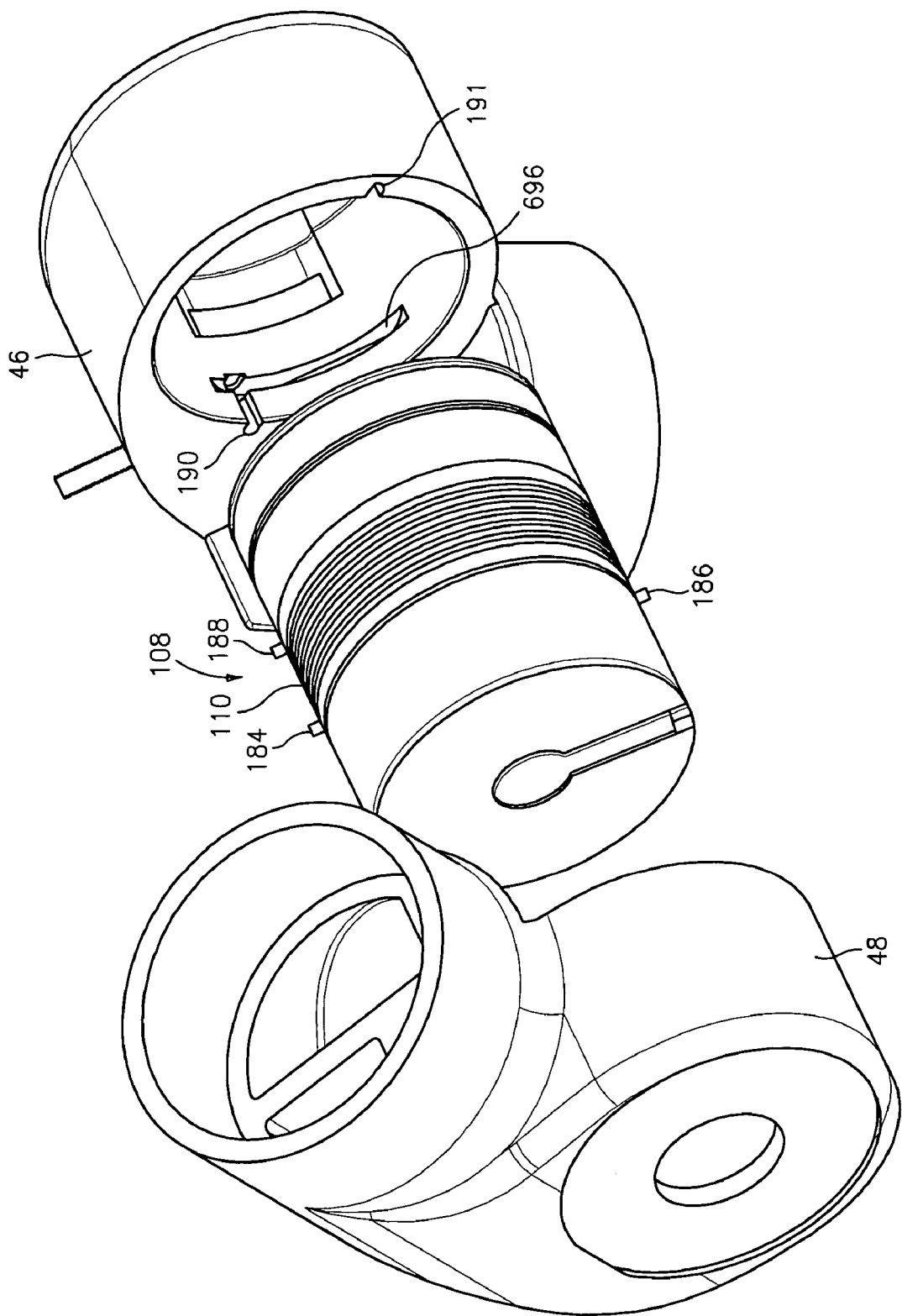
FIG. 27B is a perspective view depicting the components of FIG. 27A.

Turning now to FIGS. 15, 16, 27A, B and 28, the preferred counter balance for use with CMM 10 will now be described. Conventionally, portable CMMs of the type described herein have utilized an externally mounted coil spring which has been mounted separately in outrigger fashion on the outside of the articulated arm for use as a counter balance. In contrast, the present invention utilizes a fully integrated internal counter balance which leads to a lower overall profile for the articulated arm. Typically, prior art counter balances have utilized wound coil springs in the counter balance mechanism. However, in accordance with an important feature of the present invention, the counter balance employs a machined coil spring (as opposed to a wound coil spring). This machined spring 110 is shown in FIGS. 16 and 27A–B and is formed from a single cylinder of metal (steel) which is machined to provide a pair of relatively wide rings 174, 176 at opposed ends of the coil and relatively narrower rings 178 forming the intermediate coils between end coils 174, 176. It will be appreciated that the wider end rings 174, 176 engage with the respective side surfaces 180 of shaft 62' and 182 of housing 64" thereby preventing lateral movement of spring 110. The wider, solid end rings 174, 176 act as an anti-twist device and provide superior function relative to prior art wound springs. End ring 174 preferably includes a pair of locking posts 184, 186 (although only one locking post may be employed) while end ring 176 includes a locking post 188.

Figure 28:
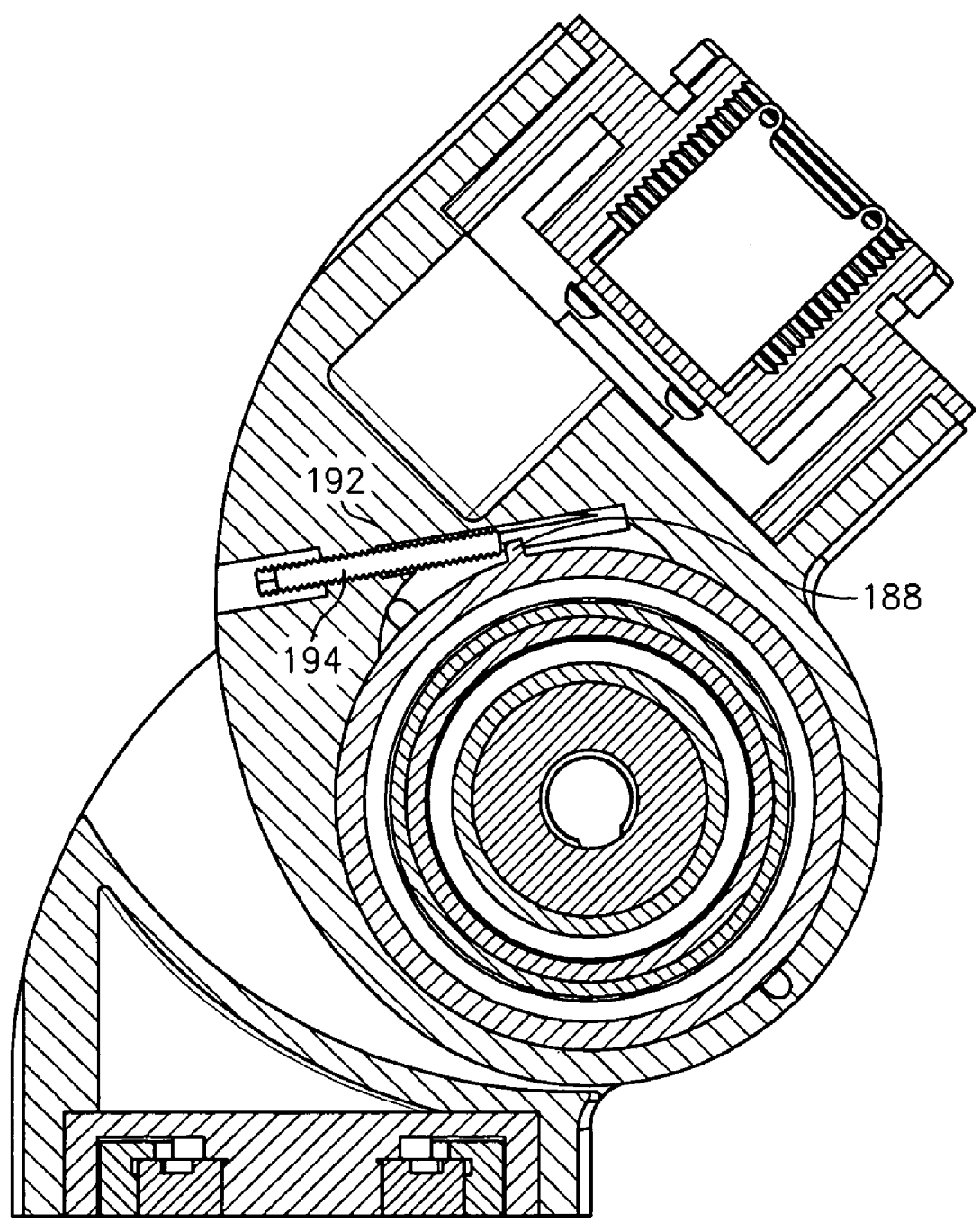
FIG. 28 is a cross-sectional elevation view depicting the internal counter balance of the present invention.

With reference to FIG. 27B, each dual socket joint 46, 48 includes channels such as shown at 190 and 191 in dual socket joint 46 for receiving a respective post 184, 186 or 188. With reference to FIG. 28, while pins 184, 186 will remain in a fixed position within the appropriate channel or groove of dual socket joint 48, the location of pin 188 may be changed so as to optimize the overall wind-up on spring 110 and provide the most efficient counter balance force. This is accomplished using a threaded hole 192 which receives threaded screw 194. As shown in FIG. 28, screw 194 may be operated on to contact pin 188 and move pin 188 circumferentially in a clock-wise direction along interior channel 696 which is shown in FIG. 27B as being perpendicular to pin access groove 190. Screw 194 is preferably positioned to optimize spring 110 in the factory.

It will be appreciated that during use of articulated arm 14, the encoder/bearing cartridge 108 will act as a hinge joint and once inserted and adhesively secured within the sockets of dual socket joints 46, 48, pins 184, 186 and 188 will be locked in their respective grooves. When socket joint 48 is rotated relative to socket joint 46 (via the hinge joint of cartridge 108), spring 110 will wind-up. When it is desired that socket joint 48 rotate back to its original position, the wound forces of spring 110 will unwind providing the desired counter balance force.

In the event that it is desired that articulated arm 14 be mounted upside down such as on a grinder, beam or ceiling, the orientation of spring 110 may similarly be inverted (or reversed) so that the proper orientation for the necessary counterbalance may be achieved.

Turning now to FIGS. 29 and 30A–C, a preferred embodiment of the measurement probe 28 will now be described. Probe 28 includes a housing 196 having an interior space 198 therein for housing printed circuit board 118. It will be appreciated that housing 196 constitutes a dual socket joint of the type described above and includes a socket 197 in which is bonded a support member 199 for supporting circuit board 118. Preferably, handle 28 includes two switches, namely a take switch 200 and a confirm switch 202. These switches are used by the operator to both take a measurement (take switch 200) and to confirm the measurement (confirm switch 202) during operation. In accordance with an important feature of this invention, the switches are differentiated from each other so as to minimize confusion during use. This differentiation may come in one or more forms including, for example, the switches 200, 202 being of differing height and/or differing textures (note that switch 202 has an indentation as opposed to the smooth upper surface of switch 200) and/or different colors (for example, switch 200 may be green and switch 202 may be red). Also in accordance with an important feature of this invention, an indicator light 204 is associated with switches 200, 202 for indicating proper probing. Preferably, the indicator light 204 is a two-color light so that, for example, light 204 is green upon taking of a measurement (and pressing the green take button 200) and is red for confirming a measurement (and pressing the red button 202). The use of a multicolored light is easily accomplished using a known LED as the light source for light 204. To assist in gripping, to provide improved aesthetics and for impact resistance, an outer protecting covering of the type described above is identified at 206 and provided over a portion of probe 28. A switch circuit board 208 is provided for the mounting of buttons 200, 202 and lamp 204 and is supported by support member 199. Switch board 208 is electrically interconnected with board 118 which houses components for processing the switches and light indicator as well as for the processing of short hinge joint 36.

Figure 29:
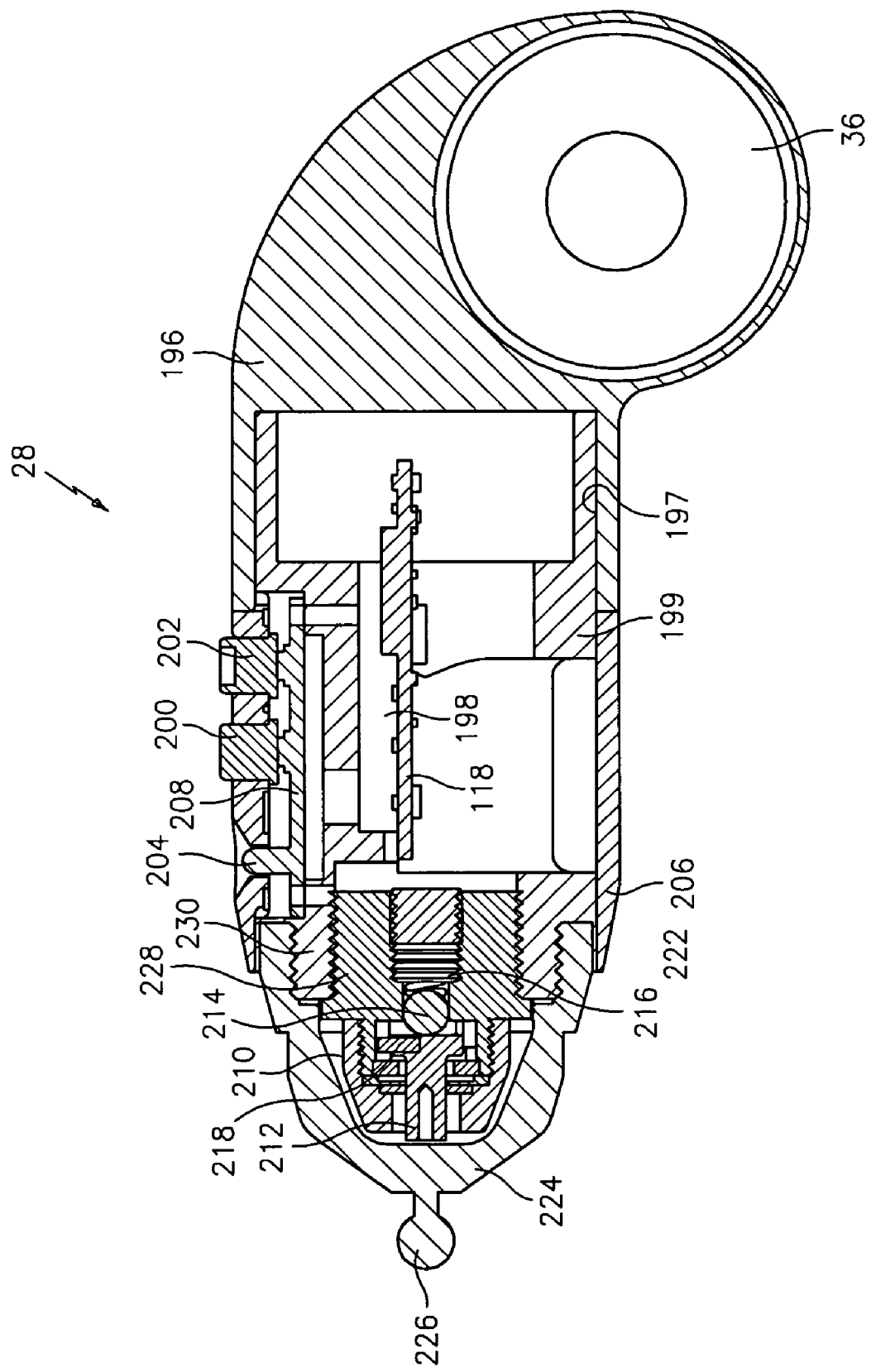
FIG. 29 is a cross-sectional, side elevation view through a first embodiment of the measurement probe in accordance with the present invention.
Figure 30A:
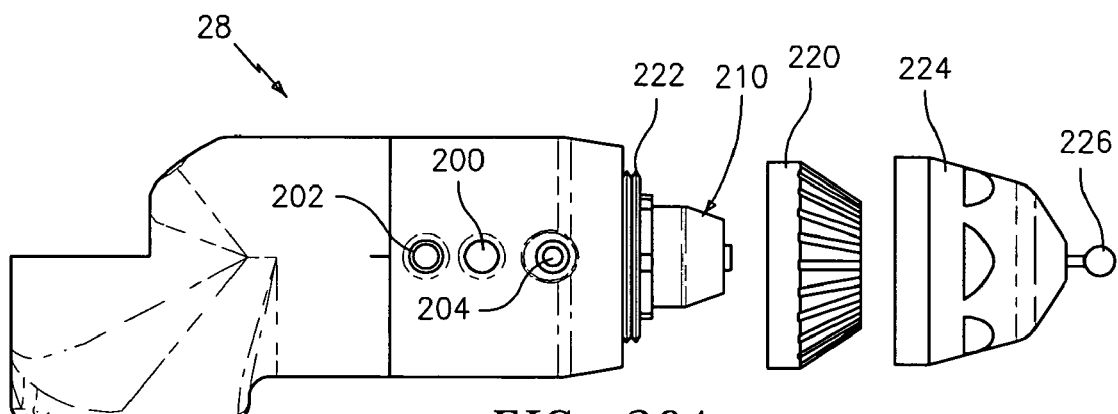
FIGS. 30A–C are sequential elevation plan views depicting the integrated touch probe assembly and conversion to hard probe assembly in accordance with the present invention.
Figure 30B:
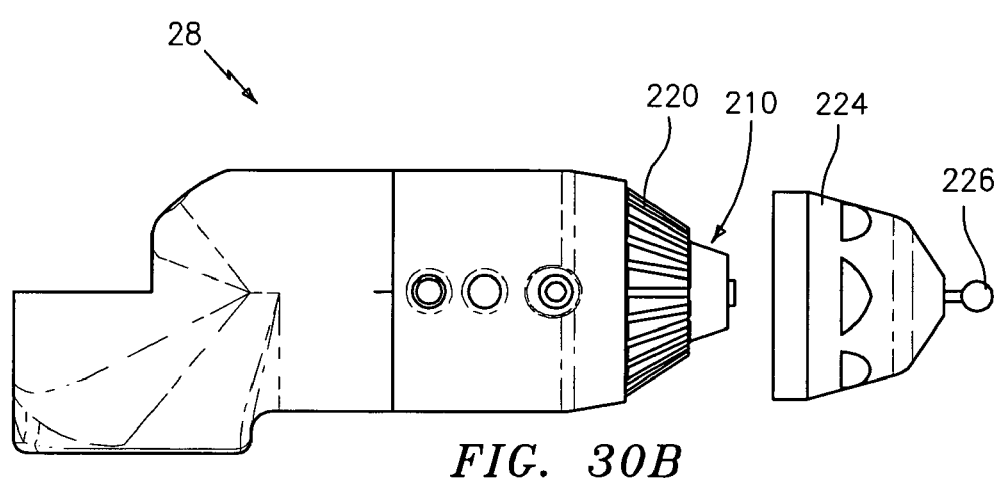
Figure 30C:
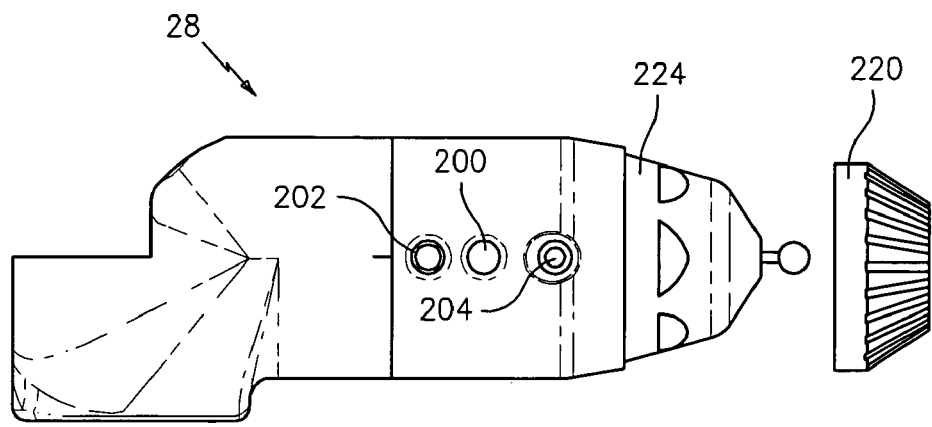

In accordance with another important feature of the present invention, and with reference to both FIG. 29 as well as FIGS. 30A–C, probe 28 includes a permanently installed touch trigger probe as well as a removable cap for adapting a fixed probe while protecting the touch trigger probe. The touch probe mechanism is shown at 210 in FIG. 29 and is based on a simplified three point kinematics seat. This conventional construction comprises a nose 212 which contacts a ball 214 biased by a contact spring 216. Three contact pins (one pin being shown at 218) are in contact with an underlying electric circuit. Application of any forces against the probe nose 212 results in lifting of any one of the three contact pins 218 resulting in an opening of the underlying electric circuit and hence activation of a switch. Preferably, touch trigger probe 210 will operate in conjunction with the front "take" switch 200.

As shown in FIG. 30B, when using touch trigger probe 210, a protective threaded cover 220 is threadably attached to threading 222 surrounding trigger probe 210. However, when it is desired to use a fixed probe rather than the touch trigger probe, the removable cap 220 is removed and a desired fixed probe such as that shown at 224 in FIGS. 29 and 30A–C is threadably attached to threading 222. It will be appreciated that while fixed probe 224 has a round ball 226 attached thereto, any different and desired fixed probe configuration may be easily threadably attached to probe 28 via threading 222. Touch trigger probe assembly 210 is mounted in a housing 228 which is threadably received into threaded connector 230 which forms a part of probe housing 196. This threadable interconnection provides for the full integration of touch trigger probe 210 into probe 28. The provision of a fully integrated touch probe represents an important feature of the present invention and is distinguishable from prior art detachable touch probes associated with prior art CMMs. In addition, the permanently installed touch trigger probe is also easily convertible to a hard probe as described above.

FIGS. 29A–C disclose yet another preferred embodiment for a measurement probe in accordance with the present invention. In FIGS. 29A–C, a measurement probe is shown at 28' and is substantially similar to measurement probe 28 in FIG. 29 with the primary difference residing in the configuration of the "take" and "confirm" switches. Rather than the discrete button type switches shown in FIG. 29, measurement probe 28' utilizes two pairs of arcuate oblong switches 200a–b and 202a–b. Each respective pair of oblong switches 202a–b and 200a–b correspond respectively to the take switch and the confirm switch as described above with respect to FIG. 29. An advantage of the measurement probe 28' embodiment relative to the measurement probe 28 embodiment is that each pair of oblong switches 202 and 200 surround virtually the entire circumference (or at least the majority of the circumference) of the measurement probe and therefore are more easily actuatable by the operator of the portable CMM. As in the FIG. 29 embodiment, an indicator light 204 is associated with each switch with the light 204 and switches 200, 202 being mounted on respective circuit boards 208'. Also, as in the FIG. 29 embodiment, switches 200, 202 may be differentiated using for example, different heights, different textures and/or different colors. Preferably, switches 200, 202 have a slight float such that the button may be actuated when pressed down in any location there along. As in the FIG. 29 embodiment, an outer protective covering of the type described above is used at 206 and provided over a portion of probe 28'.

Figure 31:
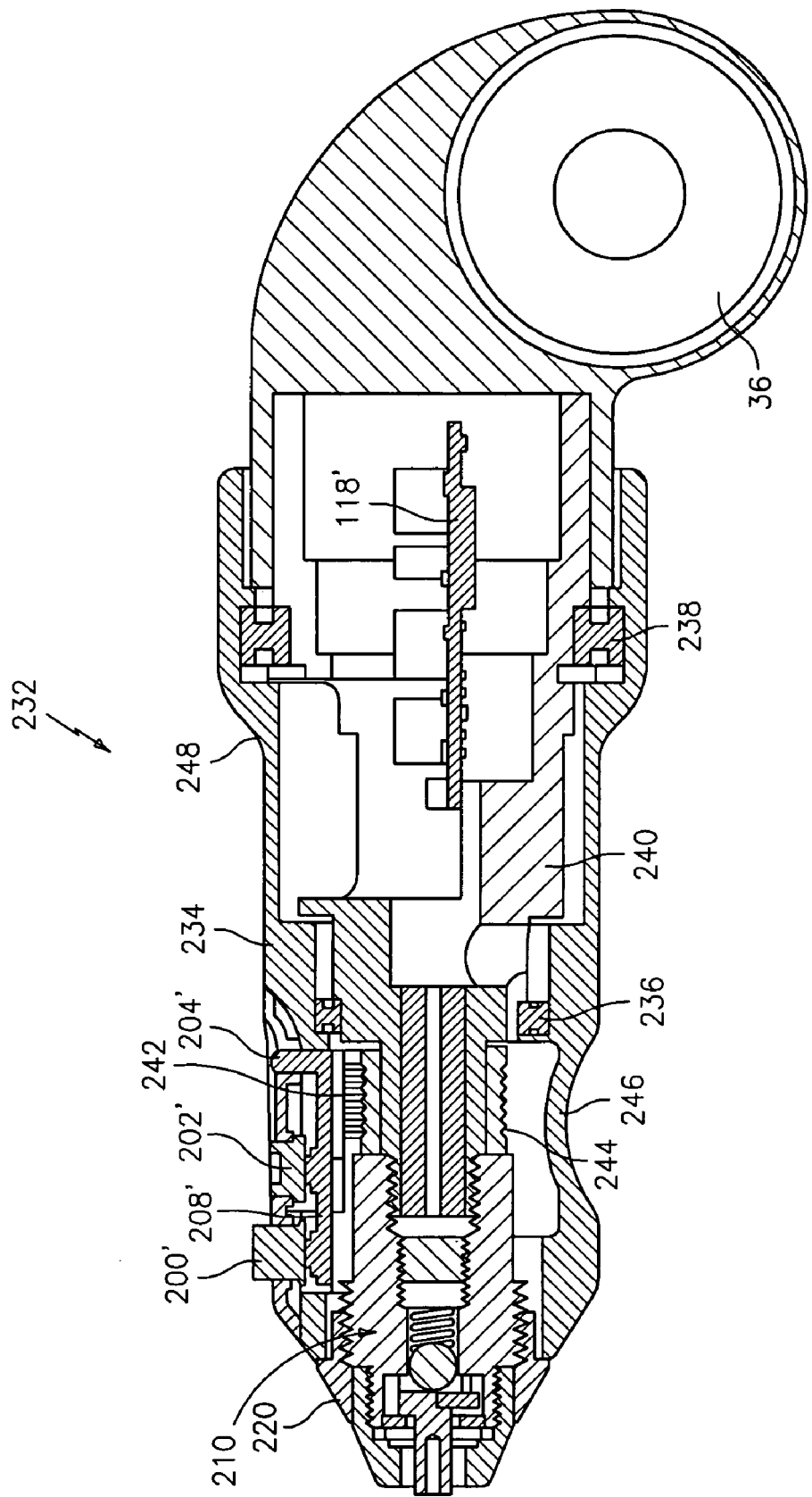
FIG. 31 is a cross-sectional, side elevation view through still another embodiment of a measurement probe in accordance with the present invention.
Figure 32:
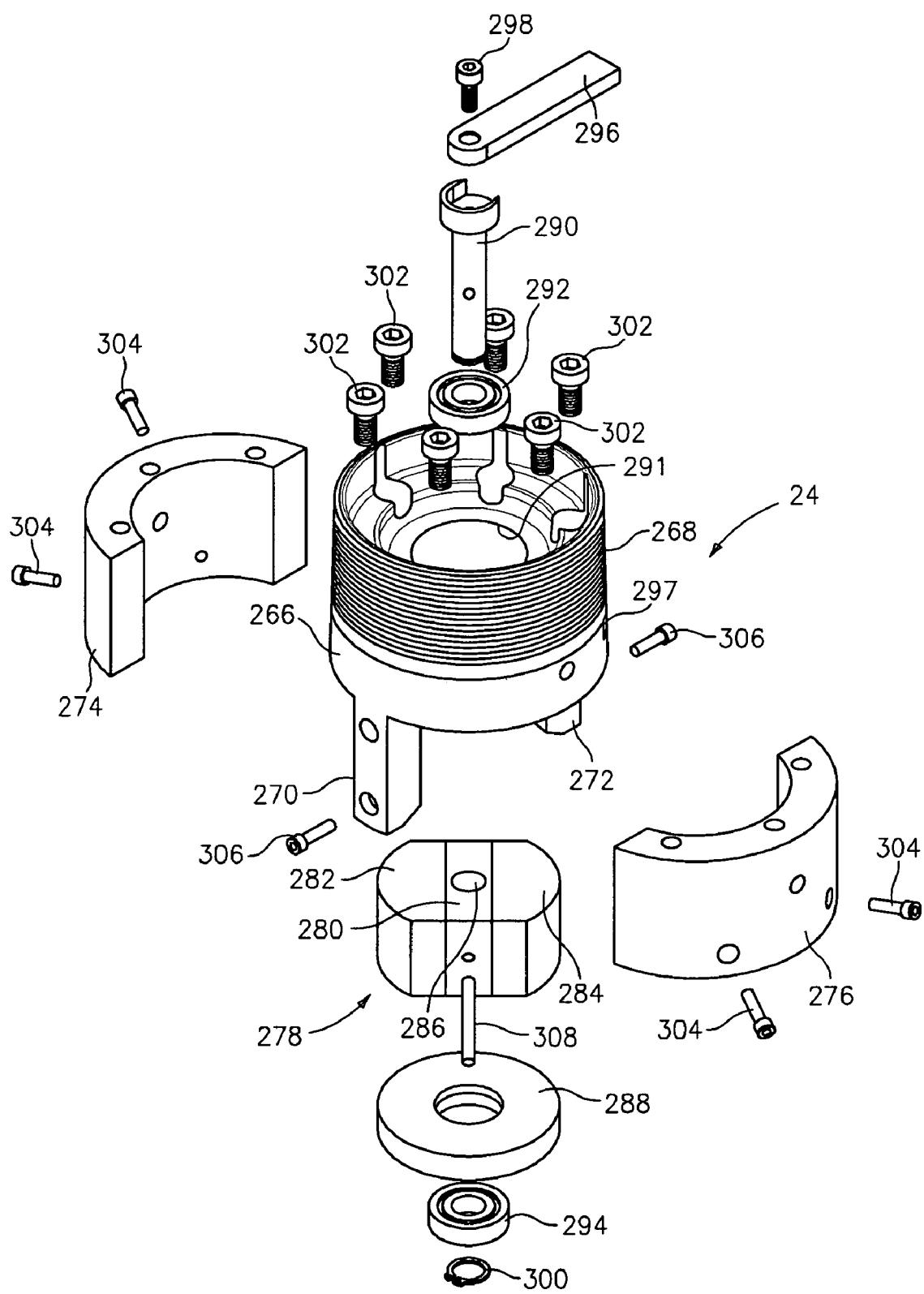
FIG. 32 is an exploded, perspective view of the integrated magnetic base in accordance with the present invention.
Figure 33:
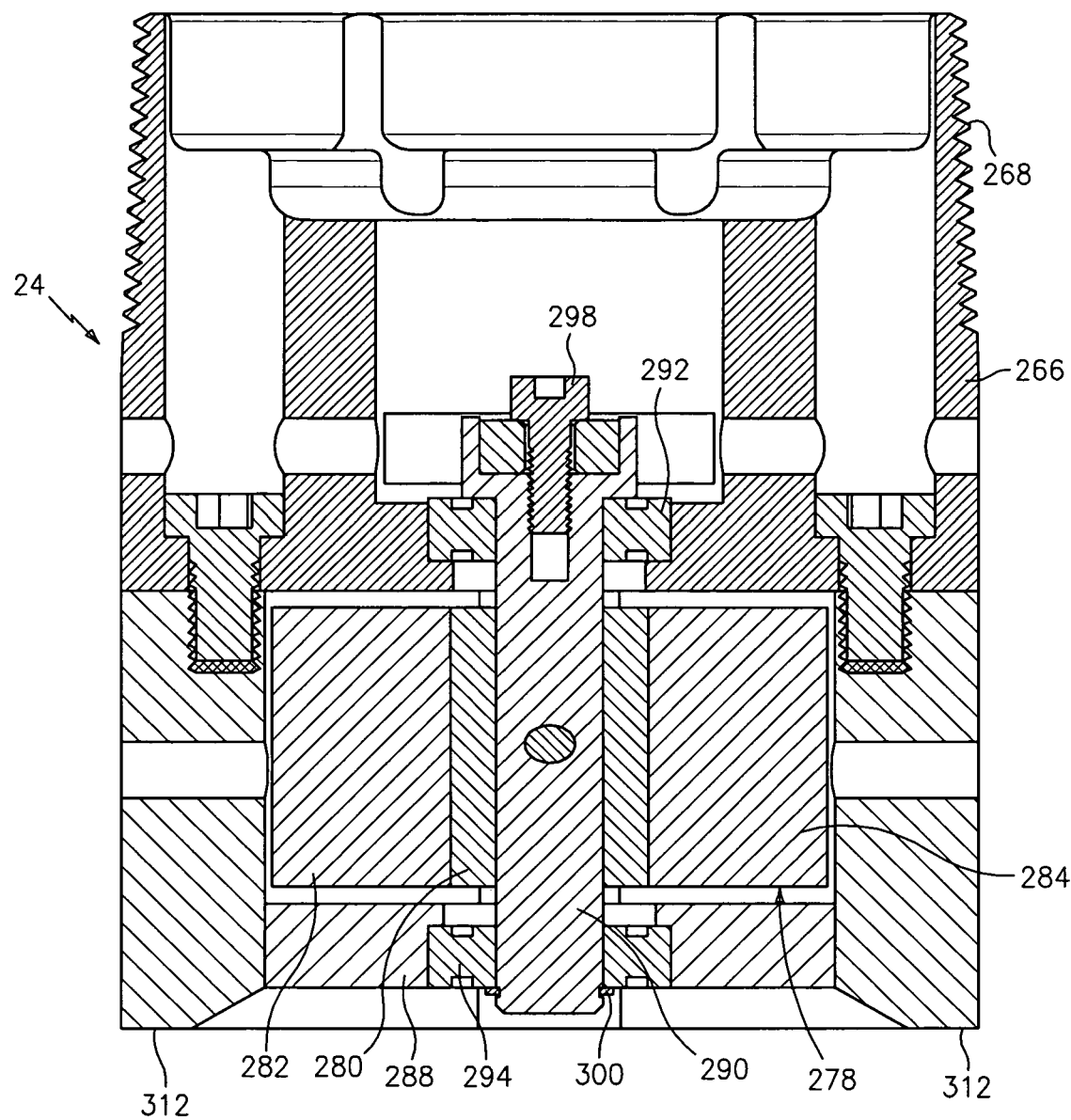
FIG. 33 is a cross-sectional elevation view through the magnetic base of FIG. 32.
Figure 34:
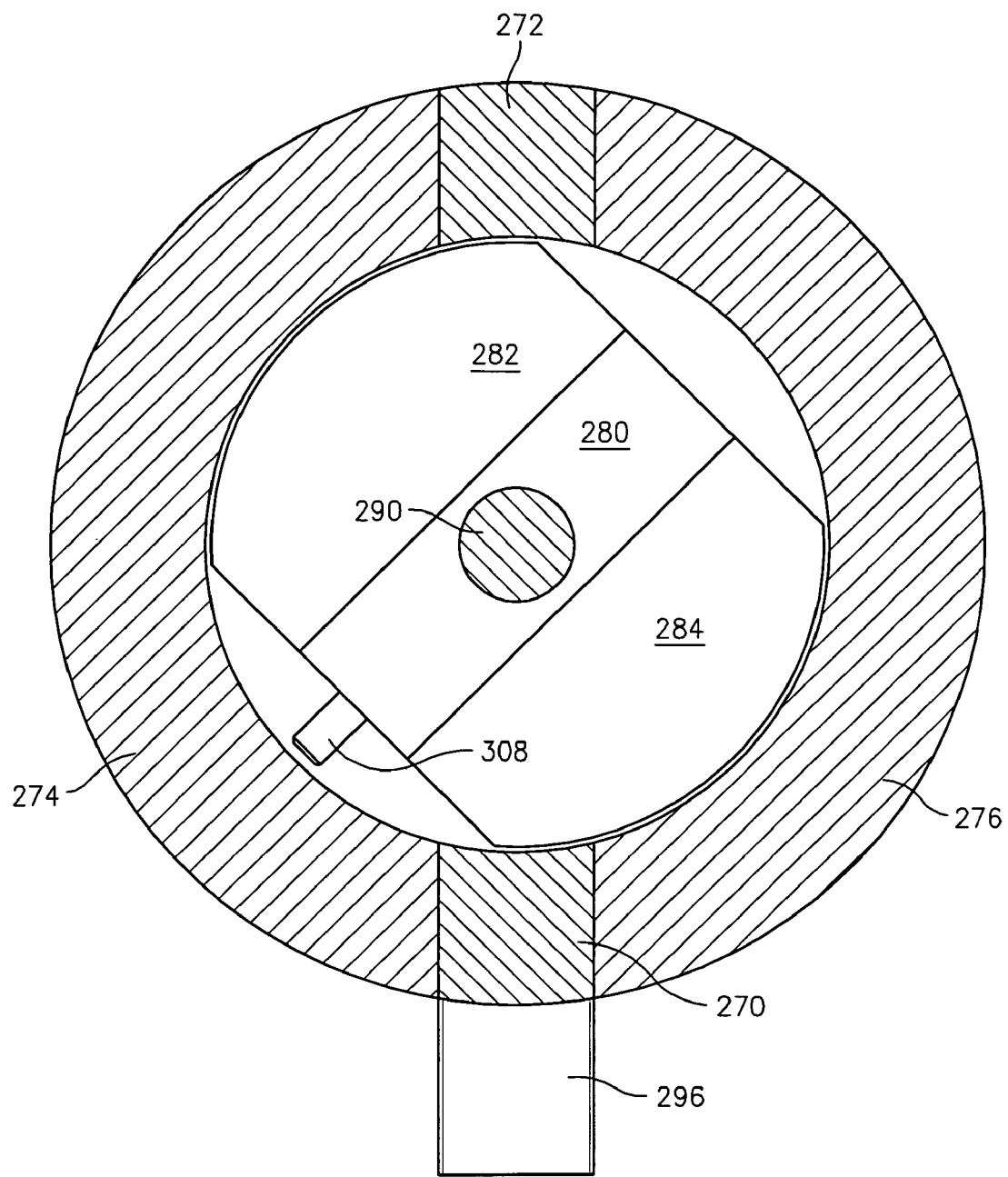
FIG. 34 is a top plan view of the magnetic mount of FIG. 32.

Referring now to FIG. 31, an alternative measurement probe for use with CMM 10 is shown generally at 232. Measurement probe 232 is similar to measurement probe 28 of FIG. 29 with the primary difference being that probe 232 includes a rotating handle cover 234. Rotating cover 234 is mounted on a pair of spaced bearings 236, 238 which in turn are mounted on an inner core or support 240 such that cover 234 is freely rotatable (via bearings 236, 238) about inner core 240. Bearings 236, 238 are preferably radial bearings and minimize the parasitic torques on the arm due to probe handling. Significantly, the switch plate 208' and corresponding switches 200', 202' and LED 204' are all mounted to rotating handle cover 234 for rotation therewith. During rotation, electrical connectivity to processing circuit board 118' is provided using a conventional slip ring mechanism 242 which comprises a known plurality of spaced spring fingers 242 which contact stationary circular channels 244. In turn, these contact channels 244 are electrically connected to circuit board 118'. The rotating handle cover 234 and switch assembly is thus electrically coupled to the inner core or probe shaft 240 and electronics board 118' using the slip ring conductor 242. The rotation of the probe handle 234 permits switches 200', 202' to be oriented conveniently for the user. This allows the articulated arm 14' to measure accurately during handling by minimizing undocumented forces. The cover 234 is preferably comprised of a rigid polymer and is provided with appropriate indentations 246 and 248 to allow easy and convenient gripping and manipulation by the probe operator.

It will be appreciated that the remainder of probe 232 is quite similar to probe 28 including the provision of a permanently and integrally installed touch probe 210 in cover 220. Note that switches 200', 202' are of differing heights and surface textures so as to provide ease of identification.

The rotating cover 234 is a significant advance in the CMM field in that it can alleviate the need for a seventh axis of rotation at the probe such as disclosed in aforementioned U.S. Pat. No. 5,611,147. It will be appreciated that the addition of a seventh axis leads to a more complex and expensive CMM as well as the addition of possible error into the system. The use of the rotatable probe 232 alleviates the need for a "true" seventh axis as it permits the probe to provide the rotation needed for handle position at the probe end without the complexity of a seventh transducer and associated bearings, encoder and electronics.

In the event that it is desired to utilize a measurement probe having a "true" seventh axis, that is, having a measurement probe with a seventh rotary encoder for measuring rotary rotation, such a measurement probe is shown in FIGS. 37–40. With reference to such FIGURES, a measurement probe 500 is shown with such measurement probe being substantially similar to the measurement probe in FIG. 29 with the primary difference being the insertion of a modular bearing/transducer cartridge 502 of the type described above, the presence of the take and confirm switches 504, 506 on the sides of the measurement probe and the inclusion of a removable handle 508.

It will be appreciated that the modular bearing/transducer cartridge 502 is substantially similar to the cartridges described in detail above and include a rotatable shaft, a pair of bearings on the shaft, an optical encoder disk, at least one and preferably two optical read heads spaced from and in optical communication with the encoder disk and a housing surrounding the bearings, optical encoder disk, read head(s) and at least a portion of the shaft so as to define the discrete modular bearing/transducer cartridge. A circuit board 503 for the encoder electronics resides in an opening 505 with probe 500. Pairs of take and confirm buttons 504, 506 are positioned on either side of a downwardly projected housing portion 510 of probe 500 with the buttons being connected to an appropriate PC board 512 as in the measurement probe of the FIG. 29 embodiment. Similarly, an indicator light 513 is positioned between buttons 504, 506 as in the previously discussed embodiments. A pair of threaded openings 514 in housing 510 receive fasteners for removable attachment of handle 508 which provides for ease of rotary manipulation during use of measurement probe 500.

In all other substantial respects, measurement probe 500 is similar to measurement probe 28 of FIG. 29 including the preferred use of permanently installed touch trigger probe at 516 as well as a removable cap for adapting a fixed probe 518 while protecting the touch trigger probe. It will be appreciated that the seventh rotary encoder 502 included in measurement probe 500 facilitates the use of CMM 10 in connection with known laser line scanners and other peripheral devices.

Turning now to FIGS. 2–4, 23 and 25, in accordance with an important feature of the present invention, a portable power supply is provided to power CMM 10 thus providing a fully portable CMM. This is in contrast to prior art CMMs where power supply was based only on an AC cord. In addition, CMM 10 may also be powered directly by an AC cord through an AC/DC adapter via a conventional plug-in socket. As shown in FIGS. 2, 3 and 25, a conventional rechargeable battery (e.g., Li-ion battery) is shown at 22. Battery 22 is mechanically and electrically connected into a conventional battery support 252 which in turn is electrically connected to a conventional power supply and battery recharger circuit component 254 located on circuit board 20. Also communicating with board 20 is an on/off switch 258 (see FIG. 3) and a high-speed communication port 259 (preferably a USB port). The joint electronics of arm 14 is connected to board 20 using an RS-485 bus. Battery 22 can be charged on a separate charger, or charged in place in cradle 252 as is commonly found in conventional video cameras. It will be appreciated that portable computer 172 (see FIG. 2) can operate for several hours on its built-in batteries and/or in the alternative, may be electrically connected to the power supply unit 254 of CMM 10.

The on-board power supply/recharger unit in accordance with the present invention is preferably positioned as an integral part of CMM 10 by locating this component as an integral part of base 12 and more specifically as a part of the plastic base housing 26A, B. Note also that preferably, base housing 26A, B includes a small storage area 260 having a pivotable lid 262 for storing spare batteries, probes, or the like.

Turning now to FIGS. 4, 25 and 32–34, the novel magnetic mounting device for use with CMM 10 will now be described. This magnetic mounting device is shown generally at 24 in FIGS. 4, 25, 32 and 33. Magnetic mount 24 includes a cylindrical non-magnetic housing 266 which terminates at its upper end in a threaded section 268. As with all of the preferred threading used in CMM 10, threading 268 is a tapered thread which is intended to be threadingly connected to threading 126 of first long joint 16 as best shown in FIG. 25. Non-magnetic housing 266 has a substantially cylindrical configuration with the exception of two longitudinal extensions 270, 272 which are opposed from each other at 180o and extend outwardly and downwardly from housing 266. Attached on either side of longitudinal extensions 270, 272 are a pair of semi-cylindrical housings 274, 276, each of which is formed from a "magnetic" material, that is, a material capable of being magnetized such as iron or magnetic stainless steel. Together, "magnetic" housing halves 274, 276 and longitudinal extensions 270, 272 form an open ended cylindrical enclosure for receiving and housing a magnetic core 278. Magnetic core 278 has an oblong shape with a non-magnetic center 280 sandwiched between a pair of rare earth magnets (e.g., neodymium-iron-boron) 282, 284. An axial opening 286 is provided through non-magnetic center 280. A circular cover plate 288 is positioned beneath magnetic core 278 and located within the lower housing formed by elements 274, 276 and longitudinal extensions 270, 272. A shaft 290 is positioned through a circular opening 292 in housing 266 and extends downwardly through axial opening 286 of magnetic core 278. Shaft 290 is supported for rotation by an upper bearing 291 and a lower bearing 294. Upper bearing 292 is received by an internal cylindrical recess in housing 266 and lower bearing 294 is received by a similar cylindrical recess in cover plate 288. A lever 296 extends outwardly and perpendicularly from shaft 290 and, as will be described hereafter, provides an on/off mechanism for the magnetic mount 264. Lever 296 extends outwardly of housing 266 through a groove 297 through housing 266 (see FIG. 25).

This entire assembly of lever 296, shaft 290 and bearings 292, 294 is secured together using an upper threaded fastener 298 and a lower retaining ring 300. It will be appreciated that the various components of magnetic mount 264 are further secured by, for example, threaded fasteners 302 which connect housing 266 to "magnetic" material housing portions 274, 276 and threaded fasteners 304 which interconnect housing portions 274, 276 to cover 288. In addition, threaded fasteners 306 attached longitudinal extensions 270, 272 of housing 266 to cover 288. A pin 308 is received by a lateral opening in core 278 and a lateral opening in shaft 290 so as to lock shaft 290 to core 278. In this way, as lever 296 is rotated, shaft 290 will rotate core 278 via shaft connection 208.

As shown in FIGS. 1, 3 and 25, lever 296 is connected to a handle 310 which is easily accessible on the exterior of base 12 and is used to actuate magnetic mount 264. To accomplish such actuation, handle 296 is simply moved (from the right to the left in FIG. 1). Movement of handle 310 will in turn rotate lever 296 which in turn will rotate shaft 290 which will then rotate rare earth magnets 282, 284 from their non-operative position (wherein magnets 282, 284 are aligned with non-magnetic extensions 270, 272) into an actuated position where magnets 282, 284 are aligned with magnetic material 274, 276. When the magnets are aligned with the magnetic material as described, a magnetic field (flux) is formed. Similarly, when the magnets 282, 284 are out of alignment with the magnetic material 274, 276, the flux path is interrupted. In this state, the magnetic base can be separated from the table upon which it sits. Note however that even in the non-aligned position, there will be some residual magnetic flux. This small residual magnetic flux in the "off" position is a positive feature of this invention as a small amount of magnetic flux acts to react with the magnet and automatically rotate lever 296 back to the "on" position when replaced on the table. It will be appreciated that when the magnets are in alignment with the magnetic material, a strong magnetic field will be established and semi-circular elements 274, 276 will be magnetically adhered to the annular surface formed at the bottom thereof as shown at 312 in FIGS. 25 and 33.

The magnetic mount 264 of the present invention provides a fully integrated yet removable mounting device since it is detachably mounted (via threading 268) and may be replaced by other attachments such as a screw mount or vacuum mount. Of course, in order to be properly used, magnetic mount 264 must be placed on a magnetizable surface and be activated (via lever 296) in order to operate. In the event that mounting is required to a non-magnetic surface (e.g., granite), then interface plates or other suitable mechanisms must be used between the magnetic base and the non-magnetic surface.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A portable coordinate measurement machine (CMM) for measuring the position of an object in a selected volume, comprising:
    an articulated arm having opposed first and second ends, said arm including at least five rotary joints such that said articulated arm has at least five degrees of freedom, each degree of freedom corresponding to a rotational axis such that said articulated arm travels through at least five rotational axes;

a measurement probe attached to a first end of said articulated arm;

an electronic circuit which receives the position signals from transducers in said arm and provides a digital coordinate corresponding to the position of the probe in a selected volume; and wherein at least one of said rotary joints further comprise;

a periodic pattern of a measurable characteristic;

at least two read heads spaced from and in communication with said pattern; and said pattern and said at least two read heads being positioned within said rotary joint so as to be rotatable with respect to each other and wherein said at least two read heads cooperate to decrease error in rotary measurement which is due to applied loads affecting the relative position between said read heads and said pattern.

2. The CMM of claim 1 wherein said at least one joint includes:
at least one bearing.

3. The CMM of claim 2 wherein:
said at least one bearing is sealed.

4. The CMM of claim 1 wherein:
said at least one bearing comprises at least one preloaded bearing.

5. The CMM of claim 4 wherein said at least one preloaded bearing comprises:
a first bearing;
a second bearing;
an inner spacer sleeve between said first and second bearings;
an outer spacer sleeve between said first and second bearings;
said inner and outer spacer sleeves having different predetermined lengths; and
said inner and outer spacer sleeves being compressed against said first and second bearings to define a predetermined preload.

6. The CMM of claim 1 wherein said two read heads are positioned 180 degrees apart.

7. The CMM of claim 1 including at least three read heads.

8. The CMM of claim 7 wherein said three read heads are 120 degrees apart.

9. The CMM of claim 1 including at least four read heads.

10. The CMM of claim 9 wherein said four read heads are 90 degrees apart.

11. The CMM of claim 1 wherein:
said pattern comprises an optical fringe pattern; and
said at least one read head comprises an optical read head.

12. The CMM of claim 11 wherein:
said optical fringe pattern is disposed on an optical encoder disk.

13. The CMM of claim 11 wherein said communication comprises:
said read head detecting the interference between diffraction orders to produce sinusoidal signals from said read head inserted in said fringe pattern, said sinusoidal signals being electronically interpolated to detect displacement.

14. The CMM of claim 13 wherein each said read head comprises a laser, a collimator, and an aperture, whereby said laser emits a beam which is collimated by said collimator, and then sized by the aperture, said fringe pattern includes a grating that diffracts light into discrete orders.

15. The CMM of claim 14 wherein each said read head further comprises a photodetector array, said photodetector array producing four channels of nearly pure sinusoidal output when there is relative motion between said fringe pattern and said read head.

16. The CMM of claim 1 including means for averaging the cancellation effects caused by said at least two read heads.

17. The CMM of claim 1 wherein:
said pattern of a measurable characteristic is at least one of the characteristics selected from the group consisting of reflectivity, opacity, magnetic field, capacitance, inductance and surface roughness.

18. The CMM of claim 1 including:
a slip ring assembly in said at least one joint.

19. The CMM of claim 1 wherein said at least one of said joints has infinite rotation.

20. The CMM of claim 1 wherein:
at least two of said joints are threadibly interconnected to each other.

21. The CMM of claim 1 wherein:
at least two of said joints are fastened to each other using threadable fasteners.

22. The CMM of claim 1 wherein at least two joints include complimentary tapered portions which are fastened together.

23. The CMM of claim 1 wherein said joints comprise long joints for swiveling motion and short joints for hinged motion.

24. The CMM of claim 23 including three joint pairs, each joint pair comprising a long joint and a short joint.

25. The CMM of claim 24 wherein said long joint is about 90 degrees to said short joint in each joint pair.

26. The CMM of claim 1 wherein said plurality of joints includes six joints and further includes a seventh rotary joint in said measurement probe.

27. The CMM of claim 1 wherein said joints are arranged in the joint configurations selected from the group consisting of 2-2-2, 2-1-2, 2-2-3, and 2-1-3.

28. The CMM of claim 1 including:
an electronic identification chip associated with said joint for uniquely identifying said joint.

29. The CMM of claim 1 wherein:
said pattern is rotatable with respect to said read heads; and
said two read heads are stationary with respect to said pattern.

30. The CMM of claim 1 wherein:
said pattern is stationary with respect to said read heads; and
said two reads heads are rotatable with respect to said pattern.

31. The CMM of claim 1 wherein said joint further comprises:
a first and second housing, and a rotatable shaft extending from said second housing into said first housing;
a bearing disposed between said shaft and said first housing permitting said rotatable shaft to rotate within said first housing;
said pattern being attached to said rotatable shaft;
said at least two read heads being fixed within said first housing such that rotation of the first housing with respect to the second housing causes said at least two read heads to move relative to said pattern.

32. The CMM of claim 31 wherein:
said pattern is attached directly to said shaft.

33. The CMM of claim 31 wherein said read heads are positioned approximately 180° apart around an axis of said rotatable shaft.

34. The CMM of claim 31 including means for averaging the cancellation effects caused by said two read heads.

35. The CMM of claim 1 wherein said at least one joint comprises:
a first housing;
a second housing;
a rotatable shaft fixed to said second housing and extending into said first housing;
at least one bearing supported within said first housing and supporting said rotatable shaft for rotation about its axis; wherein one of said pattern and said at least two read heads are fixed to an end of said shaft and the other of said pattern and said at least two read heads are fixed within said first housing.

36. The CMM of claim 35 wherein said read heads are positioned approximately 180° apart around said axis of said rotatable shaft.

37. The CMM of claim 35 including means for averaging the cancellation effects caused by said at least two read heads.

38. The CMM of claim 1 wherein said at least one of said rotary joints comprises at least two of said rotary joints.

39. The CMM of claim 1 wherein said at least one of said rotary joints comprises at least three of said rotary joints.

40. The CMM of claim 1 wherein said at least one of said rotary joints comprises at least four of said rotary joints.

41. The CMM of claim 1 wherein said at least one of said rotary joints comprises at least five of said rotary joints.

42. The CMM of claim 1 including at least six rotary joints such that said articulated arm has at least six degrees of freedom and wherein said at least one of said rotary joints comprises at least six rotary joints.

43. The CMM of claim 1 including at least seven rotary joints such that said articulated arm has at least seven degrees of freedom and wherein said at least one of said rotary joints comprises at least seven rotary joints.

44. The CMM of claim 1 wherein said at least one of said rotary joints comprises all of said rotary joints.

* * * * *

(12) EX PARTE REEXAMINATION CERTIFICATE (10675th)

United States Patent
Raab et al.

(10) Number: US 7,051,450 C1
(45) Certificate Issued: *Aug. 11, 2015

(54) PORTABLE COORDINATE MEASUREMENT MACHINE

(75) Inventors: Simon Raab, Maitland, FL (US); Seyed Ali Sajedi, Winter Park, FL (US); Kenneth J. Hasloecher, Deltona, FL (US); Marc Barber, Deltona, FL (US)

(73) Assignee: FARO TECHNOLOGIES, INC., Lake Mary, FL (US)

Reexamination Request:
No. 90/013,501, May 4, 2015

Reexamination Certificate for:
Patent No.: 7,051,450
Issued: May 30, 2006
Appl. No.: 11/248,407
Filed: Oct. 12, 2005

(*) Notice: This patent is subject to a terminal disclaimer.

Related U.S. Application Data

(63) Continuation of application No. 10/366,589, filed on Feb. 13, 2003, now Pat. No. 7,069,664.

(60) Provisional application No. 60/357,599, filed on Feb. 14, 2002, provisional application No. 60/394,908, filed on Jul. 10, 2002.

(51) Int. Cl.
| G01B 5/04 | (2006.01) |
| B23Q 35/04 | (2006.01) |
| B25J 9/02 | (2006.01) |
| B25J 9/06 | (2006.01) |
| B25J 9/16 | (2006.01) |
| B25J 17/02 | (2006.01) |
| B25J 19/00 | (2006.01) |
| G01B 5/004 | (2006.01) |
| G01B 5/008 | (2006.01) |
| G01B 11/00 | (2006.01) |
| G01B 11/03 | (2006.01) |
| G01B 11/25 | (2006.01) |
| G01B 21/04 | (2006.01) |
| G06T 7/00 | (2006.01) |
| B25J 9/00 | (2006.01) |

(52) U.S. Cl.
CPC ............... *B23Q 35/04* (2013.01); *B25J 9/0012* (2013.01); *B25J 9/023* (2013.01); *B25J 9/06* (2013.01); *B25J 9/1602* (2013.01); *B25J 17/025* (2013.01); *B25J 19/0016* (2013.01); *B25J 19/0091* (2013.01); *G01B 5/004* (2013.01); *G01B 5/008* (2013.01); *G01B 11/005* (2013.01); *G01B 11/03* (2013.01); *G01B 11/25* (2013.01); *G01B 21/045* (2013.01); *G06T 7/0057* (2013.01); *Y10S 33/01* (2013.01)

(58) Field of Classification Search
None
See application file for complete search history.

(56) References Cited

To view the complete listing of prior art documents cited during the proceeding for Reexamination Control Number 90/013,501, please refer to the USPTO's public Patent Application Information Retrieval (PAIR) system under the Display References tab.

*Primary Examiner* — Joseph Kaufman

(57) ABSTRACT

A portable coordinate measurement machine comprises an articulated arm having jointed arm segments. The arm includes joint assemblies which include at least two read heads in communication with a periodic pattern of a measurable characteristic, the pattern and read heads being positioned within the joint so as to be rotatable with respect to each other.

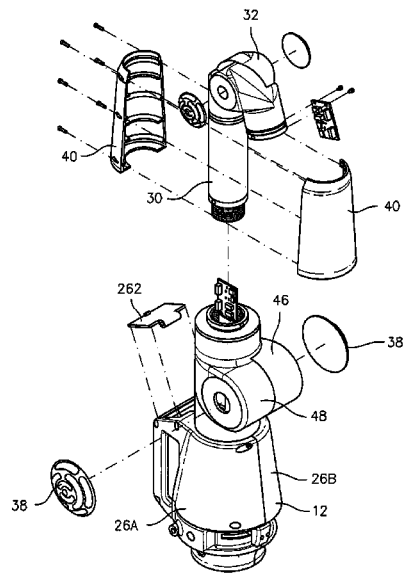

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-44 is confirmed.

\* \* \* \* \*